United States Patent
Ikenuma et al.

(10) Patent No.: US 10,454,102 B2
(45) Date of Patent: Oct. 22, 2019

(54) LITHIUM MANGANESE COMPOSITE OXIDE, SECONDARY BATTERY, ELECTRONIC DEVICE, AND METHOD FOR FORMING LAYER

(71) Applicant: SEMICONDUCTOR ENERGY LABORATORY CO., LTD., Atsugi-shi, Kanagawa-ken (JP)

(72) Inventors: Tatsuya Ikenuma, Kanagawa (JP); Shuhei Yoshitomi, Kanagawa (JP); Takahiro Kawakami, Kanagawa (JP); Yumiko Yoneda, Kanagawa (JP); Yohei Momma, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 155 days.

(21) Appl. No.: 15/649,179

(22) Filed: Jul. 13, 2017

(65) Prior Publication Data
US 2017/0317346 A1    Nov. 2, 2017

Related U.S. Application Data

(62) Division of application No. 14/497,386, filed on Sep. 26, 2014, now abandoned.

(30) Foreign Application Priority Data

Oct. 4, 2013    (JP) .................................. 2013-209366

(51) Int. Cl.
*H01M 4/36*    (2006.01)
*H01M 10/05*    (2010.01)
(Continued)

(52) U.S. Cl.
CPC ......... *H01M 4/366* (2013.01); *H01M 4/0402* (2013.01); *H01M 4/131* (2013.01);
(Continued)

(58) Field of Classification Search
None
See application file for complete search history.

(56) References Cited

U.S. PATENT DOCUMENTS

| | | |
|---|---|---|
| 4,302,518 A | 11/1981 | Goodenough et al. |
| 4,668,595 A | 5/1987 | Yoshino et al. |

(Continued)

FOREIGN PATENT DOCUMENTS

| | | |
|---|---|---|
| CN | 101080830 A | 11/2007 |
| CN | 102163739 A | 8/2011 |

(Continued)

OTHER PUBLICATIONS

Taiwanese Office Action (Application No. 103134268) dated Apr. 18, 2018.

(Continued)

*Primary Examiner* — Scott J. Chmielecki
(74) *Attorney, Agent, or Firm* — Nixon Peabody LLP; Jeffrey L. Costellia

(57) ABSTRACT

To increase the volume density or weight density of lithium ions that can be received and released in and from a positive electrode active material to achieve high capacity and high energy density of a secondary battery. A lithium manganese composite oxide represented by $Li_xMn_yM_zO_w$ that includes a region belonging to a space group C2/c and is covered with a carbon-containing layer is used as the positive electrode active material. The element M is an element other than lithium and manganese. The lithium manganese composite oxide has high structural stability and high capacity.

20 Claims, 38 Drawing Sheets

(51) Int. Cl.
*H01M 4/04* (2006.01)
*H01M 4/131* (2010.01)
*H01M 4/1391* (2010.01)
*H01M 4/505* (2010.01)
*H01M 4/587* (2010.01)
*H01M 10/0525* (2010.01)
*H01M 4/02* (2006.01)

(52) U.S. Cl.
CPC ......... *H01M 4/1391* (2013.01); *H01M 4/505* (2013.01); *H01M 4/587* (2013.01); *H01M 10/0525* (2013.01); *H01M 2004/021* (2013.01); *H01M 2004/028* (2013.01); *Y02T 10/7011* (2013.01)

(56) References Cited

U.S. PATENT DOCUMENTS

| | | |
|---|---|---|
| 5,783,333 A | 7/1998 | Mayer |
| 5,871,866 A | 2/1999 | Barker et al. |
| 5,910,382 A | 6/1999 | Goodenough et al. |
| 6,085,015 A | 7/2000 | Armand et al. |
| 6,514,640 B1 | 2/2003 | Armand et al. |
| 7,303,840 B2 | 12/2007 | Thackeray et al. |
| 7,635,536 B2 | 12/2009 | Johnson et al. |
| 7,790,308 B2 | 9/2010 | Johnson et al. |
| 7,892,679 B2 | 2/2011 | Shimizu et al. |
| 8,080,340 B2 | 12/2011 | Thackeray et al. |
| 8,877,381 B2 | 11/2014 | Yasuda et al. |
| 8,945,772 B2 | 2/2015 | Kawakami et al. |
| 9,225,003 B2 | 12/2015 | Yukawa |
| 9,281,522 B2 | 3/2016 | Vogler et al. |
| 9,562,303 B2 | 2/2017 | Vogler et al. |
| 2001/0010807 A1 | 8/2001 | Matsubara |
| 2002/0195591 A1 | 12/2002 | Ravet et al. |
| 2005/0123832 A1 | 6/2005 | Tsukuma et al. |
| 2006/0051671 A1 | 3/2006 | Thackeray et al. |
| 2009/0011335 A1 | 1/2009 | Takeda et al. |
| 2011/0076564 A1 | 3/2011 | Yu et al. |
| 2011/0200879 A1 | 8/2011 | Saito et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0308891 A1 | 12/2012 | Todoriki et al. |
| 2013/0202953 A1 | 8/2013 | Sharma et al. |
| 2014/0127568 A1 | 5/2014 | Kawakami et al. |
| 2014/0332715 A1 | 11/2014 | Kawakami et al. |
| 2015/0014605 A1 | 1/2015 | Kawakami et al. |
| 2015/0099178 A1 | 4/2015 | Kawakami et al. |
| 2017/0062819 A1* | 3/2017 | Ikenuma ............... H01M 4/505 |
| 2017/0179485 A1 | 6/2017 | Vogler et al. |

FOREIGN PATENT DOCUMENTS

| | | |
|---|---|---|
| CN | 102917981 A | 2/2013 |
| CN | 103155236 A | 6/2013 |
| CN | 103582968 A | 2/2014 |
| JP | 08-037007 A | 2/1996 |
| JP | 11-025983 A | 1/1999 |
| JP | 2007-200865 A | 8/2007 |
| JP | 2008-511960 | 4/2008 |
| JP | 2011-170994 A | 9/2011 |
| JP | 2012-099467 A | 5/2012 |
| JP | 2012-099468 A | 5/2012 |
| JP | 2012-169217 A | 9/2012 |
| JP | 2013-101978 A | 5/2013 |
| JP | 2013-538933 | 10/2013 |
| JP | 2013-246936 A | 12/2013 |
| KR | 2013-0106772 A | 9/2013 |
| KR | 2014-0044821 A | 4/2014 |
| TW | 201008879 | 3/2010 |
| TW | 201230477 | 7/2012 |
| WO | WO-2006/028476 | 3/2006 |
| WO | WO-2011/111364 | 9/2011 |
| WO | WO-2011/141486 | 11/2011 |
| WO | WO-2012/046669 | 4/2012 |
| WO | WO-2012/124242 | 9/2012 |
| WO | WO-2012/132387 | 10/2012 |
| WO | WO-2012/165358 | 12/2012 |

OTHER PUBLICATIONS

Wang.Z. et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

International Search Report (Application No. PCT/JP2014/076341) dated Nov. 18, 2014.

Written Opinion (Application No. PCT/JP2014/076341) dated Nov. 18, 2014.

McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.

Dreyer.D et al., "The Chemistry of Graphene Oxide", Chemical Society Reviews, Nov. 3, 2009, vol. 39, No. 1, pp. 228-240.

* cited by examiner

FIG. 11A1 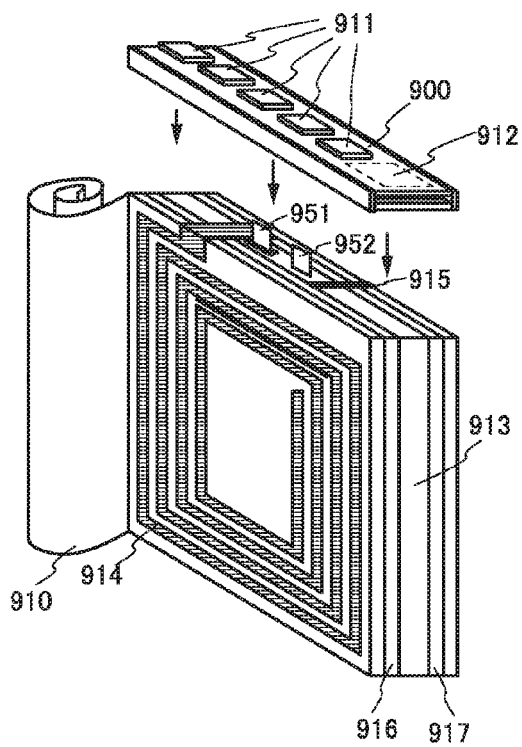
FIG. 11A2 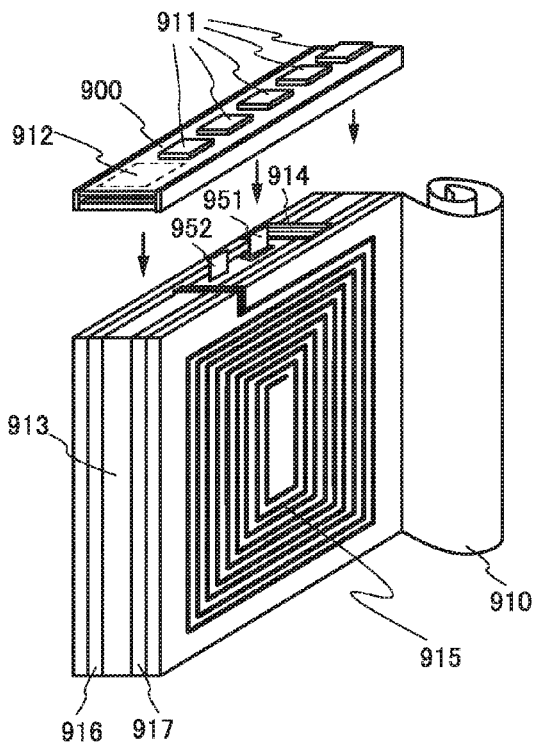
FIG. 11B1 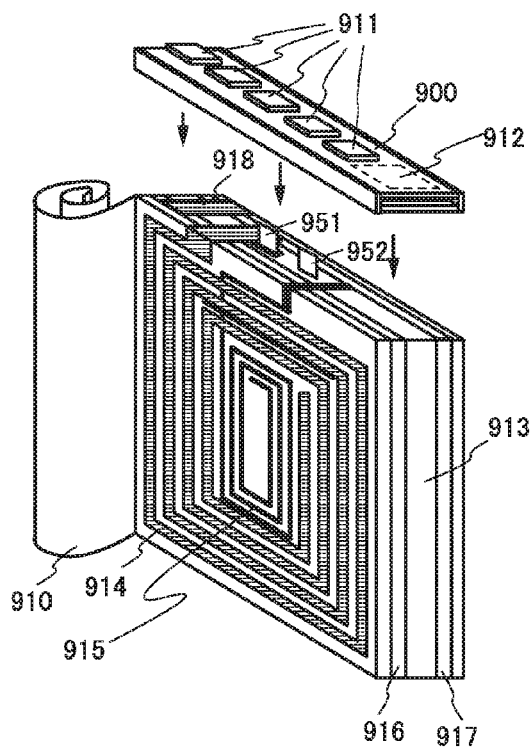
FIG. 11B2 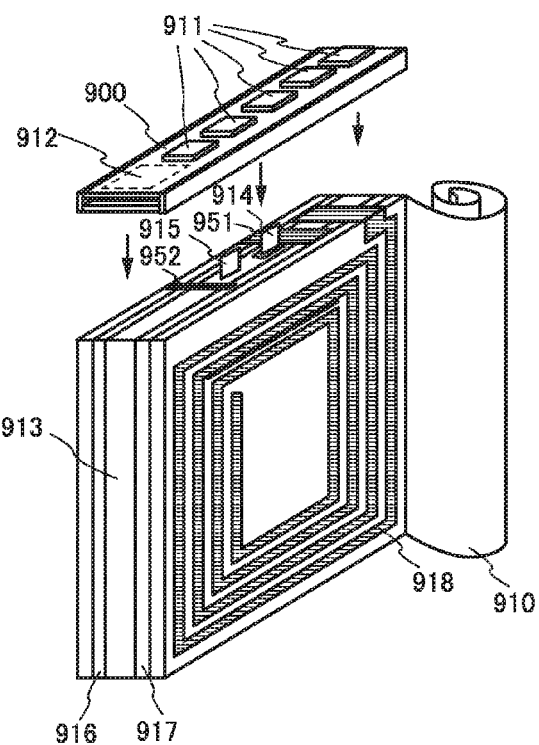

LITHIUM MANGANESE COMPOSITE OXIDE, SECONDARY BATTERY, ELECTRONIC DEVICE, AND METHOD FOR FORMING LAYER

TECHNICAL FIELD

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a structure of a secondary battery and a method for manufacturing the secondary battery. In particular, one embodiment of the present invention relates to a positive electrode active material of a lithium-ion secondary battery.

BACKGROUND ART

Examples of the secondary battery include a nickel-metal hydride battery, a lead-acid battery, and a lithium-ion secondary battery.

Such secondary batteries are used as power sources in portable information terminals typified by mobile phones. In particular, lithium-ion secondary batteries have been actively developed because the capacity thereof can be increased and the size thereof can be reduced.

As examples of positive electrode active materials of a lithium-ion secondary battery, phosphate compounds each having an olivine structure and containing lithium (Li) and iron (Fe), manganese (Mn), cobalt (Co), or nickel (Ni), such as lithium iron phosphate ($LiFePO_4$) lithium manganese phosphate ($LiMnPO_4$), lithium cobalt phosphate ($LiCoPO_4$), and lithium nickel phosphate ($LiNiPO_4$), which are disclosed in Patent Document 1, are known.

In addition, as described in Non-Patent Document 1, a method for evaluating the valence of metal in a metal oxide, and the like by electron energy loss spectroscopy (EELS) is known.

REFERENCE

[Patent Document 1] Japanese Published Patent Application No. H11-25983

[Non-Patent Document 1] Z. L. Wang et. al, "EELS analysis of cation valence states and oxygen vacancies in magnetic oxides", Micron, 2000, vol. 31, pp. 571-580

[Non-Patent Document 2] H. Tan et. al, "Oxidation state and chemical shift investigation in transition metal oxides by EELS", Ultramicroscopy, 2012, vol. 116, pp. 24-33

DISCLOSURE OF INVENTION

An object is to increase the volume density or weight density of lithium ions that can be received and released in and from a positive electrode active material to achieve high capacity and high energy density of a secondary battery.

Another object is to provide a positive electrode active material that can be manufactured at low cost.

Furthermore, high ionic conductivity and high electrical conductivity are required as the properties of a positive electrode active material of a lithium-ion secondary battery. Thus, another object is to provide a positive electrode active material having high ionic conductivity and high electrical conductivity.

Another object is to provide an electrode having high electrical conductivity. Another object is to provide an electrode having low resistance.

Another object is to provide a method for manufacturing an electrode having high electrical conductivity. Another object is to provide a method for manufacturing a positive electrode active material having high electrical conductivity of a lithium-ion secondary battery.

Another object is to provide a novel material. Another object is to provide a novel positive electrode active material. Another object is to provide a novel battery. Another object is to provide a novel lithium-ion secondary battery. Note that the descriptions of these objects do not disturb the existence of other objects.

In one embodiment of the present invention, there is no need to achieve all the objects. Other objects will be apparent from and can be derived from the description of the specification, the drawings, the claims, and the like.

One embodiment of the present invention is a lithium manganese composite oxide represented by $Li_xMn_yM_zO_w$ that includes a region belonging to a space group C2/c and is coated with a carbon-containing layer. Here, the element M is an element other than lithium and manganese. In the above structure, a region where $0 \le x/(y+z) < 2$, $y > 0$, $z > 0$, and $0.26 \le (y+z)/w < 0.5$ are satisfied is preferably included. Furthermore, in the above structure, the carbon-containing layer preferably includes a region with a thickness of greater than or equal to 1 mm and less than or equal to 10 nm. Moreover, the element M is preferably nickel.

Another embodiment of the present invention is a lithium manganese composite oxide represented by $Li_xMn_yM_zO_w$ that includes a region coated with a carbon-containing layer and in which the ratio of the integral intensity of $L_3$ peak to the integral intensity of $L_2$ peak of manganese that is obtained by EELS ($L_3/L_2$) is greater than or equal to 1.4 and less than or equal to 2.3. Here, the element M is an element other than lithium and manganese. In the above structure, a region where $0 \le x/(y+z) < 2$, $y > 0$, $z > 0$, and $0.26 \le (y+z)/w < 0.5$ are satisfied is preferably included. Furthermore, in the above structure, the carbon-containing, layer preferably includes a region with a thickness of greater than or equal to 1 nm and less than or equal to 10 nm. Moreover, the element M is preferably nickel.

Another embodiment of the present invention is a lithium manganese composite oxide represented by $Li_xMn_yM_zO_w$ that includes a region where $0 \le x/(y+z) < 2$, $y > 0$, $z > 0$, and $0.26 \le (y+z)/w < 0.5$ are satisfied and a region coated with a carbon-containing layer with a thickness of greater than or equal to 1 nm and less than or equal to 10 nm. Here, the element M is an element other than lithium and manganese. The element M is preferably nickel.

Another embodiment of the present invention is a method for forming a carbon-containing layer on the surface of a lithium manganese composite oxide represented by $Li_xMn_yM_zO_w$ by forming a layer containing graphene oxide on the surface of the lithium manganese composite oxide and then reducing the graphene oxide. Here, the element M is an element other than lithium and manganese.

A positive electrode active material that can be manufactured at low cost can be provided.

The volume density or weight density of lithium ions that can be received and released in and from a positive electrode active material can be increased to achieve high capacity and high energy density of a secondary battery.

A secondary battery having excellent cycle characteristics can be fabricated.

A positive electrode active material having high ionic conductivity and high electrical conductivity can be provided.

High capacity and high energy density of a positive electrode of a lithium-ion secondary battery can be achieved.

High capacity and high energy density of a lithium-ion secondary battery can be achieved.

A novel material can be provided. A novel positive electrode active material can be provided. A novel battery can be provided. A novel lithium-ion secondary battery can be provided.

Note that the description of these effects does not disturb the existence of other effects. One embodiment of the present invention does not have to achieve all the objects listed above. Other effects will be apparent from and can be derived from the description of the specification, the drawings, the claims, and the like.

BRIEF DESCRIPTION OF DRAWINGS

In the accompanying drawings:

FIGS. 11A1 to 11B2 illustrate examples of power storage devices;

BEST MODE FOR CARRYING OUT THE INVENTION

Figure 1:
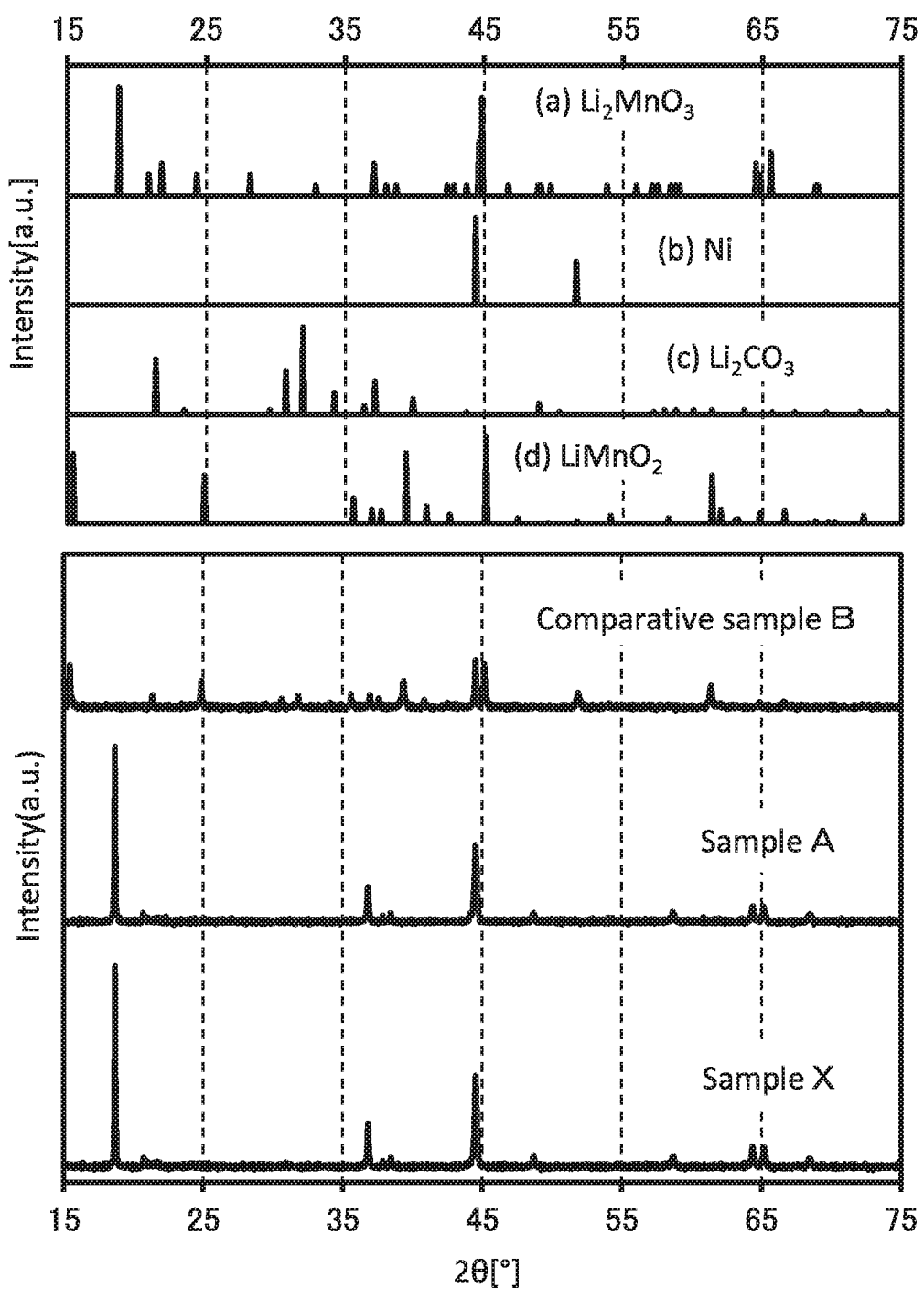
FIG. 1 is graphs showing a measurement result of X-ray diffraction in one embodiment of the present invention and a measurement result of X-ray diffraction in a comparative example.

Embodiments and examples of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to the description of the embodiments and examples.

(Embodiment 1)

[Synthesizing Lithium Manganese Composite Oxide]

A method for manufacturing a lithium manganese composite oxide represented by $Li_xMn_yM_zO_w$ will be described in detail below. Here, the element M is preferably silicon, phosphorus, or a metal element other than lithium and manganese. Furthermore, it is preferable that $0 \leq x/(y+z)<2$, $y>0$, $z>0$, and $0.26 \leq (y+z)/w<0.5$ be satisfied. Here, the lithium manganese composite oxide is an oxide containing at least lithium and manganese. The lithium manganese composite oxide may contain another metal, or an element such as silicon or phosphorus.

Although an example where Ni is used as the element M is described in this embodiment, a similar effect can be obtained even when silicon, phosphorus, or a metal element other than lithium and manganese is used.

First, starting materials $Li_2CO_3$, $MnCO_3$, and NiO are weighed.

In this embodiment, the ratio of the materials is adjusted to form a lithium manganese composite oxide having a layered rock-salt structure and a spine structure in each particle.

When the ratio of $Li_2CO_3$ to $MnCO_3$ and NiO is 1:0.7:0.3, $Li_2Mn_{0.7}Ni_{0.3}O_3$ is formed. Thus, it is important to change this ratio.

In this embodiment, $Li_2CO_3$, $MnCO_3$, and NiO are weighed such that the ratio of $Li_2CO_3$ to $MnCO_3$ and NiO is 0.84:0.8062:0.318. Note that the ratio is represented as a molar ratio. Acetone is added to the powder of these materials, and then, they are mixed in a ball mill to prepare mixed powder.

After that, heating is performed to volatilize acetone, so that a mixed material is obtained.

Then, the mixed material is put into a melting pot, and is fired at a temperature in the range from 800° C. to 1100° C. in the air for 5 to 20 hours inclusive to synthesize a novel material.

Subsequently, grinding is performed to separate the sintered particles. For the grinding, acetone is added and then mixing is performed in a ball mill.

After the grinding, heating is performed to volatilize acetone, and then, vacuum drying is performed, so that a powdery lithium manganese composite oxide is obtained.

In this embodiment, $Li_2CO_3$, $MnCO_3$, and NiO are used as starting materials; however, materials are not particularly limited thereto and any other material may be used as long as a lithium manganese composite oxide having a spinel structure on part of the surface of each particle with a layered rock-salt structure can be formed.

[Coating with Carbon-containing Layer]

The obtained lithium manganese composite oxide is coated with a carbon-containing layer. Here, graphene oxide is used as an example of a coating material.

Note that graphene in this specification refers to single-layer graphene or multilayer graphene including two or more and a hundred or less layers. Single-layer graphene refers to a one-atom-thick sheet of carbon molecules. Graphene oxide refers to a compound formed by oxidation of such graphene. When graphene oxide is reduced to form a carbon material, oxygen contained in the graphene oxide is not entirely released and partly remains in the carbon material. In the case where the carbon material formed by reducing the graphene oxide contains oxygen, the proportion of the oxygen measured by XPS is higher than or equal to 2% and lower than or equal to 20%, preferably higher than or equal to 3% and lower than or equal to 15% of the total of the proportions of elements detected by XPS.

Graphene oxide can be formed by various synthesis methods such as a Hummers method, a modified Hummers method, and oxidation of graphite.

For example, in a Hummers method, graphite such as flake graphite is oxidized to give graphite oxide. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm.

Next, a method for covering the lithium manganese composite oxide with graphene oxide will be described. Graphene oxide and water are put in a mixer to form an aqueous dispersion of graphene oxide. Then, the lithium manganese composite oxide is put in the aqueous dispersion and the mixture is kneaded. Here, kneading refers to mixing in a highly viscous state. The kneading can separate aggregation of lithium manganese composite oxide powder, uniformly dispersing the lithium manganese composite oxide and the graphene oxide.

The obtained mixture is dried under reduced pressure in a bell jar and then ground in a mortar, so that the lithium manganese composite oxide covered with graphene oxide is obtained.

[Reducing Graphene Oxide]

Then, the graphene oxide covering the surface of the lithium manganese composite oxide is reduced. The reducing the graphene oxide may be performed by heat treatment or by causing a reaction in a solvent containing a reducing agent. Here, the reduction is performed by causing a reaction in a solvent containing a reducing agent.

Examples of the reducing agent include ascorbic acid, hydrazine, dimethyl hydrazine, hydroquinone, sodium boron hydride ($NaBH_4$), tetra butyl ammonium bromide (TBAB), $LiAlH_4$, ethylene glycol, polyethylene glycol, N,N-diethylhydroxylamine, and a derivative thereof.

A polar solvent can be used as the solvent. Any material can be used for the polar solvent as long as it can dissolve the reducing agent. Examples of the material of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

Then, the solution is filtered by suction filtration or the like.

After that, washing and drying are performed. The drying is preferably performed in a reduced pressure (vacuum) atmosphere or a reduction atmosphere. This drying step is preferably performed at, for example, 50° C. to 200° C. inclusive in vacuum for 1 hour to 48 hours inclusive. The drying allows evaporation, volatilization, or removal of the polar solvent and moisture.

Note that heating can facilitate the reduction reaction. After drying following the chemical reduction, heating may further be performed.

Through the above steps, the graphene oxide is reduced, so that the carbon-containing layer can be formed on the surface of the lithium manganese composite oxide. Note that it is possible that oxygen in the graphene oxide is not necessarily entirely released and partly remains in the carbon-containing layer. When the carbon-containing layer contains oxygen, the proportion of the oxygen measured by XPS is higher than or equal to 2% and lower than or equal to 20%, preferably higher than or equal to 3% and lower than or equal to 15% of the total of the proportions of elements detected by XPS.

The thickness of the carbon-containing layer formed on the surface of the lithium manganese composite oxide is preferably greater than or equal to 1 nm and less than or equal to 10 nm.

(Embodiment 2)

In this embodiment, the structure of a storage battery including a positive electrode active material manufactured by the manufacturing method described in Embodiment 1 will be described with reference to FIG. 6A and 6B, FIGS. 7A1, 7A2, 7B1, and 7B2, and FIGS. 8A and 8B.

(Coin-type Storage Battery)

Figure 6A:
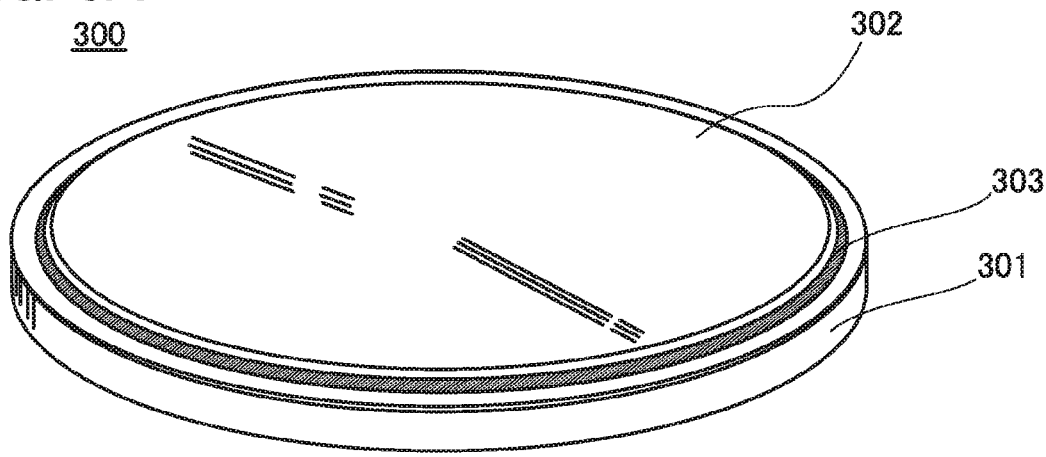
FIGS. 6A to 6C illustrate a coin-type storage battery.
Figure 6B:
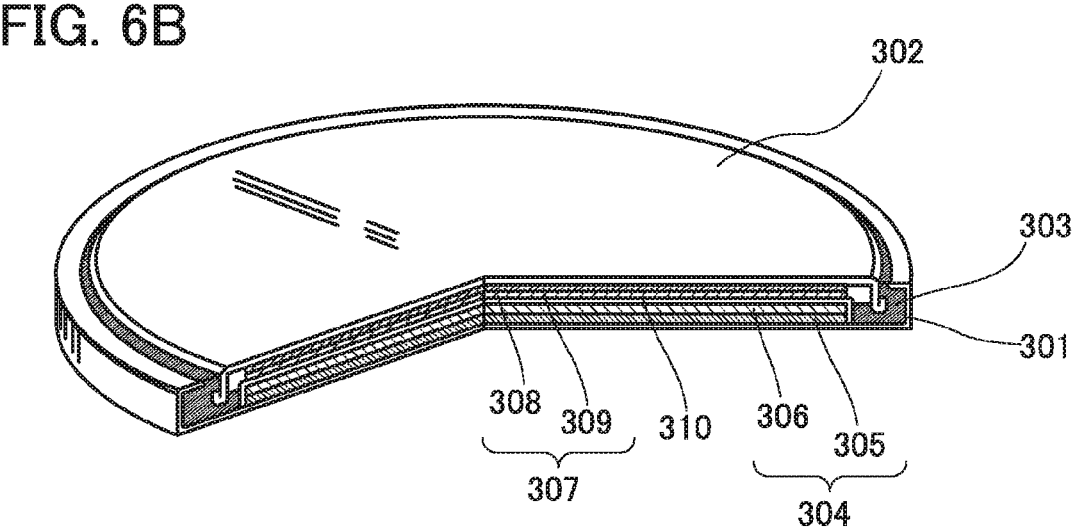

FIG. 6A is an external view of a coin-type (single-layer flat type) storage battery, and FIG. 6B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

A material with which lithium can be dissolved and precipitated or a material into and from which lithium ions can be inserted and extracted can be used for the negative electrode active materials used for the negative electrode active material layer 309; for example, a lithium metal, a carbon-based material, and an alloy-based material can be used. The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (e.g., lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active materials, an alloy-based material which enables charge-discharge reactions by an alloying reaction and a dealloying reaction with lithium metal can be used. In the case where carrier ions are lithium ions, a material containing at least one of Ga, Al, Si, Ge, Sn, Pb, Sb, Bi, Ag, Au, Zn, Cd, In, and the like can be used for example. Such elements have higher capacity than carbon. In particular, silicon has a significantly high theoretical capacity of 4200 mAh/g. For this reason, silicon is preferably used for the negative electrode active materials. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, SiO refers to a film in which the silicon content is higher than that in $SiO_2$.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), and molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The current collectors 305 and 308 can each be formed using a highly conductive material which is not alloyed with a carrier ion of lithium among other elements, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 μm to 30 μm inclusive.

The positive electrode active materials described in Embodiment 1 can be used for the positive electrode active material layer 306.

As the separator 310, an insulator such as cellulose (paper), polyethylene, and polypropylene with pores can be used.

As an electrolyte of an electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, alkaline-earth metal ions, beryllium ions, or magnesium ions, instead of lithium in the above lithium salts, an alkali metal (e.g., sodium and potassium), an alkaline-earth metal (e.g., calcium, strontium, barium, beryllium, and magnesium) may be used for the supporting electrolyte.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably coated with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 6B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 6C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 6C:
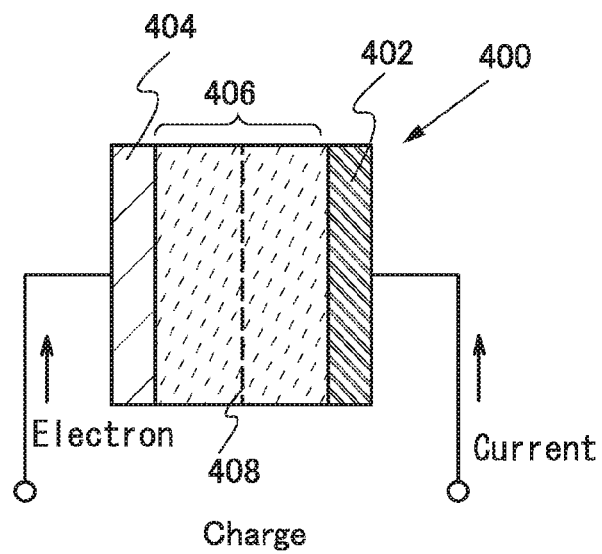

Two terminals in FIG. 6C are connected to a charger, and a storage battery 400 is charged. As the charge of the storage battery 400 proceeds, a potential difference between electrodes increases. The positive direction in FIG. 6C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

[Cylindrical Storage Battery]

Figure 7A:
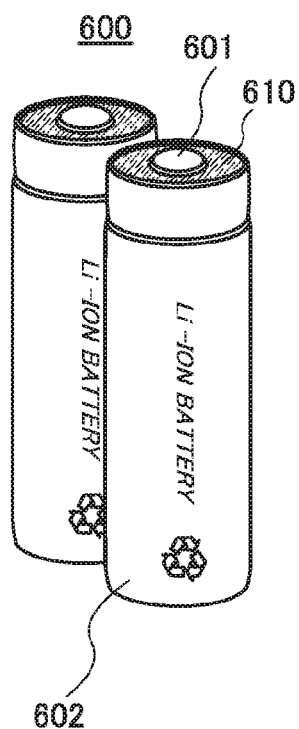
FIGS. 7A and 7B illustrate a cylindrical storage battery.

Next, an example of a cylindrical storage battery will be described with reference to FIGS. 7A and 7B. As illustrated in FIG. 7A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 7B:
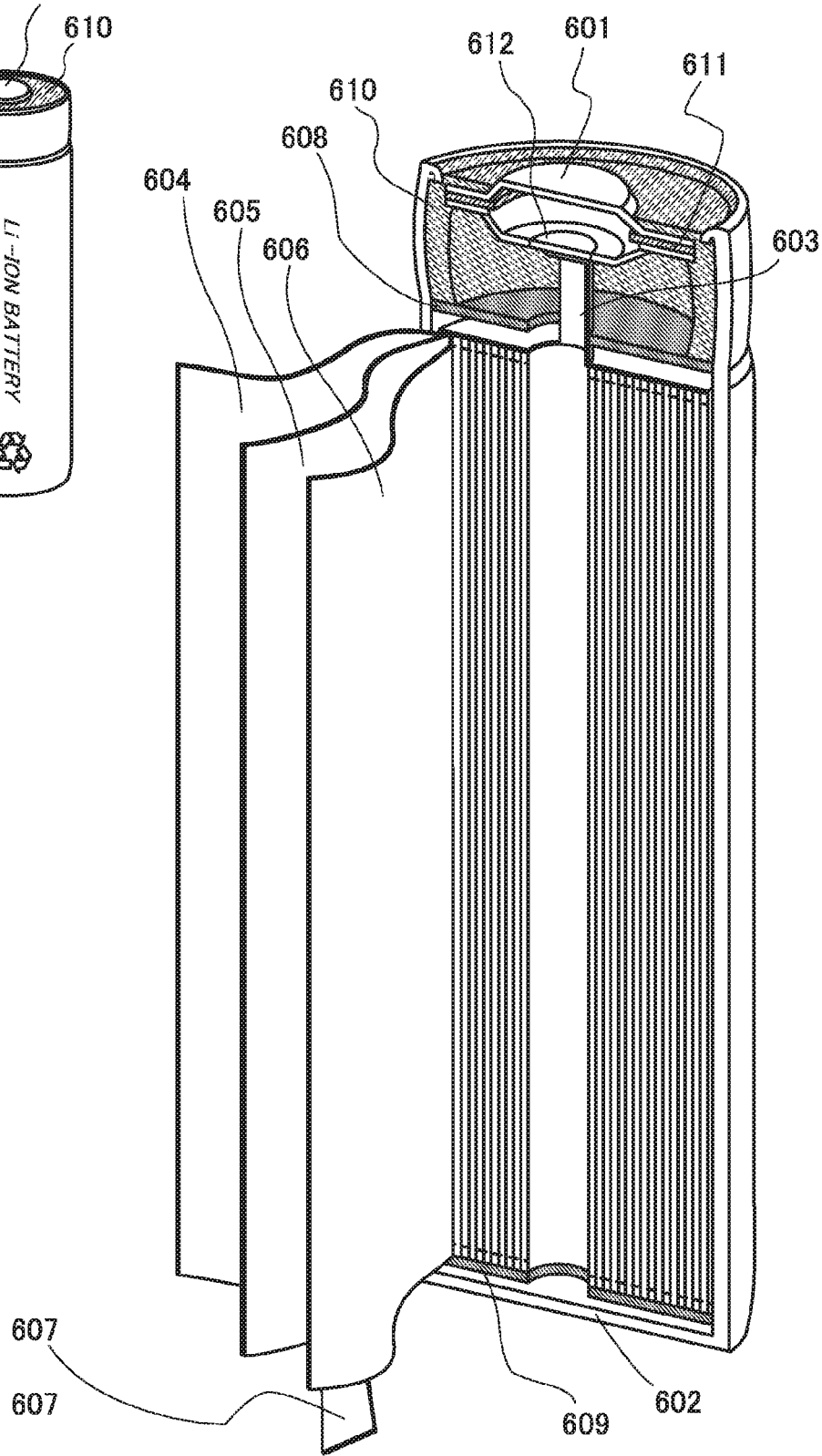

FIG. 7B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably coated with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a non-aqueous electrolytic solution (not illustrated) is injected inside the battery can 602 provided with the battery element.

As the nonaqueous electrolytic solution, a nonaqueous electrolytic solution that is similar to those of the coin-type storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

[Laminated Storage Battery]

Next, an example of a laminated storage battery will be described with reference to FIG. 8A. When a flexible laminated storage battery is used in an electronic device at least part of which is flexible, the storage battery can be bent as the electronic device is bent.

Figure 8A:
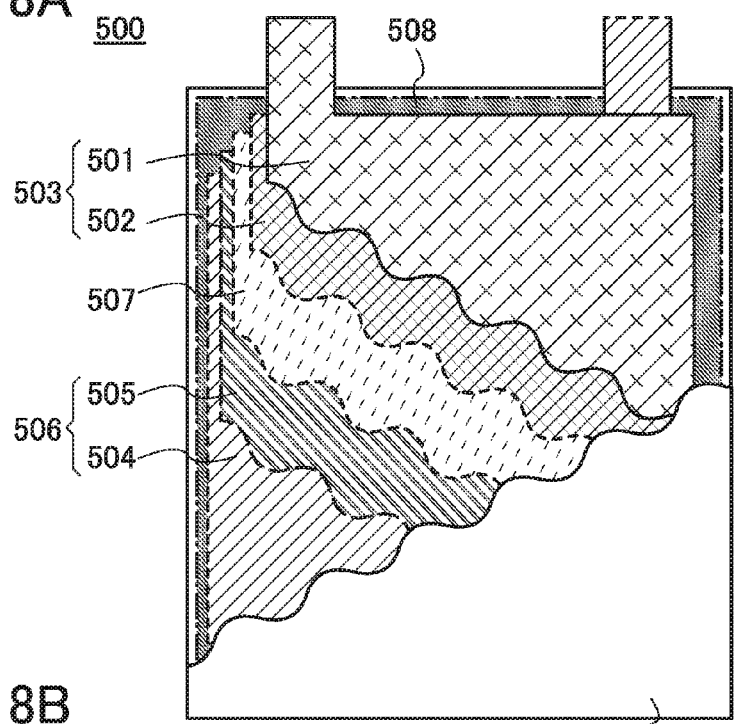
FIGS. 8A and 8B illustrate a laminated storage battery.

A laminated storage battery 500 illustrated in FIG. 8A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509. The positive electrode active materials described in Embodiment 1 can be used for the positive electrode active material layer 502.

In the laminated storage battery 500 illustrated in FIG. 8A, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Figure 8B:
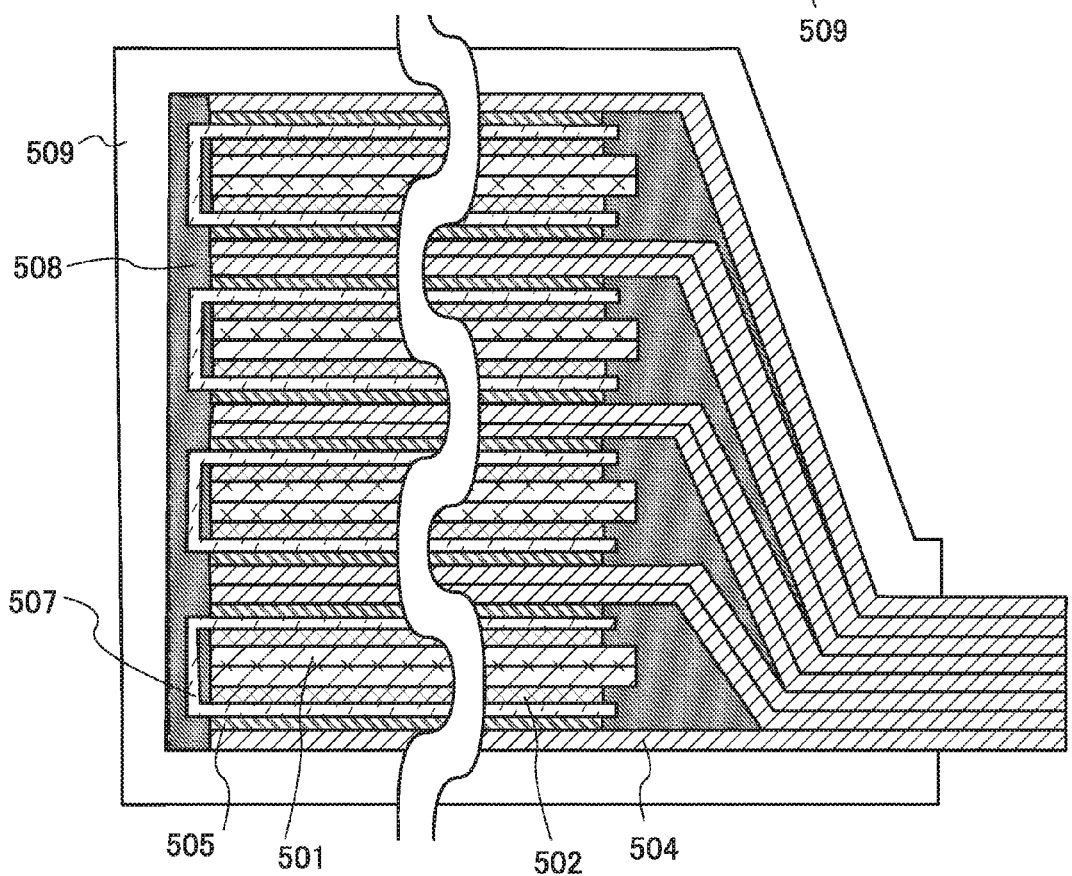

FIG. 8B illustrates an example of a cross-sectional structure of the laminated storage battery 500. FIG. 8A illustrates an example of including only two current collectors for simplicity, and the actual battery includes a plurality of electrode layers.

The example in FIG. 8B includes 16 electrode layers. The laminated storage battery 500 has flexibility even though including 16 electrode layers. In FIG. 8B, 8 negative electrode current collectors 504 and 8 positive electrode current collectors 501 are included. Note that FIG. 8B illustrates a cross section of the lead portion of the negative electrode, and 8 negative electrode current collectors 504 are bonded to each other by ultrasonic welding. It is needless to say that the number of electrode layers is not limited to 16, and may be more than 16 or less than 16. In the case of using a large number of electrode layers, the storage battery can have high capacity. In contrast, in the case of using a small number of electrode layers, the storage battery can have a small thickness and high flexibility.

Figure 34:
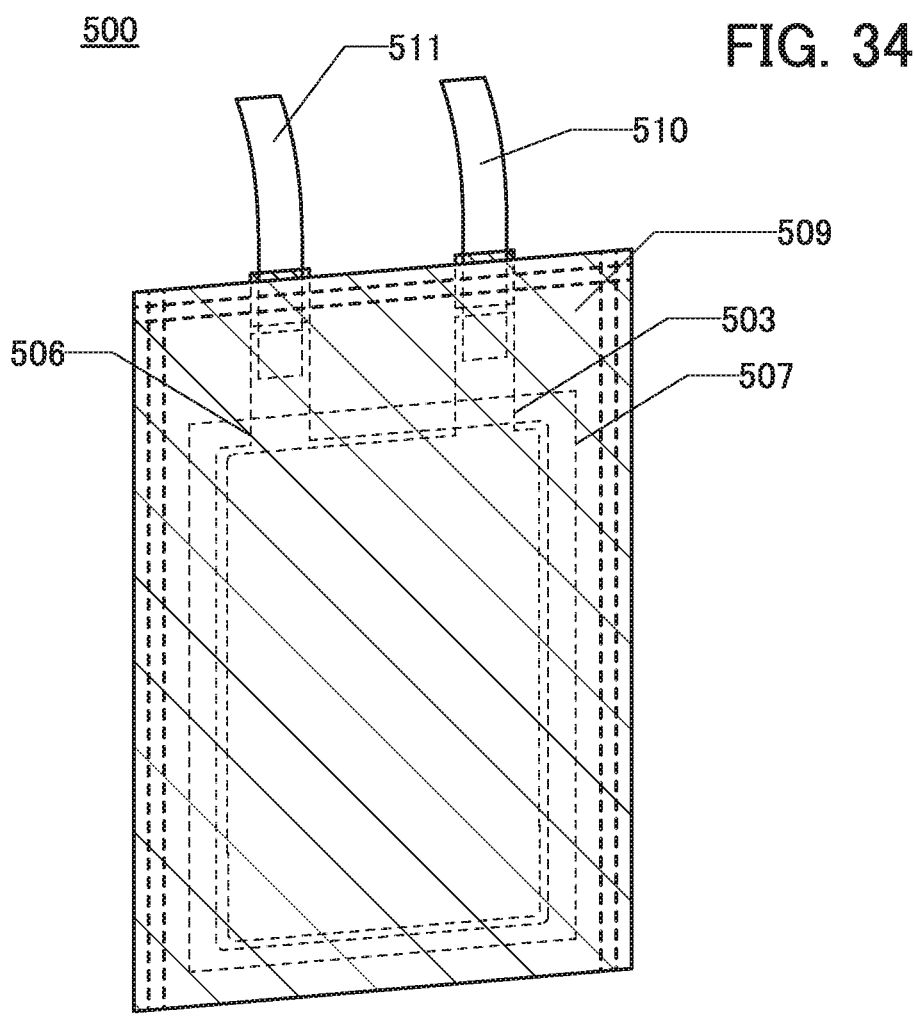
FIG. 34 is an external view of a storage battery.
Figure 35:
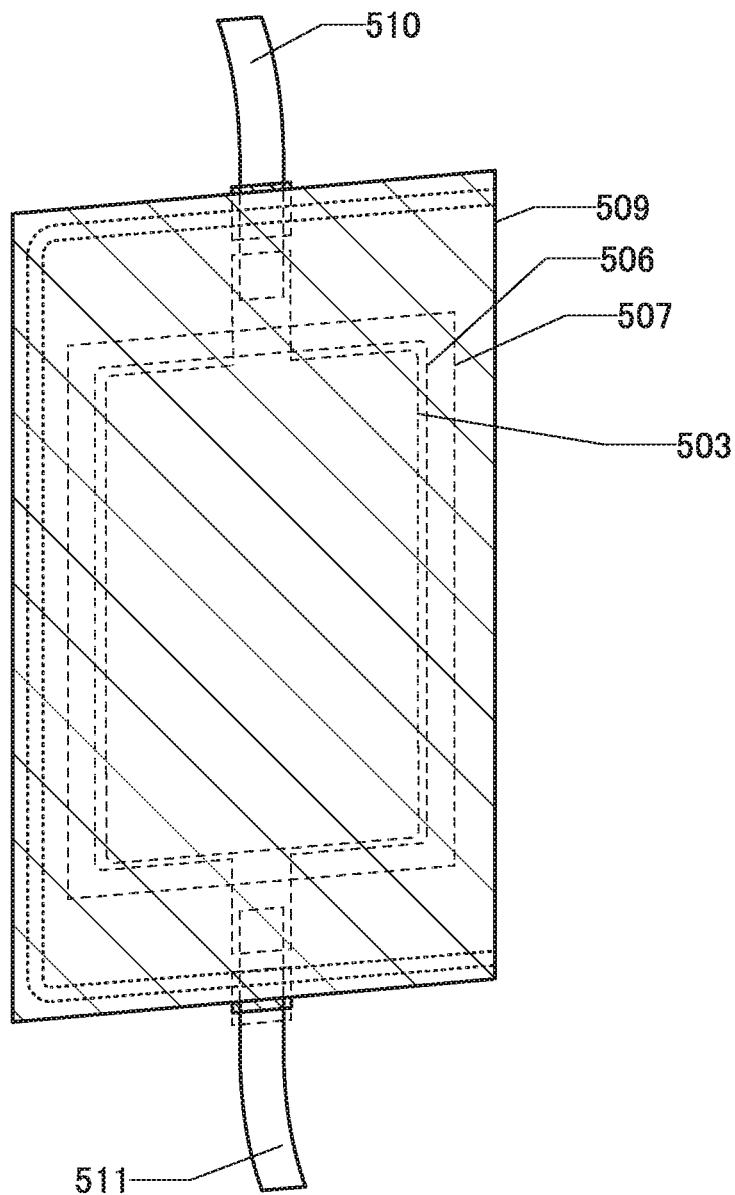
FIG. 35 is an external view of a storage battery.

FIGS. 34 and 35 each illustrate an example of the external view of the laminated storage battery 500. In FIGS. 34 and 35, the positive electrode 503, the negative electrode 506, the separator 507, the exterior body 509, a positive electrode lead electrode 510, and a negative electrode lead electrode 511 are included.

Figure 36A:
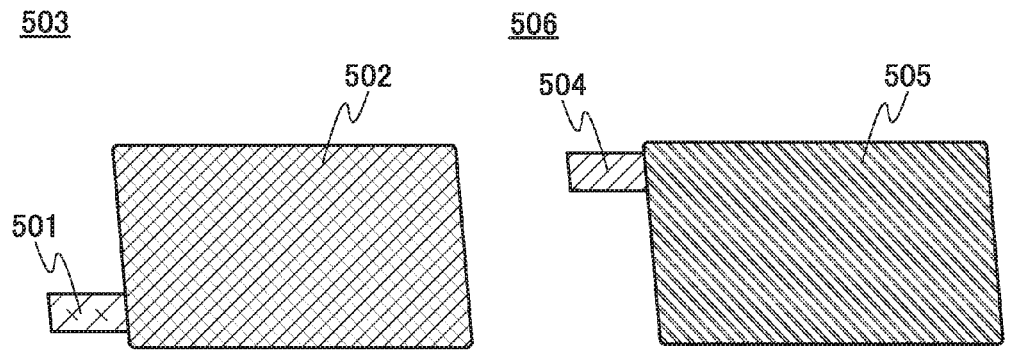
FIGS. 36A to 36C illustrate a method for fabricating a storage battery

FIG. 36A illustrates the external views of the positive electrode 503 and the negative electrode 506. The positive electrode 503 includes the positive electrode current collector 501, and the positive electrode active material layer 502 is formed over a surface of the positive electrode current collector 501. The positive electrode 503 also includes a region where the positive electrode current collector 501 is partly exposed (hereinafter also referred to as a tab region). The negative electrode 506 includes the negative electrode current collector 504, and the negative electrode active material layer 505 is formed over a surface of the negative electrode current collector 504. The negative electrode 506 also includes a region where the negative electrode current collector 504 is partly exposed, that is, a tab region. The areas and shapes of the tab regions included in the positive electrode and negative electrode are not limited to those illustrated in FIG. 36A.

[Method for Fabricating Laminated Storage Battery]

Figure 36B:
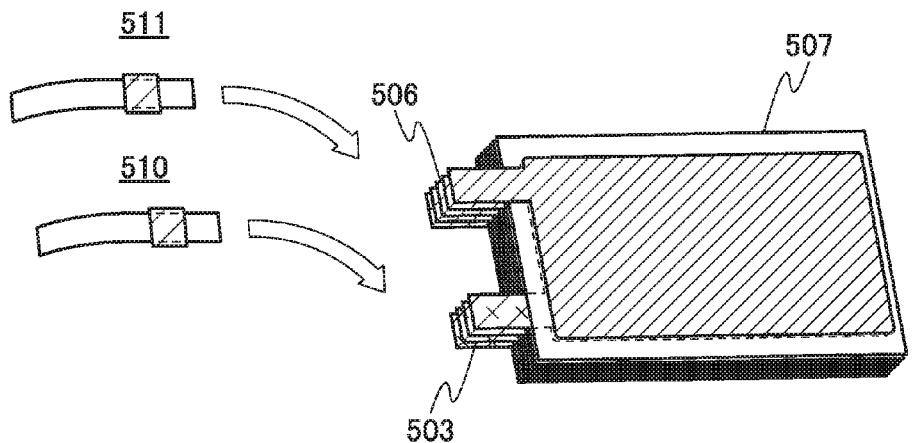

Here, an example of a method for fabricating the laminated storage battery whose external view is illustrated in FIG. 34 will be described with reference to FIGS. 36B and 36C.

First, the negative electrode 506, the separator 507, and the positive electrode 503 are stacked. FIG. 36B illustrates a stack including the negative electrode 506, the separator 507, and the positive electrode 503. The battery described here as an example includes 5 negative electrodes and 4 positive electrodes. Next, the tab regions of the positive electrodes 503 are bonded to each other, and the tab region of the positive electrode of the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode of the outermost surface and the negative electrode lead electrode 511 are bonded to each other.

After that, the negative electrode 506, the separator 507, and the positive electrode 503 are placed over the exterior body 509.

Figure 36C:
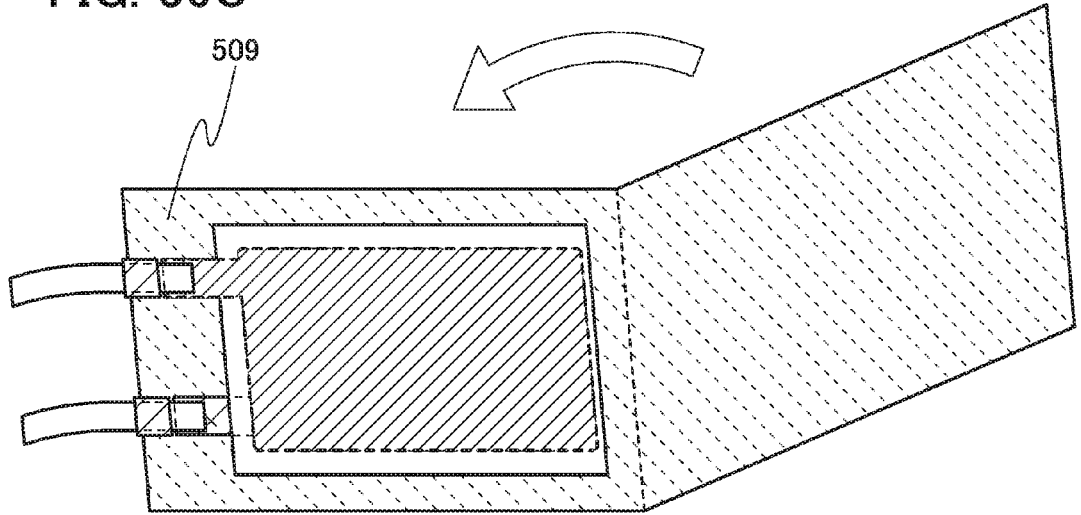

Subsequently, the exterior body 509 is folded along a dashed line as illustrated in FIG. 36C. Then, the outer edge of the exterior body 509 is bonded. The bonding can be performed by thermocompression, for example. At this time, a part (or one side) of the exterior body 509 is left unbonded (to provide an inlet) so that the electrolytic solution 508 can be introduced later.

Next, the electrolytic solution 508 is introduced into the exterior body 509 from the inlet of the exterior body 509. The electrolytic solution 508 is preferably introduced in a reduced pressure atmosphere or in an inert gas atmosphere. Lastly, the inlet is bonded. In the above manner, the laminated storage battery 500 can be fabricated.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

For each of the positive electrodes of the storage batteries 300, 500, and 600, which are described in this embodiment, the positive electrode active material layer of one embodiment of the present invention can be used. Thus, the discharge capacity of the storage batteries 300, 500, and 600 can be increased.

FIGS. 9A to 9E illustrate examples of electronic devices including flexible laminated storage batteries. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 9A:
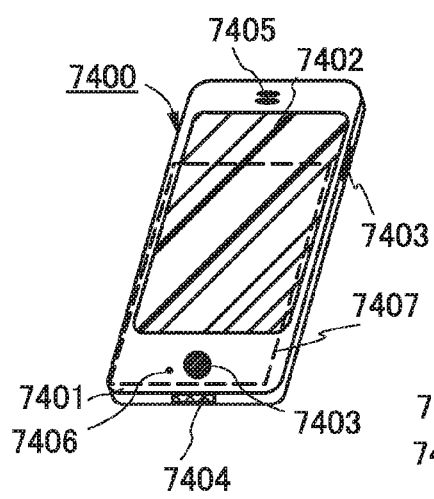
FIGS. 9A to 9E illustrate flexible laminated storage batteries.

FIG. 9A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 9B:
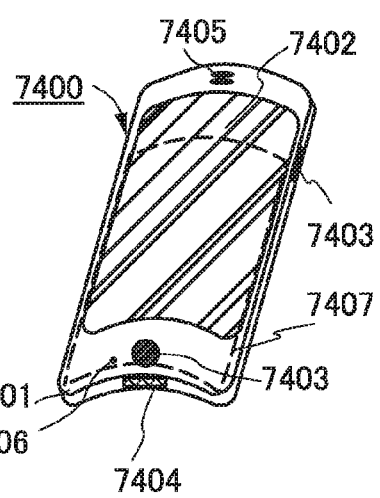
Figure 9C:
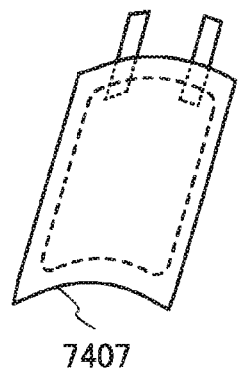

FIG. 9B illustrates the mobile phone 7400 that is bent. When the whole mobile phone 7400 is bent by the external force, the power storage device 7407 included in the mobile phone 7400 is also bent. FIG. 9C illustrates the bent power storage device 7407. The power storage device 7407 is a laminated storage battery.

Figure 9D:
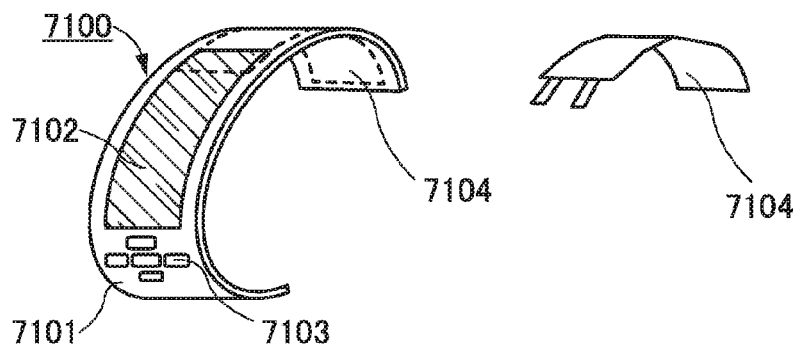
Figure 9E:
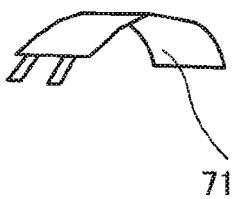

FIG. 9D illustrates an example of a bangle display device. A portable display device 7100 includes a housing 7101, a display portion 7102, an operation button 7103, and a power storage device 7104. FIG. 9E illustrates the bent power storage device 7104.

[Structural Example of Power Storage Device]

Structural examples of power storage devices (storage batteries) will be described with reference to FIGS. 10A and 10B, FIGS. 11A1 to 11B2, FIGS. 12A and 12B, FIGS. 13A and 13B, and FIG. 14.

Figure 10A:
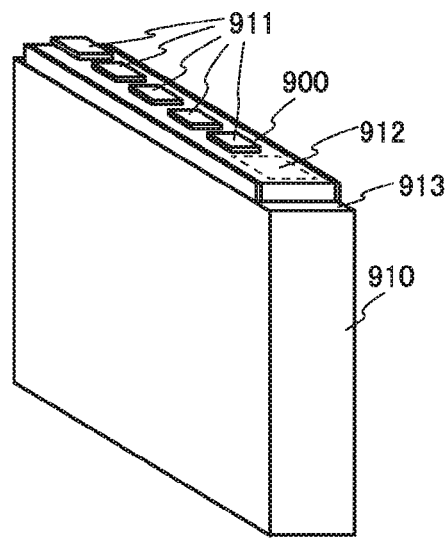
FIGS. 10A and 10B illustrate an example of a power storage device.
Figure 10B:
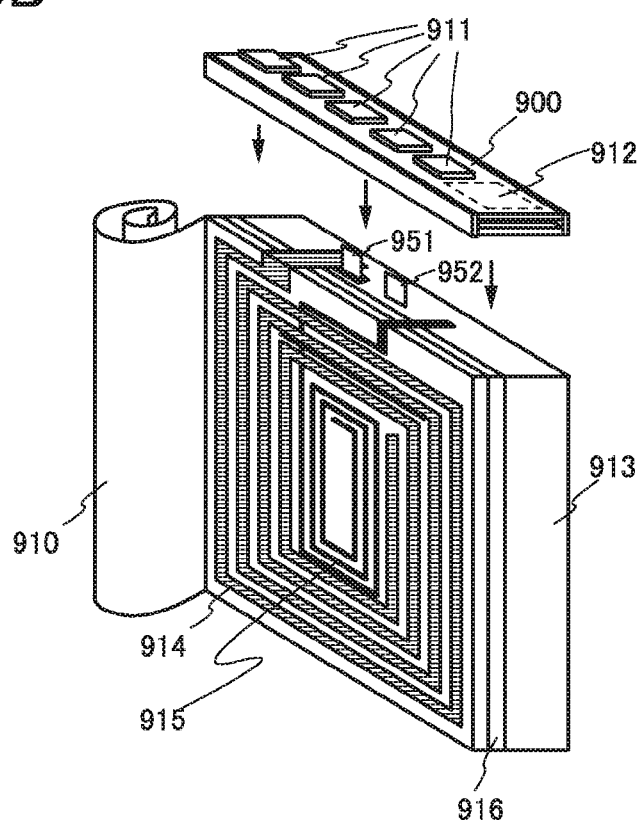

FIGS. 10A and 10B are external views of a power storage device. The power storage device includes a circuit board 900 and a storage battery 913. A label 910 is attached to the storage battery 913. As shown in FIG. 10B, the power storage device further includes a terminal 951 and a terminal 952, and includes an antenna 914 and an antenna 915 between the storage battery 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the storage battery 913 and the antennas 914 and 915. The layer 916 may have a function of preventing an adverse effect on an electromagnetic field by the storage battery 913. As the layer 916, for example, a magnetic body can be used.

Note that the structure of the power storage device is not limited to that shown in FIGS. 10A and 10B.

Figure 2:
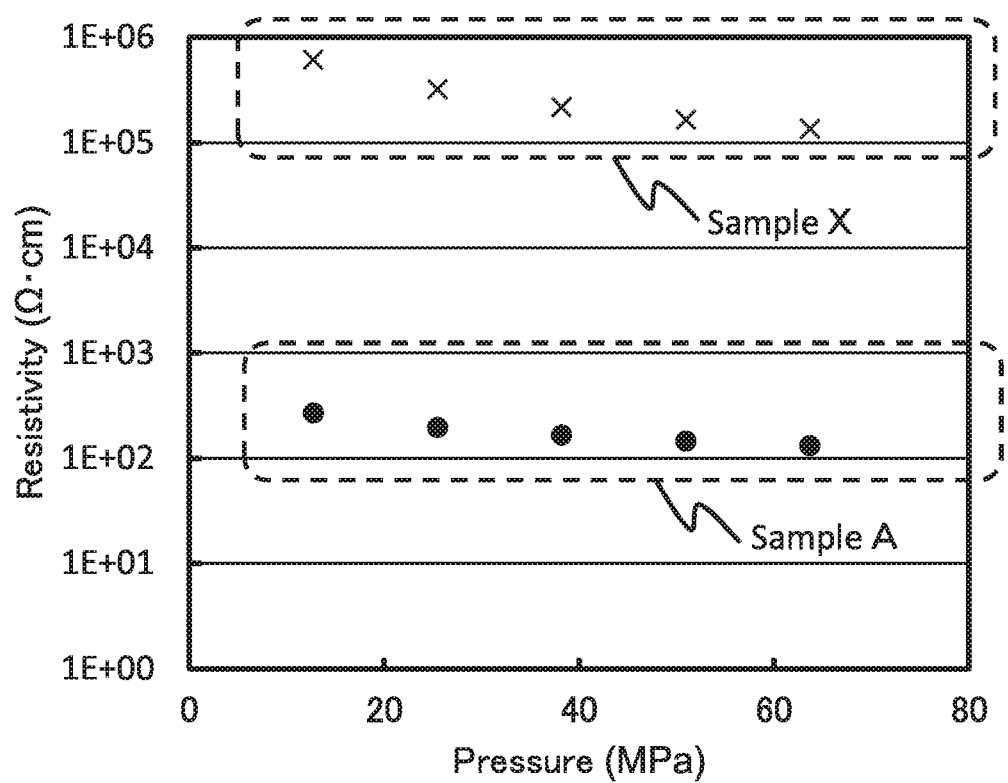
FIG. 2 is a graph showing measurement results of conductivities in one embodiment of the present invention.

For example, as shown in FIGS. 11A1 and 11A2, two opposite surfaces of the storage battery 913 in FIGS. 10A and 10B may be provided with respective antennas. FIG. 11A1 is an external view showing one side of the opposite surfaces, and FIG. 11A2 is an external view showing the other side of the opposite surfaces. For portions similar to those in FIGS. 10A and 10B, a description of the power storage device illustrated in FIGS. 10A and 10B can be referred to as appropriate.

As illustrated in FIG. 11A1, the antenna 914 is provided on one of the opposite surfaces of the storage battery 913 with the layer 916 interposed therebetween, and as illustrated in FIG. 11A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 11B1 and 11B2, two opposite surfaces of the storage battery 913 in FIGS. 10A and 10B may be provided with different types of antennas. FIG. 11B1 is an external view showing one side of the opposite surfaces, and FIG. 11B2 is an external view showing the other side of the opposite surfaces. For portions similar to those in FIGS. 10A and 10B, a description of the power storage device illustrated in FIGS. 10A and 10B can be referred to as appropriate.

As illustrated in FIG. 11B1, the antenna 914 is provided on one of the opposite surfaces of the storage battery 913 with the layer 916 interposed therebetween, and as illustrated in FIG. 11B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and another device, a response method that can be used between the power storage device and another device, such as NFC, can be employed.

Figure 12A:
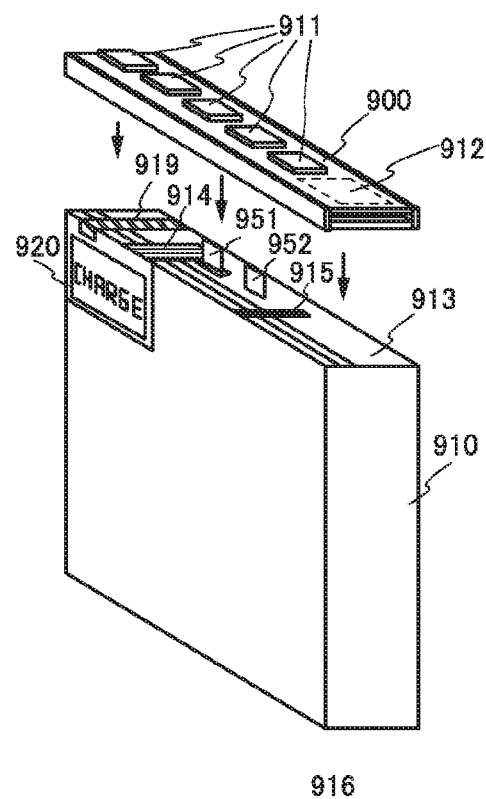
FIGS. 12A and 12B illustrate examples of power storage devices.

Alternatively, as illustrated in FIG. 12A, the storage battery 913 in FIGS. 10A and 10B may be provided with a display device 920. The display device 920 is electrically connected to the terminal 911 via a terminal 919. It is possible that the label 910 is not provided in a portion where the display device 920 is provided. For portions similar to those in FIGS. 10A and 10B, a description of the power storage device illustrated in FIGS. 10A and 10B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 12B:
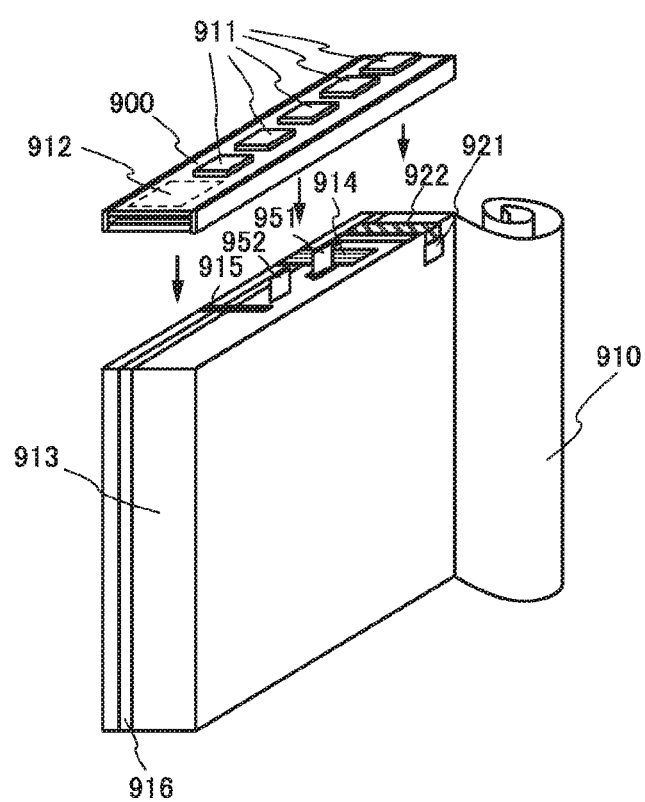

Alternatively, as illustrated in FIG. 12B, the storage battery 913 illustrated in FIGS. 10A and 10B may be provided with a sensor 921. The sensor 921 is electrically connected to the terminal 911 via a terminal 922. Note that the sensor 921 may be provided between the storage battery 913 and the label 910. For portions similar to those in FIGS. 10A and 10B, a description of the power storage device illustrated in FIGS. 10A and 10B can be referred to as appropriate.

The sensor 921 has a function of measuring, for example, displacement, position, speed, acceleration, angular velocity, rotational frequency distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the power storage device is placed can be determined and stored in a memory inside the circuit 912.

Furthermore, structural examples of the storage battery 913 will be described with reference to FIGS. 13A and 13B and FIG. 14.

Figure 13A:
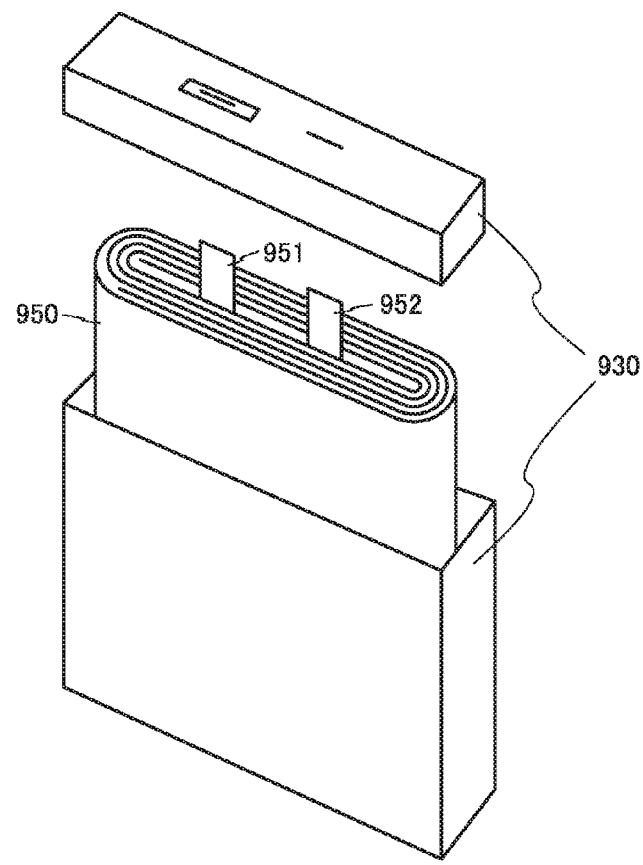
FIGS. 13A and 13B illustrate example of power storage devices.

The storage battery 913 illustrated in FIG. 13A includes a wound body 950 provided with the terminals 951 and 952 inside a housing 930. The wound body 950 is soaked in an electrolytic solution inside the housing 930. The terminal 952 is in contact with the housing 930. An insulator or the like prevents contact between the terminal 951 and the housing 930. Note that in FIG. 13A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 13B:
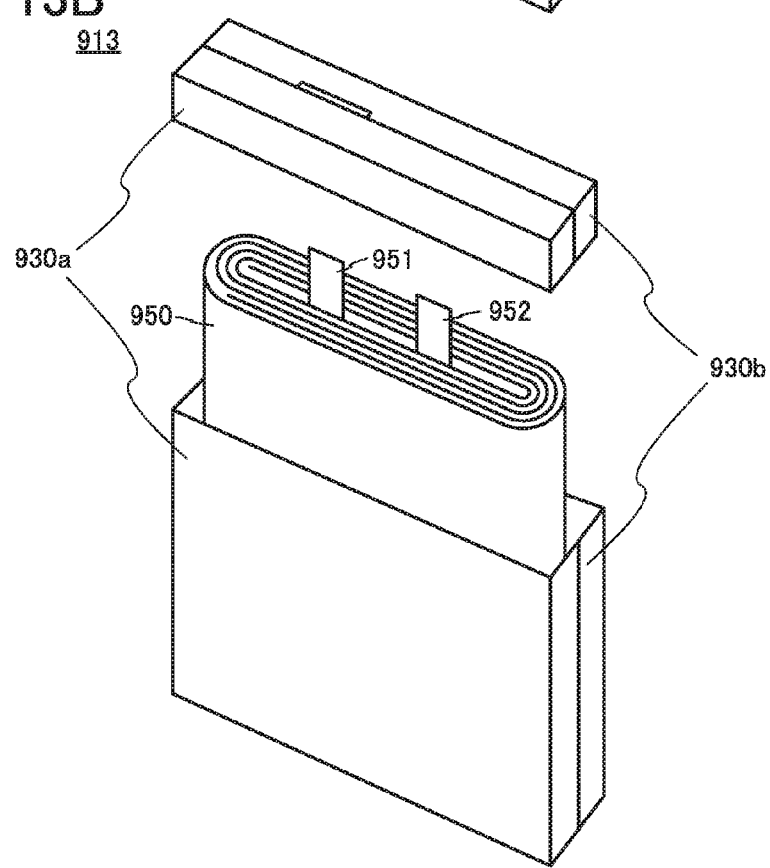

Note that as illustrated in FIG. 13B, the housing 930 in FIG. 13A may be formed using a plurality of materials. For example, in the storage battery 913 in FIG. 13B, a housing 930a and a housing 930b are bonded to each other and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the storage battery 913 can be prevented. When an electric field is not significantly blocked by the housing 930a, an antenna such as the antennas 914 and 915 may be provided inside the housing 930a. For the housing 930b, a metal material can be used, for example.

Figure 14:
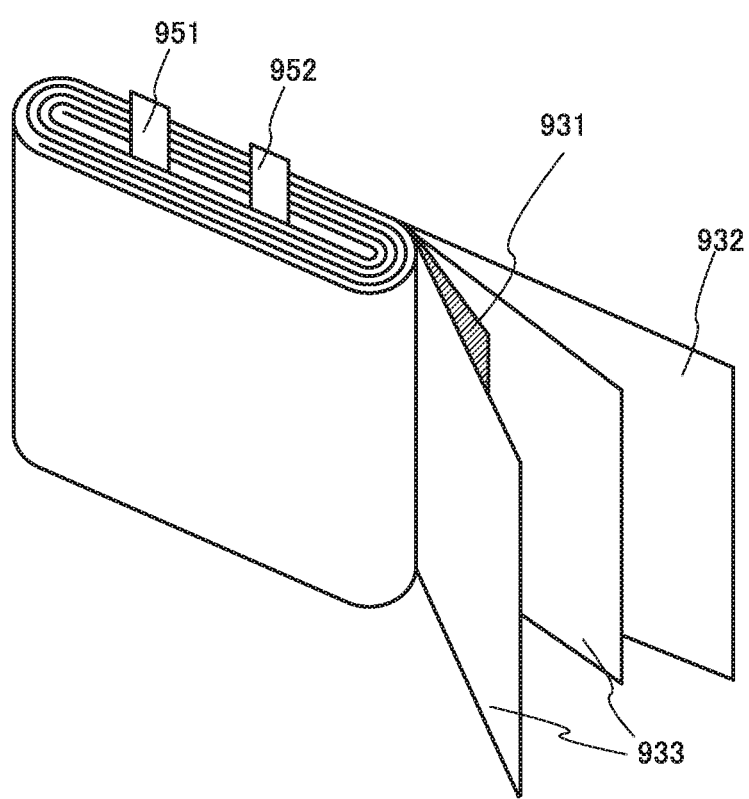
FIG. 14 illustrates an example of a power storage device.

FIG. 14 illustrates the structure of the wound body 950. The wound body 950 includes a negative electrode 931, a positive electrode 932, and a separator 933. The wound body 950 is obtained by winding a sheet of a stack in which the negative electrode 931 overlaps with the positive electrode 932 with the separator 933 provided therebetween. Note that a plurality of stacks of the negative electrode 931, the positive electrode 932, and the separator 933 may be stacked.

The negative electrode 931 is connected to the terminal 911 in FIGS. 10A and 10B via one of the terminals 951 and 952. The positive electrode 932 is connected to the terminal 911 in FIGS. 10A and 10B via the other of the terminals 951 and 952.

[Examples of Electronic Devices: Vehicles]

Next, examples where a storage battery is used in a vehicle will be described. The use of storage batteries in vehicles enables production of next-generation clean energy vehicles such as hybrid electric vehicles (HEVs), electric vehicles (EVs), and plug-in hybrid electric vehicles (PHEVs).

Figure 15A:
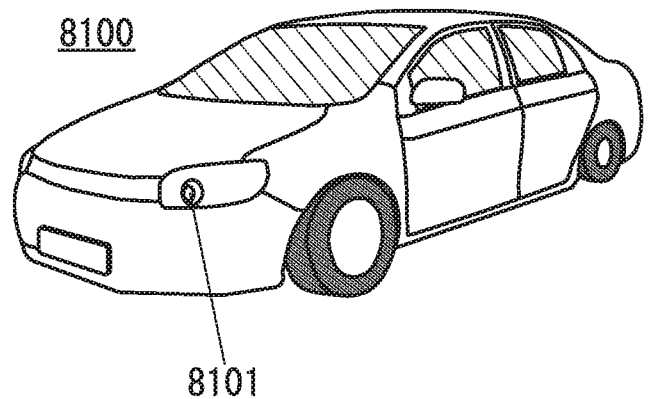
FIGS. 15A and 15B illustrate application examples of a power storage device.
Figure 15B:
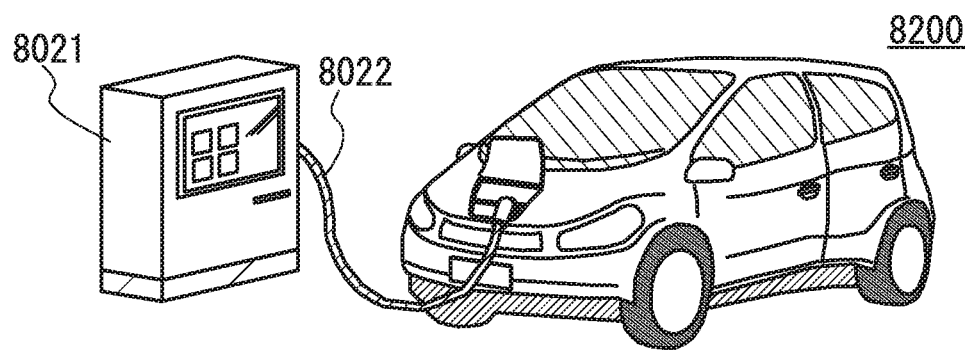

FIGS. 15A and 15B each illustrate an example of a vehicle using one embodiment of the present invention. An automobile 8100 illustrated in FIG. 15A is an electric vehicle that runs on the power of an electric motor. Alternatively, the automobile 8100 is a hybrid electric vehicle capable of driving appropriately using either the electric motor or the engine. One embodiment of the present invention can provide a vehicle for longer distances. The automobile 8100 includes a power storage device using the storage battery. The power storage device is used not only for driving the electric motor, but also for supplying electric power to a light-emitting device such as a headlight 8101 or a room light (not illustrated).

The power storage device can also supply electric power to an instrument panel included in the automobile 8100, such as a speedometer or a tachometer. Furthermore, the power storage device can supply electric power to a semiconductor device included in the automobile 8100, such as a navigation system.

FIG. 15B illustrates an automobile 8200 including the power storage device. The automobile 8200 can be charged when the power storage device is supplied with electric power through external charging equipment by a plug-in system, a contactless power feeding system, or the like. In FIG. 15B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in combination with any of the other embodiments as appropriate.

[Example 1]

In this example, a lithium manganese composite oxide coated with a carbon-containing layer was formed by the method described in Embodiment 1, and discharge capacity was measured.

(Synthesizing Lithium Manganese Composite Oxide)

Starting materials $Li_2CO_3$, $MnCO_3$, and NiO were weighed such that the molar ratio of $Li_2CO_3$ to $MnCO_3$ and NiO was 0.84:0.8062:0.318. Next, acetone was added to the powder of these materials, and then, they were mixed in a ball mill to prepare mixed powder.

After that, heating was performed to volatilize acetone, so that a mixed material was obtained.

Then, the mixed material was put in a melting pot, and was fired at 1000° C. in the air for 10 hours to synthesize a novel material. The flow rate of the air gas was 10 L/min.

Subsequently, grinding was performed to separate the sintered particles. For the grinding, acetone was added and then mixing was performed in a ball mill.

After the grinding, heating was performed to volatilize the acetone, so that a lithium manganese composite oxide containing nickel was formed. The sample obtained here is referred to as Sample X.

(Coating with Carbon-containing Layer)

Then, a process for covering the obtained lithium manganese composite oxide with a carbon-containing layer will be described. Here, the process for coating the lithium manganese composite oxide with a carbon-containing layer that is described in this example includes Step 1 of covering with graphene oxide and Step 2 of reducing the graphene oxide.

(Step 1: Covering with Graphene Oxide)

First, covering with graphene oxide (Step 1) will be described. Graphene oxide (0.0303 g) and water (1.05 g) were mixed in a mixer to form an aqueous dispersion of graphene oxide. In first mixing, one third of the total amount of water was used, another one third of the total amount of water was added in second mixing, and the other one third of the total amount of water was added in third mixing. Five-minute mixing was performed at 2000 rpm three times.

Then, the lithium manganese composite oxide obtained by the synthesis (Sample X, 3 g) was put in the formed aqueous dispersion, and the mixture was kneaded in a mixer at 2000 rpm six times. Time for one mixing was 5 minutes.

The obtained mixture was dried under reduced pressure in a bell jar at 50° C. and then ground in an alumina mortar, so that the lithium manganese composite oxide covered with graphene oxide was obtained.

(Step 2: Reducing Graphene Oxide)

Next, reducing the graphene oxide (Step 2) will be described. The graphene oxide covering the surface of the lithium manganese composite oxide was reduced. Ascorbic acid was used as a reducing agent, and 80 vol % ethanol solution was used as a solvent. Ascorbic acid (13.5 g) and lithium hydroxide (3.12 g) were put in 1 L of 80 vol % ethanol solution to form a reducing solution. The obtained lithium manganese composite oxide powder was put in the solution and reduction was performed at 60° C. for 3 hours.

Then, the obtained solution was filtrated by suction filtration. For the filtration, filter paper with a particle retention capability of 1 μm was used. Then, washing and drying were performed. The drying was performed at 50° C. under reduced pressure. After the drying, the obtained powder was ground in a mortar. After that, drying was performed at 170° C. under reduced pressure for 10 hours.

The powder obtained through Steps 1 and 2 is referred to as Sample A.

(Comparative Example: Process Using Glucose)

Next, in a comparative example, the lithium manganese composite oxide obtained by synthesis (Sample X) was coated with carbon with the use of glucose.

Glucose was weighed so that glucose with respect to the obtained lithium manganese composite oxide (Sample X) was 11 weight %. Next, acetone was added to the powder of these materials, and then, they were mixed in a ball mill. After that, heating was performed to volatilize acetone, so that a mixed material was obtained.

Then, the mixed material was put in a melting pot and fired at 600° C. in a nitrogen atmosphere for 10 hours. The flow rate of nitrogen was 5 L/min. The obtained powder is referred to as Comparative Sample B.

(Evaluation by X-ray Diffraction)

FIG. 1 shows the X-ray diffraction measurement results of Sample A and Comparative Sample B. Spectra of Sample A, Sample X, and Comparative Sample B were obtained by X-ray diffraction measurement. In addition, spectra of (a), (b), (c), and (d) are not measurement data but show the values of $Li_2MnO_3$ (space group C2/c, pattern: 00-027-1252), Ni (space group Fm-3m, pattern: 00-001-1258), $Li_2CO_3$ (pattern: 00-001-0996), and $LiMnO_2$ (space group Pmnm, pattern: 00-035-0749) that are cited from the inorganic crystal structure database (ICSD). A main peak of Sample A after coating obtained by X-ray diffraction approximately corresponds to the peak of $Li_2MnO_3$ with a layered rock-salt structure, which is shown by (a). On the other hand, Comparative Sample B has a peak of Ni shown by (b), a peak of $Li_2CO_3$ shown by (c), and a peak of $LiMnO_2$ shown by (d), which are significantly different from the peaks before firing. As to Comparative Sample B, it is suggested that the lithium manganese composite oxide was decomposed because it was fired with glucose. Meanwhile, as to Sample A, decomposition products such as $LiMnO_2$, Ni, and $Li_2CO_3$ were not significantly observed, which implies that the carbon-containing layer was favorably formed.

To evaluate the coating state of the carbon-containing layer, the resistivities of the particles Sample A and Sample X (before coated) were measured using a powder resistivity measurement system (MCP-PD51 by Mitsubishi Chemical Analytech Co., Ltd.). FIG. 2 shows the results. The radius of each sample was 10 mm, and the weights of Sample A and Sample X (before coated) were 1.58 g and 1.50 g, respectively. The horizontal axis represents pressure applied in measurement. When the pressure is 50.9 MPa, the particle resistivity before coating with the carbon-containing layer was $1.66 \times 10^5$ ($\Omega \cdot cm$), whereas the particle resistivity after coating with the carbon-containing layer was $1.46 \times 10^2$ ($\Omega \cdot cm$). This indicates that the surface of the particle was favorably coated.

Figure 3A:
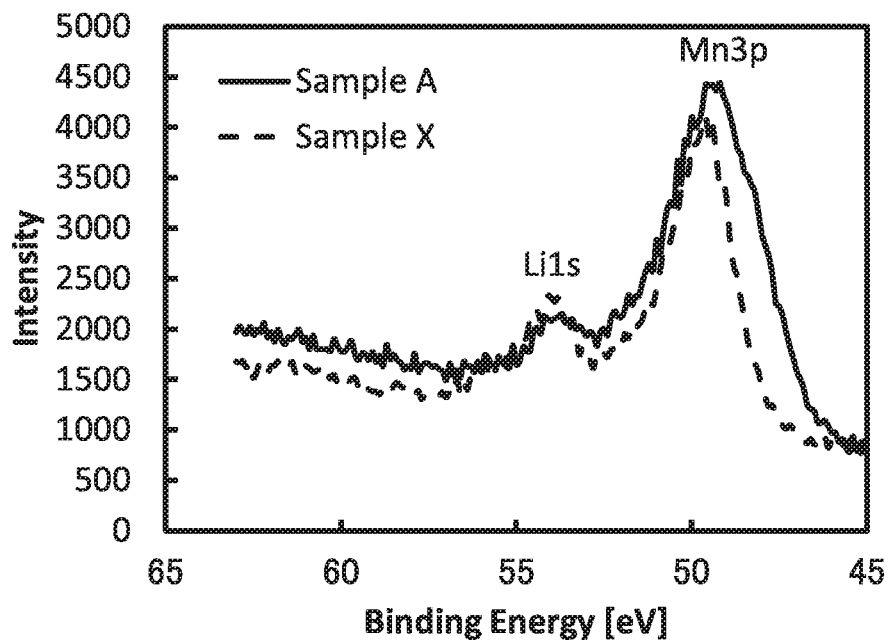
FIGS. 3A and 3B are graphs each showing measurement results of X-ray photoelectron spectroscopy in one embodiment of the present invention.
Figure 3B:
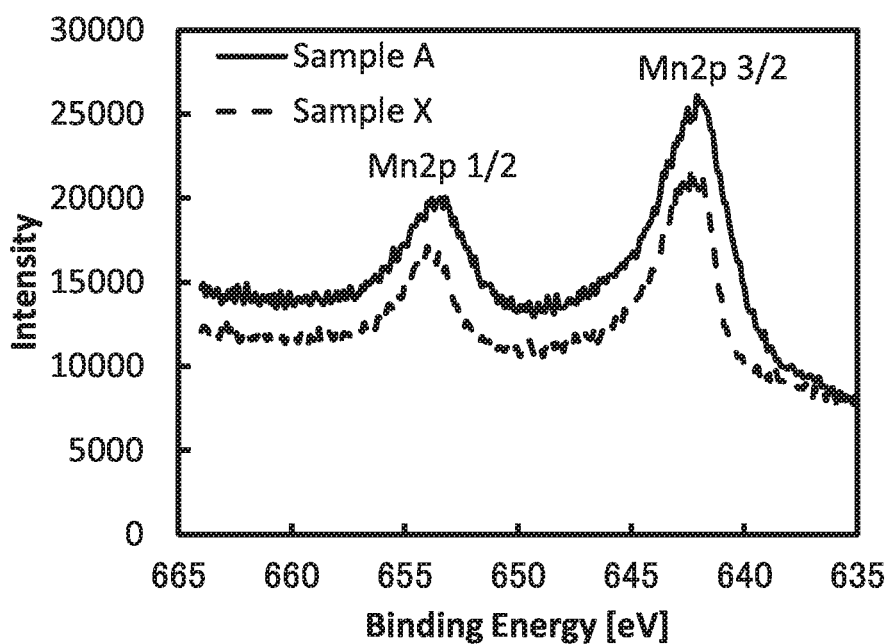
Figure 4:
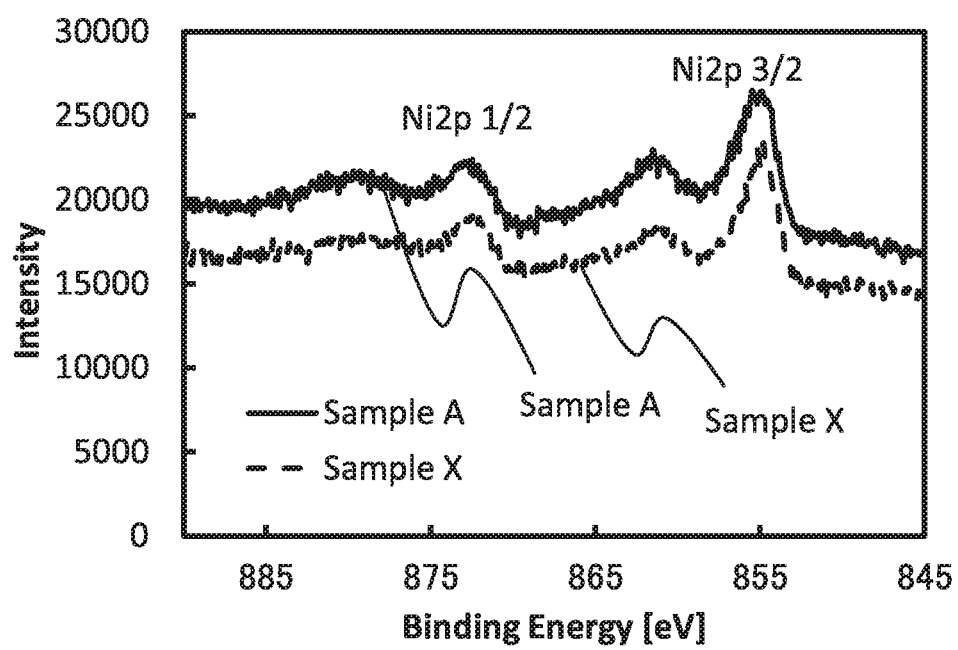
FIG. 4 is a graph showing measurement results of X-ray photoelectron spectroscopy in one embodiment of the present invention.

FIGS. 3A and 3B show Li 1s peaks, Mn 3p peaks, and Mn 2p peaks of Sample A and Sample X, the sample before coated, that were obtained by X-ray photoelectron spectroscopy. FIG. 4 shows spectra with Ni 2p peaks. Solid lines represent Sample A, and broken lines represent Sample X. The Mn 3p peaks are at around 50 eV. As shown in FIG. 3A, the Mn 3p peak of the spectrum of Sample A shifts to the low energy side relative to that of the spectrum of Sample X. As shown in FIG. 3B, the half-width of the Mn 2p(3/2) peak of the spectrum of Sample A is larger than that of the Mn 2p(3/2) peak of the spectrum of Sample X. These results suggest that the bonding state and the valence of Mn of the lithium manganese composite oxide might be changed through Step 1 of covering with graphene oxide and Step 2 of reducing the graphene oxide.

(Fabricating Electrode)

An electrode was fabricated using Sample A as a positive electrode active material. Sample A was mixed with acetylene black (AB) as a conductive additive, polyvinylidene fluoride (PVDF) as a resin, and N-methyl-2-pyrrolidone (NMP) as a polar solvent to form slurry. The weight ratio of Sample A to the PVDF and the AB was 90:5:5. Then, the slurry was applied to a current collector and dried. Note that a surface of the current collector was treated with an undercoat in advance.

The electrode obtained here is referred to as Electrode A. In addition, an electrode using $Li_2MnO_3$ was fabricated as a comparative electrode. $Li_2MnO_3$ was formed using $Li_2CO_3$ and $MnCO_3$ (the molar ratio of $Li_2CO_3$ to $MnCO_3$=1:1) as materials. The materials were mixed under the conditions of firing temperature and firing time that are described as those for the synthesis method of the lithium manganese composite oxide. The fabricated electrode is referred to as Comparative Electrode C.

(Measuring Discharge Capacity)

Half cells were fabricated using Electrode A and Comparative Electrode C. For the cells, the coin cell described in Embodiment 2 was used. Lithium was used for counter electrodes of the half cells. An electrolytic solution was formed by dissolving $LiPF_6$ as a salt in a mixed solution containing ethylene carbonate and diethyl carbonate, which are aprotic organic solvents, at a volume ratio of 1:1. As a separator, polypropylene (PP) was used.

Figure 5:
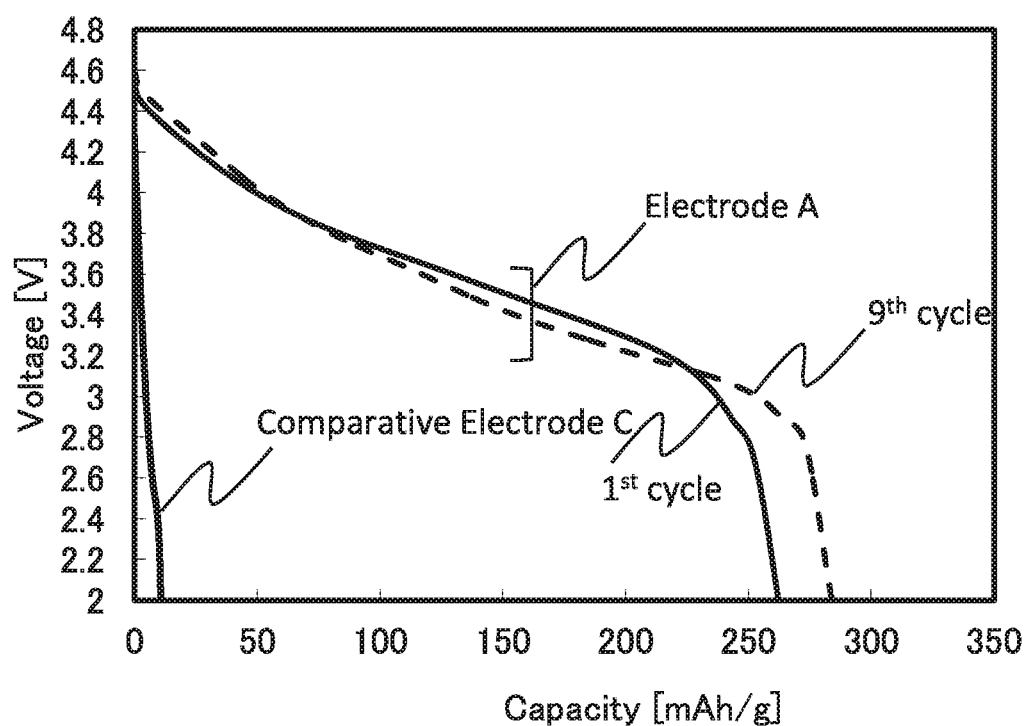
FIG. 5 is a graph showing the relation between discharge capacity and voltage in one embodiment of the present invention.

FIG. 5 shows measurement results of discharge capacities. The vertical axis represents voltage (V), and the horizontal axis represents discharge capacity (mAh/g). Charging was performed at a constant current until the voltage reached a termination voltage of 4.8 V. Discharging was performed at a constant current until the voltage reached an end voltage of 2.0 V. The current density for charging and discharging Electrode A fabricated using Sample A was 15 mA/g, and the current density for charging and discharging Comparative Electrode C was 30 mA/g. As can be seen from FIG. 5, the discharge capacity of the cell using Electrode A was higher than that of the cell using Comparative Electrode C.

Furthermore, the capacity of Electrode A was increased as the number of charge and discharge cycles increased. FIG. 5 shows discharge curves of the first cycle (solid line) and the ninth cycle (dotted line). The capacity was increased by approximately 20 mAh/g in nine cycles. An electrode using Sample X, which is the sample before coated, was fabricated and the discharge capacity thereof was measured. In the ninth cycle, the capacity of Electrode A using Sample A was higher than that of the electrode using Sample X. The increase in capacity is presumably due to the effect of coating with the carbon-containing layer.

[Example 2]

In this example, the cycle characteristics of the half cell using Electrode A, which was fabricated in Example 1, were evaluated.

Charge and discharge cycles of the half cell using Electrode A, which was fabricated in Example 1, were continued even after the ninth cycle, and changes in discharge capacity were evaluated.

In addition, Electrode X was fabricated using Sample X formed in Example 1. The compounding ratio of Sample X to PVDF and AB used for Electrode X is based on that for Electrode A. A half cell was fabricated using Electrode X, and was charged and then discharged. A counter electrode, an electrolytic solution, a separator, and the like that were used for the half cell were the same as those of the half cell fabricated using Electrode A in Example 1. Charging and discharging were performed under the conditions for charging and discharging the half cell fabricated using Electrode A in Example 1. Charge and discharge cycles of the half cell fabricated using Electrode X were performed in a manner similar to that of charge and discharge cycles of the half cell fabricated using Electrode A, and the changes in discharge capacity were evaluated.

Figure 33:
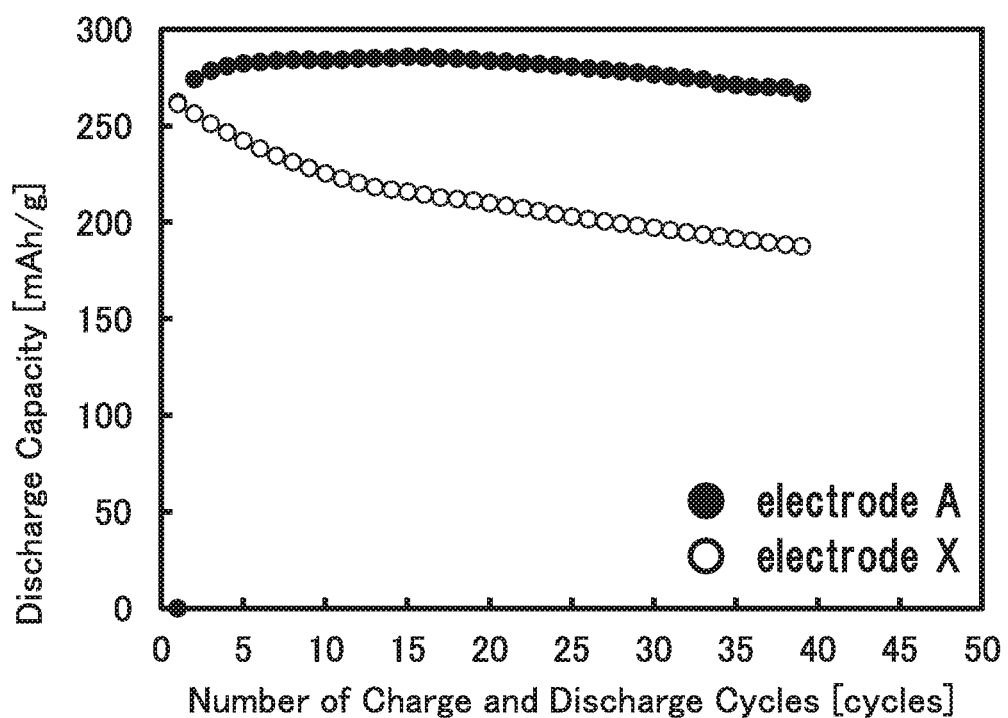
FIG. 33 is a graph showing the relation between discharge capacity and the number of times of charge and discharge in one embodiment of the present invention.

FIG. 33 shows the discharge capacities of the half cells per cycle. The horizontal axis represents the number of charge and discharge cycles, and the vertical axis represents discharge capacity. Black circles represent Electrode A, and white circles represent Electrode X.

The initial discharge capacities of both the half cells were as high as 260 mAh/g or more. The capacity of the half cell using Electrode A was increased from the initial capacity, and the maximum capacity was 285.7 mAh/g. The discharge capacity after 40 cycles was 267.0 mAh/g, which is 93% of the maximum capacity. The use of Sample A obtained by forming a covering layer and performing reduction enabled achievement of more excellent cycle characteristics than those when Sample X was used.

[Example 3]

In this example, TEM analysis results of electrodes fabricated using the lithium manganese composite oxide of one embodiment of the present invention will be described.

Half cells were fabricated using Electrode A described in Example 1. For the cells, the coin cell described in Embodiment 2 was used. Lithium was used for counter electrodes of the half cells. An electrolytic solution was formed by dissolving $LiPF_6$ as a salt in a mixed solution containing ethylene carbonate and diethyl carbonate, which are aprotic organic solvents, at a volume ratio of 1:1. As a separator, polypropylene (PP) was used.

Figure 32A:
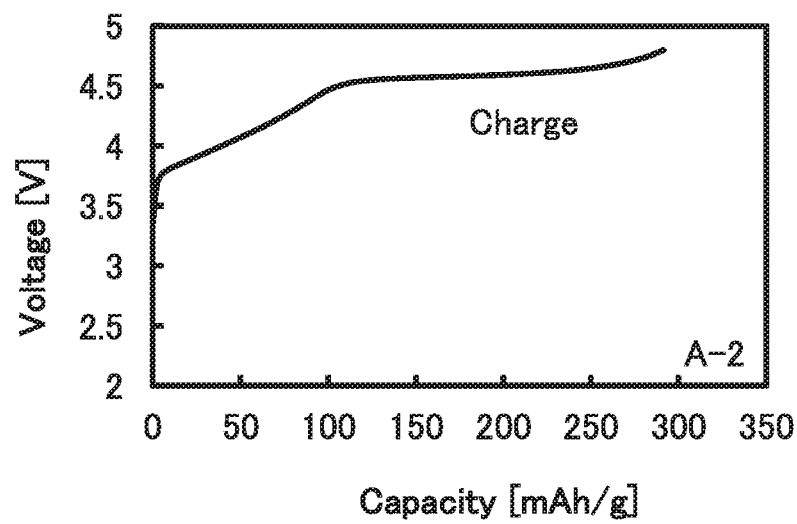
FIG. 32A is a graph showing a charge curve of a half cell.
Figure 32B:
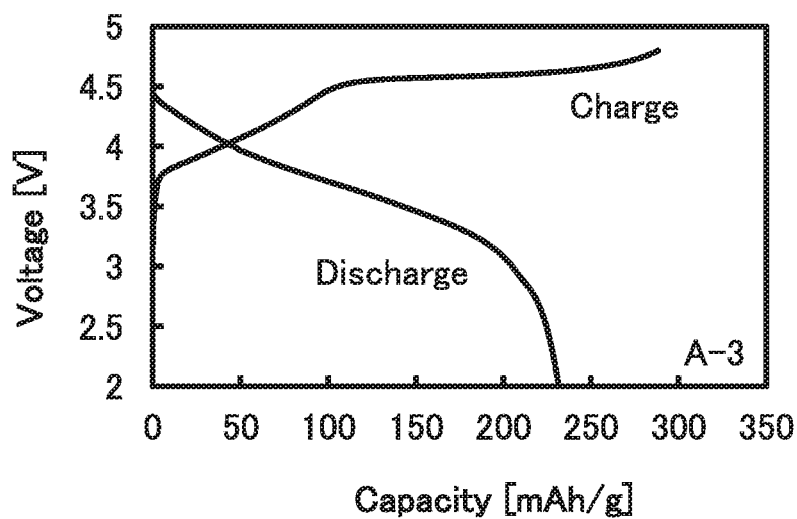
FIG. 32B is a graph showing charge and discharge curves of a half cell.

Half Cell A-1, Half Cell A-2, and Half Cell A-3 were each fabricated using Electrode A. Half Cell A-1 was neither charged nor discharged. Half Cell A-2 was only charged. FIG. 32A shows a charge curve. Half Cell A-3 was charged and then discharged. FIG. 32B shows charge and discharge curves. Charging was performed at a constant current with a current density of 30 mA/g until the voltage reached a termination voltage of 4.8 V. Discharging was performed at a constant current with a current density of 30 mA/g until the voltage reached an end voltage of 2.0 V.

In addition, Half Cell X-3 was fabricated using Electrode X fabricated in Example 2, and it was charged and then discharged. The conditions for charging and discharging were similar to those for Half Cell A-3.

Next, Half Cells A-1 to A-3 and Half Cell X-3 were disassembled in an inert atmosphere to take out the electrodes. Electrodes A taken out from Half Cells A-1, A-2, and A-3 are referred to as Electrodes A-1, A-2, and A-3, respectively. Electrode X taken out from Half Cell X-3 is referred to as Electrode X-3, Then, the electrodes were sliced using a focused ion beam system (FIB).

[TEM Observation]

The sliced Electrodes A-1 to A-3 were observed with a TEM (H-9000NAR manufactured by Hitachi High-Technologies Corporation) at an acceleration voltage of 200 kV.

Figure 16:
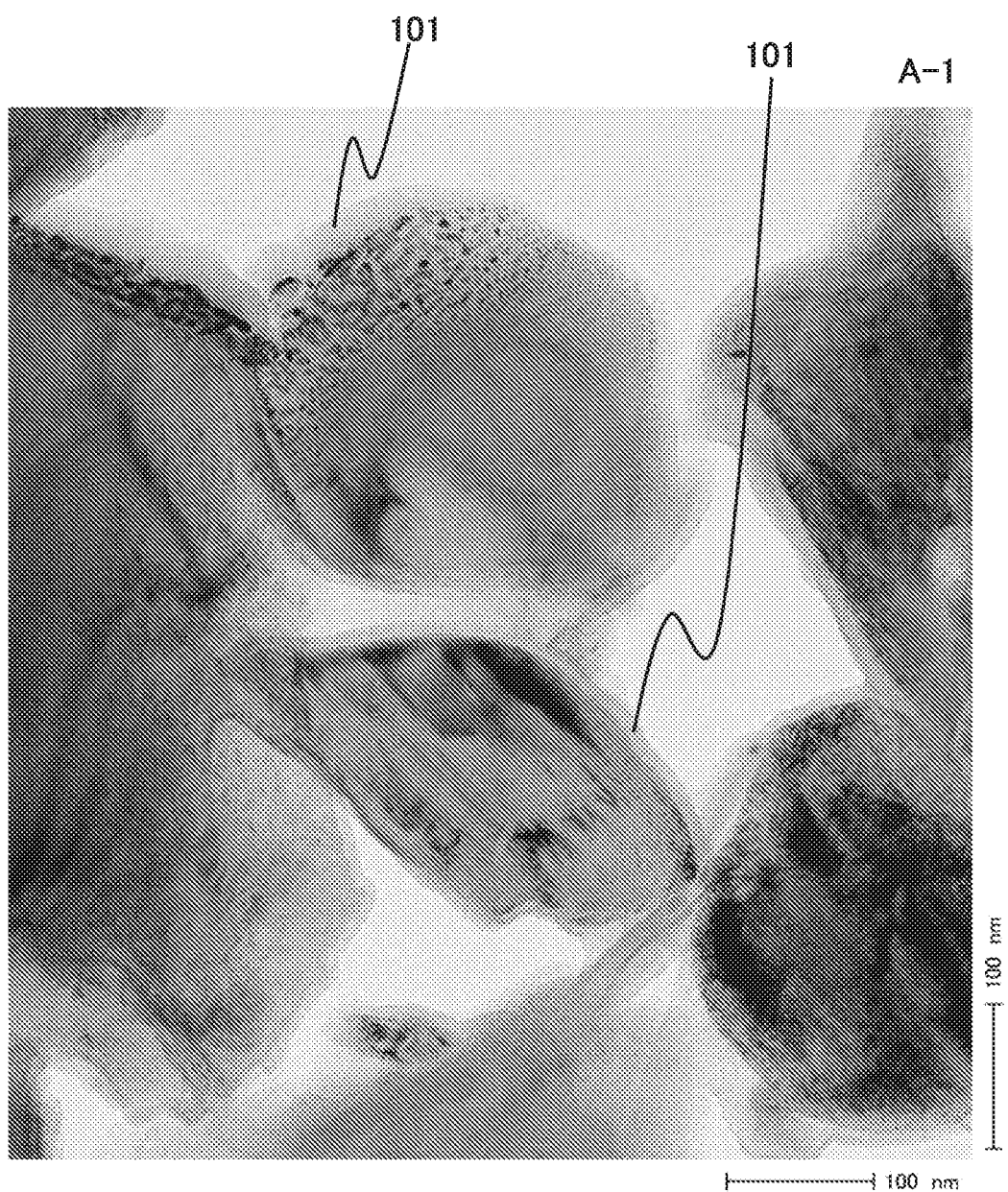
FIG. 16 is a cross-sectional TEM image of one embodiment of the present invention.
Figure 17:
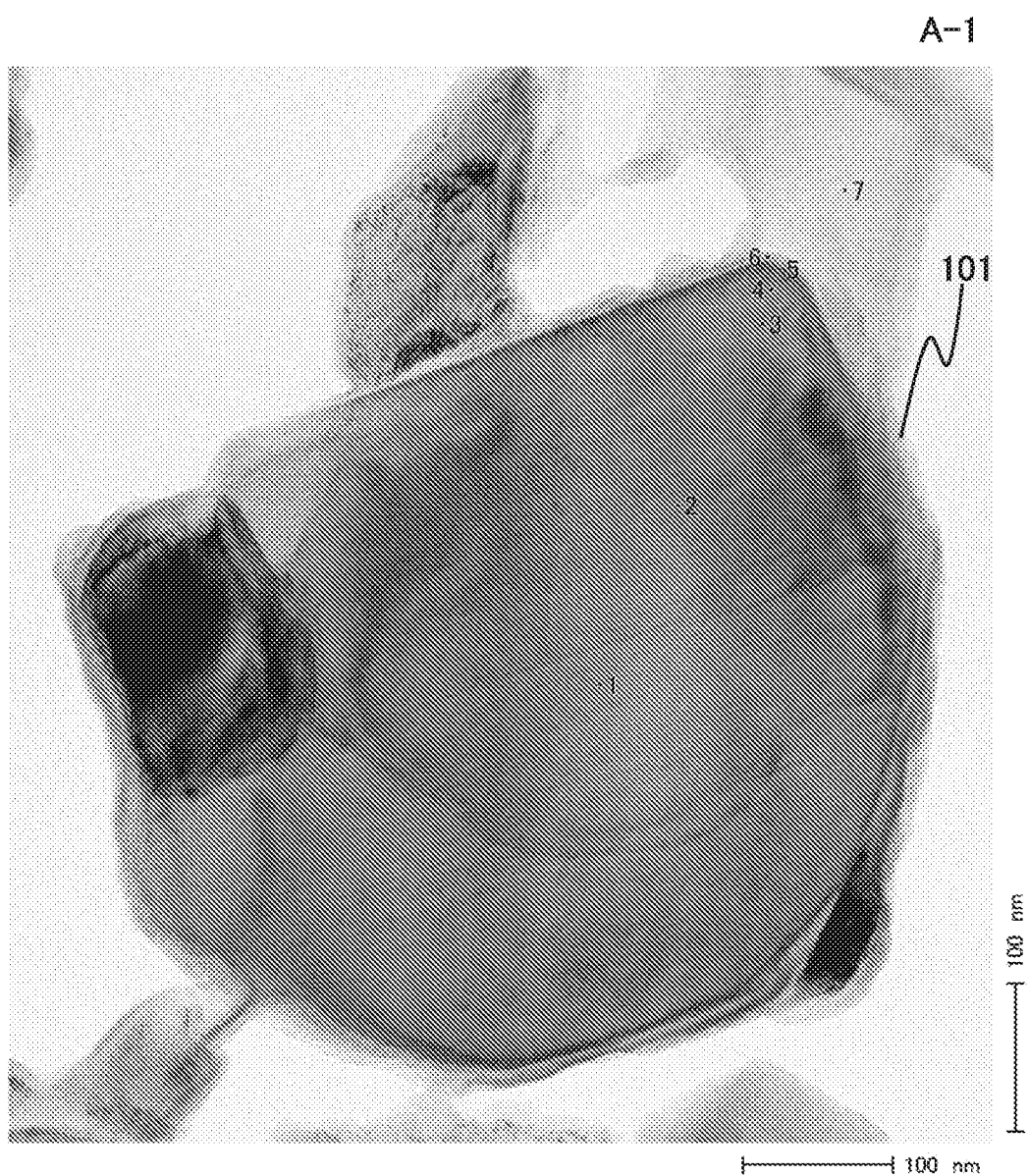
FIG. 17 is a cross-sectional TEM image of one embodiment of the present invention.
Figure 18:
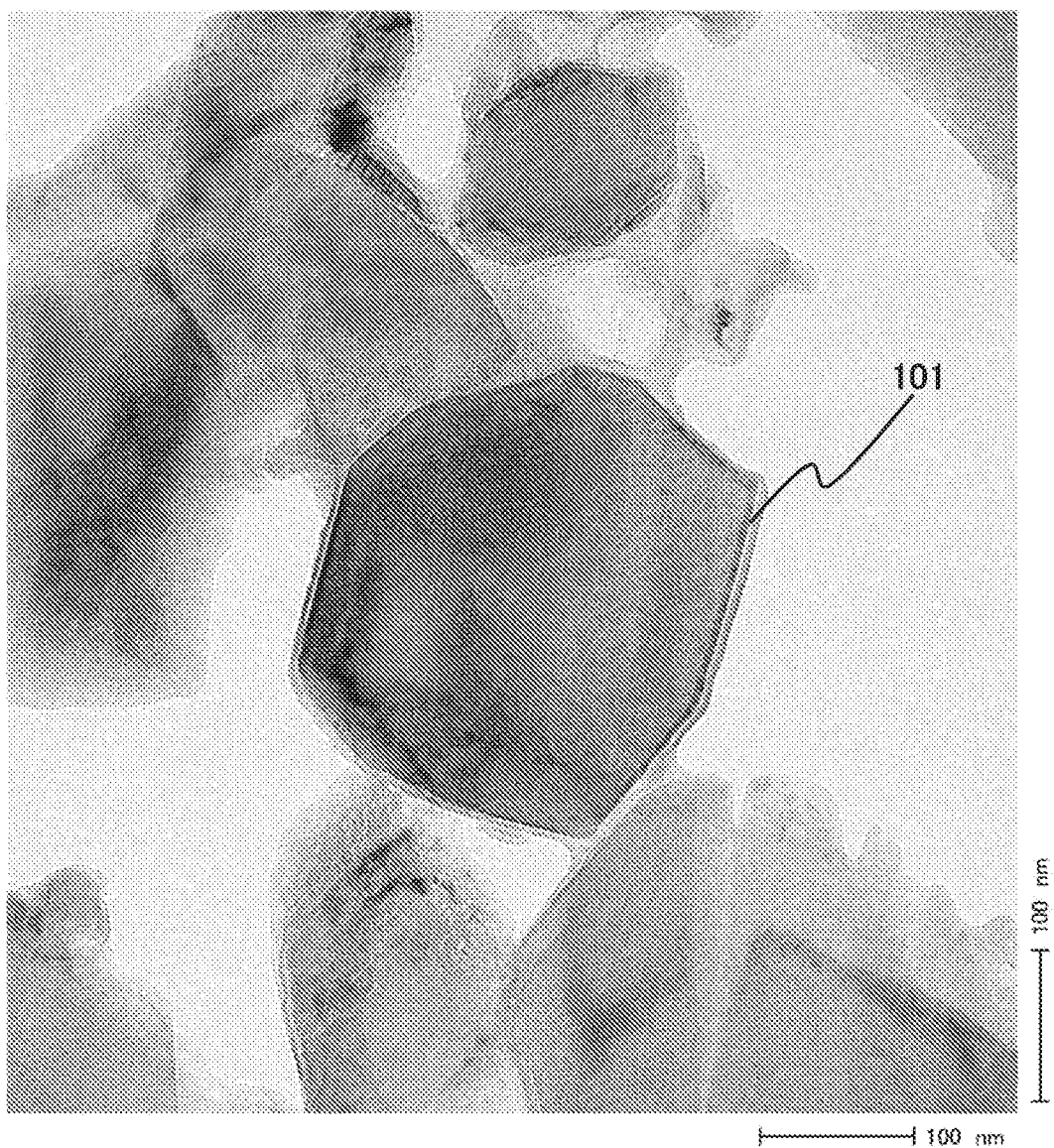
FIG. 18 is a cross-sectional TEM image of one embodiment of the present invention.
Figure 19:
FIG. 19 is a cross-sectional TEM image of one embodiment of the present invention.
Figure 20:
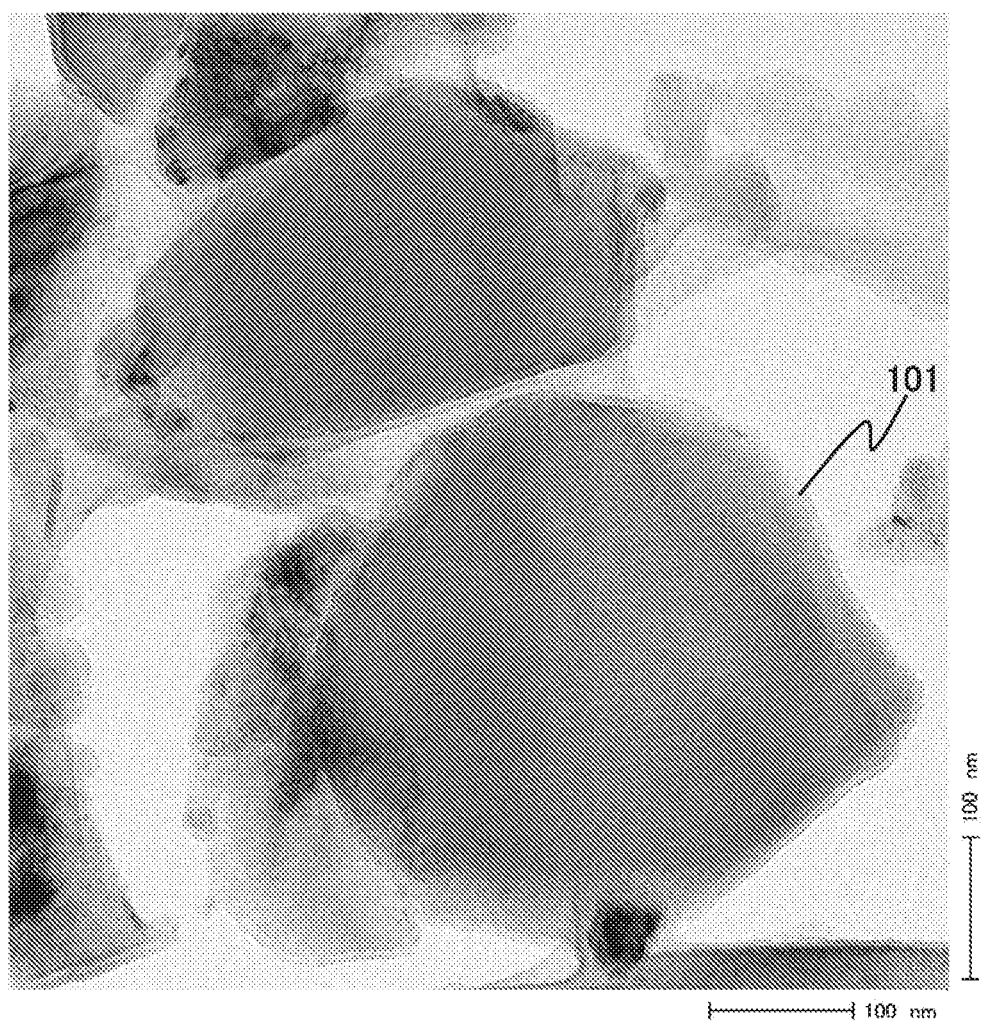
FIG. 20 is a cross-sectional TEM image of one embodiment of the present invention.
Figure 21:
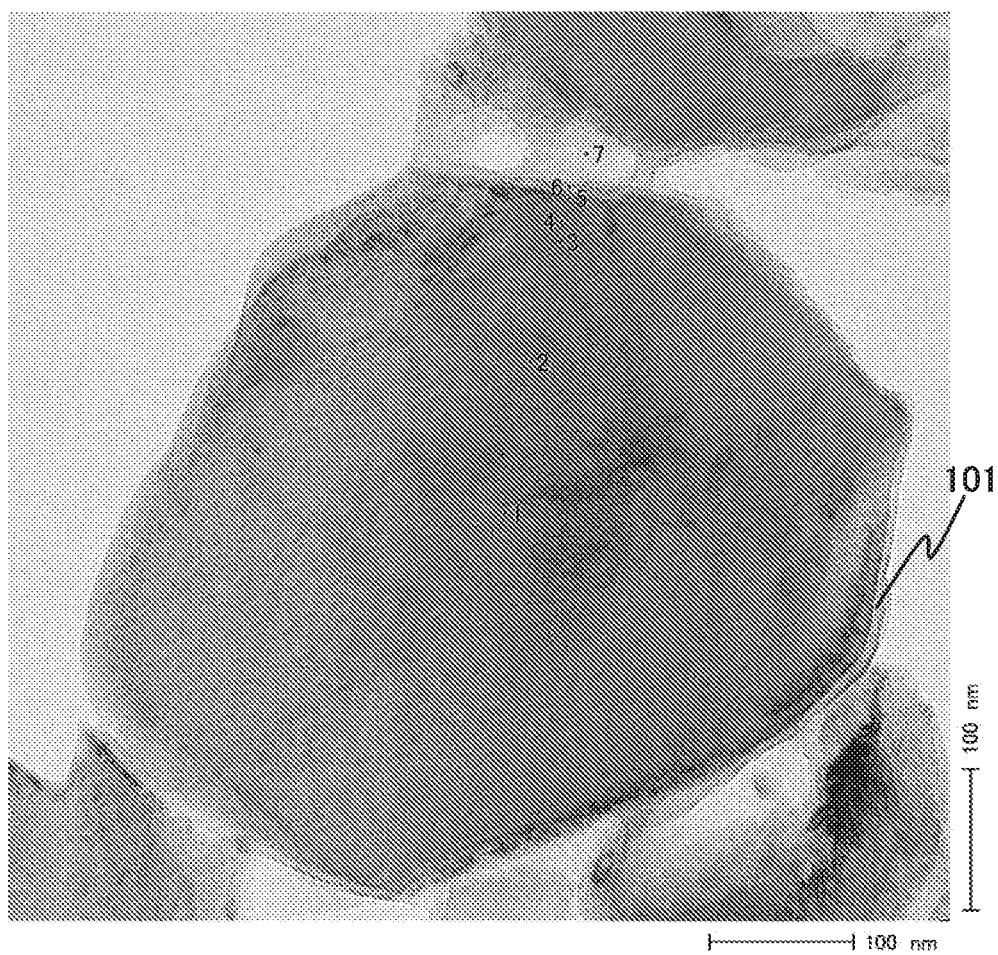
FIG. 21 is a cross-sectional TEM image of one embodiment of the present invention.

FIGS. 16 and 17 show TEM images of Electrode A-1. FIGS. 18 and 19 show TEM images of Electrode A-2. FIGS. 20 and 21 show TEM images of Electrode A-3. The observation magnification in FIGS. 16 to 18, 20, and 21 was 275,000 times, and the observation magnification in FIG. 19 was 205,000 times.

As can be seen in each of FIGS. 16 to 21, a coating layer 101 was observed. The thickness of the coating layer 101 was typically approximately 6 nm to 30 nm.

Next, portions indicated by points 1 to 7 in FIGS. 17, 19, and 21 were subjected to TEM-EELS analysis and TEM-EDX (Energy Dispersive X-ray spectroscopy) analysis.

[TEM-EELS Analysis]

Figure 22A:
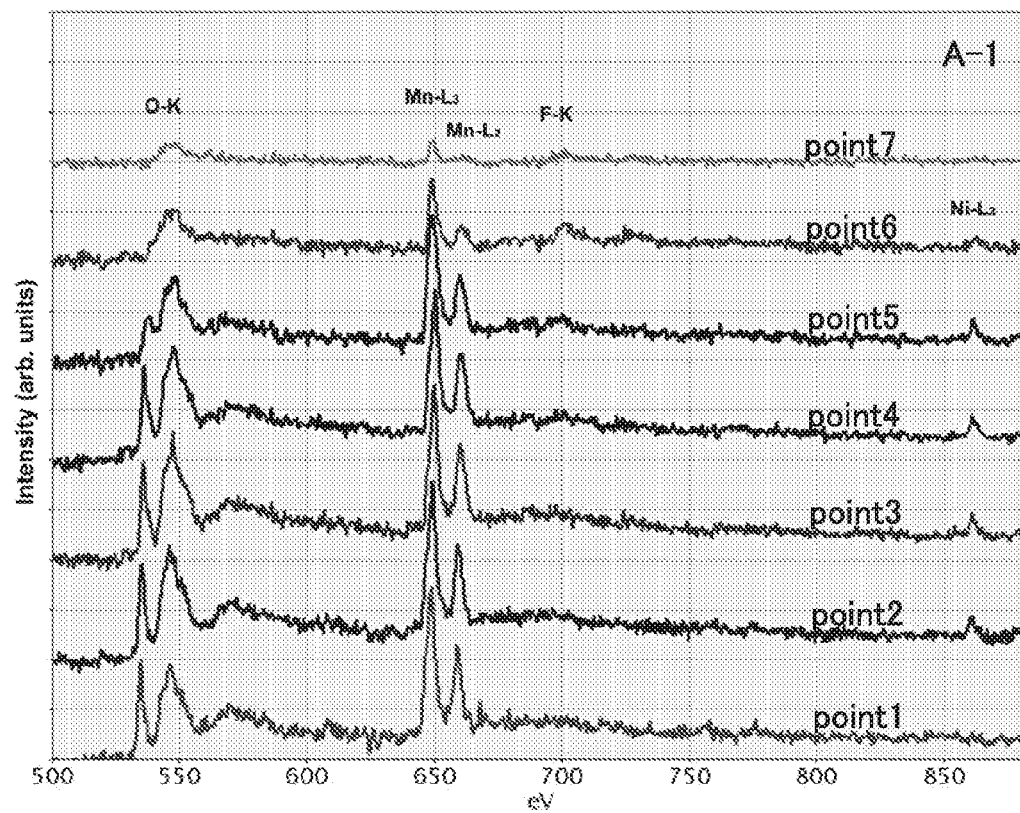
FIGS. 22A and 22B show TEM-EELS analysis results in one embodiment of the present invention.
Figure 22B:
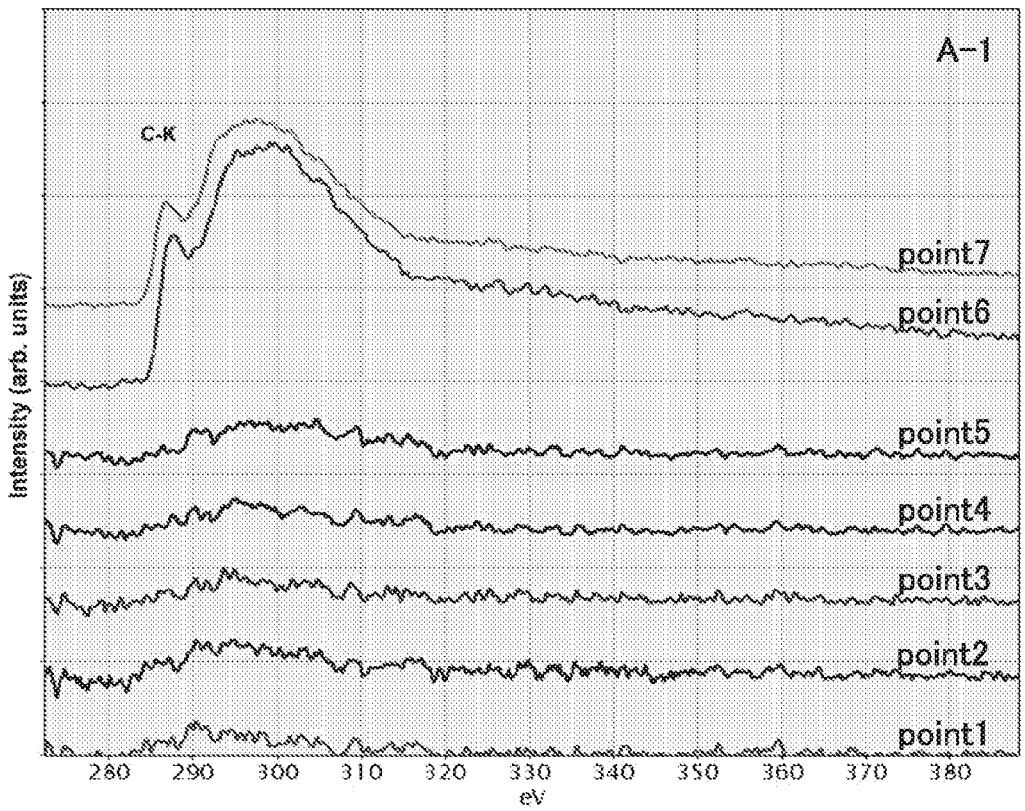
Figure 23A:
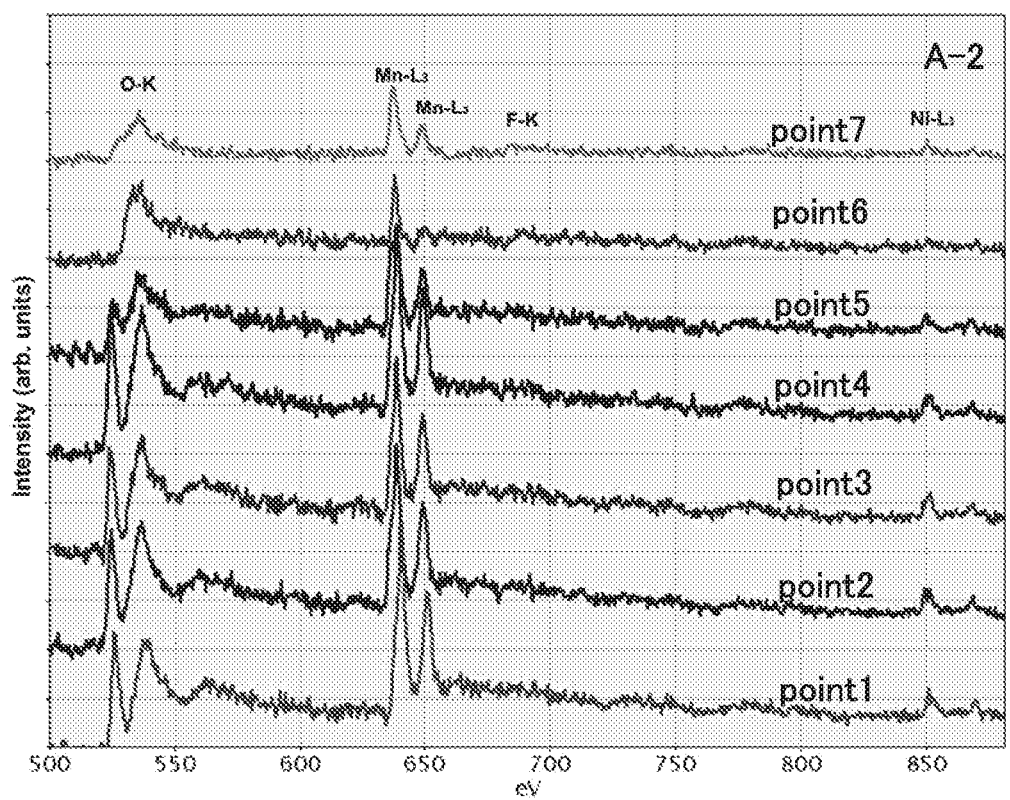
FIGS. 23A and 23B show TEM-EELS analysis results in one embodiment of the present invention.
Figure 23B:
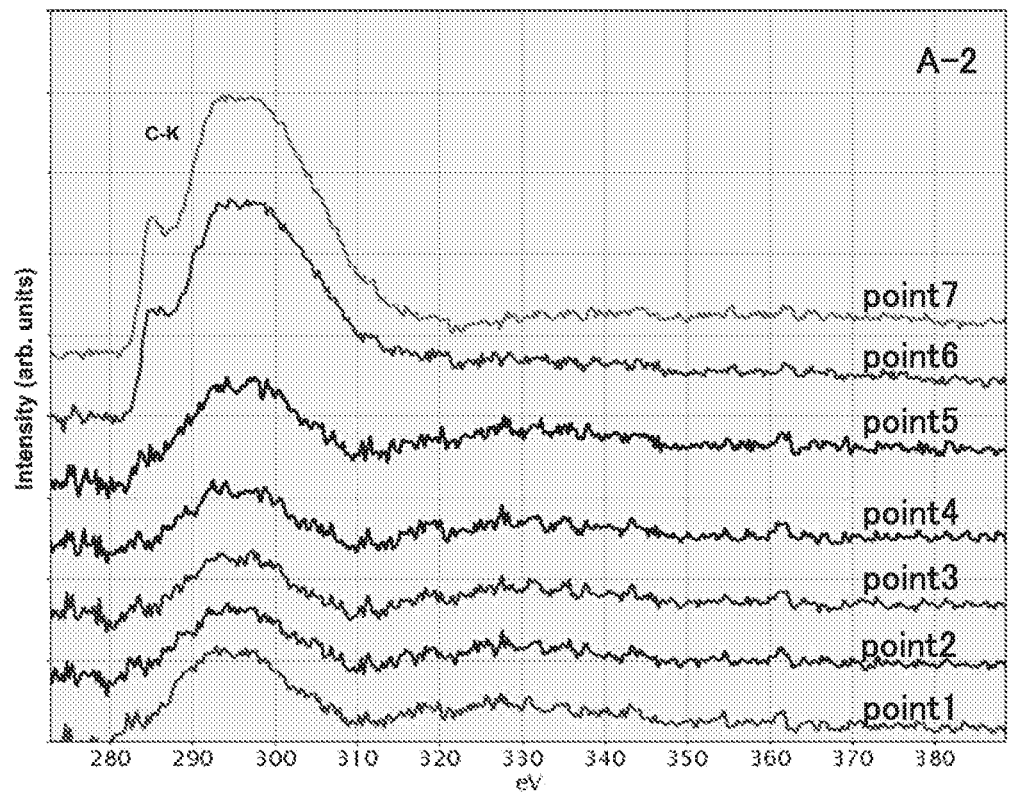
Figure 24A:
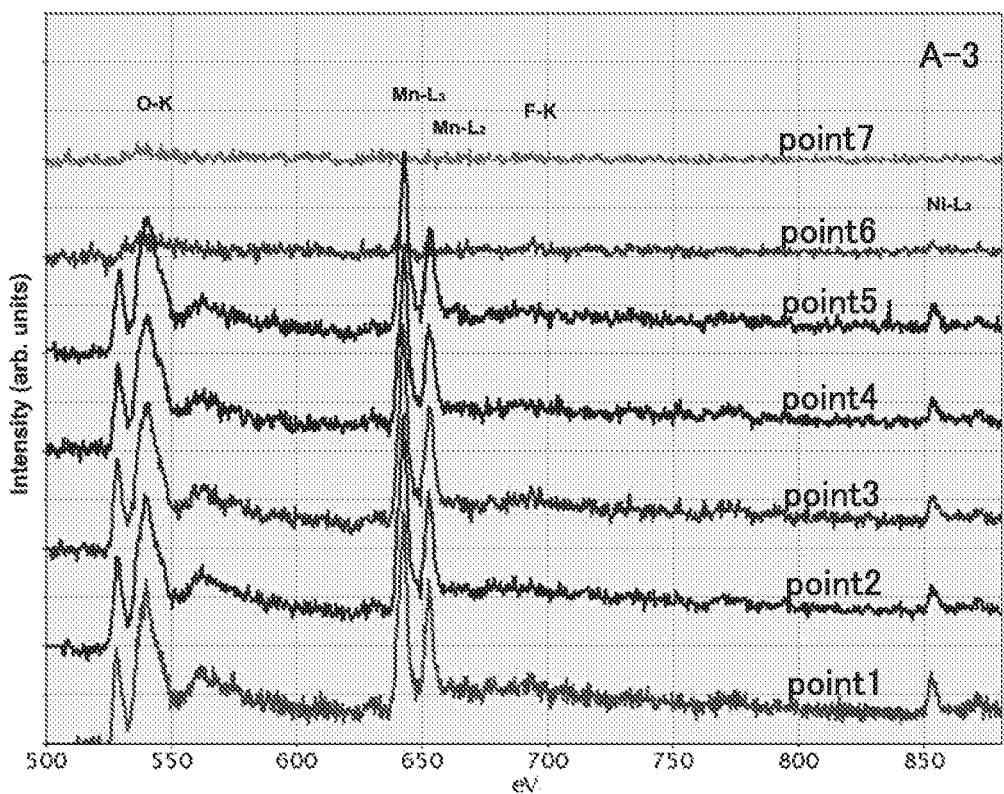
FIGS. 24A and 24B show TEM-EELS analysis results in one embodiment of the present invention.
Figure 24B:
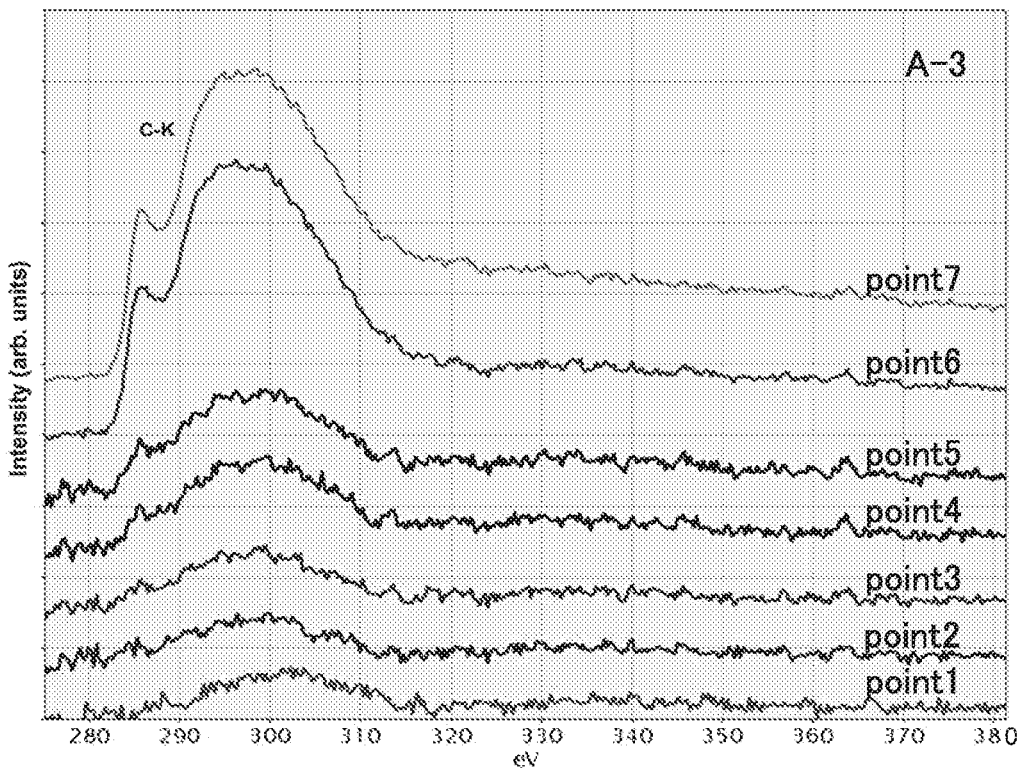
Figure 25A:
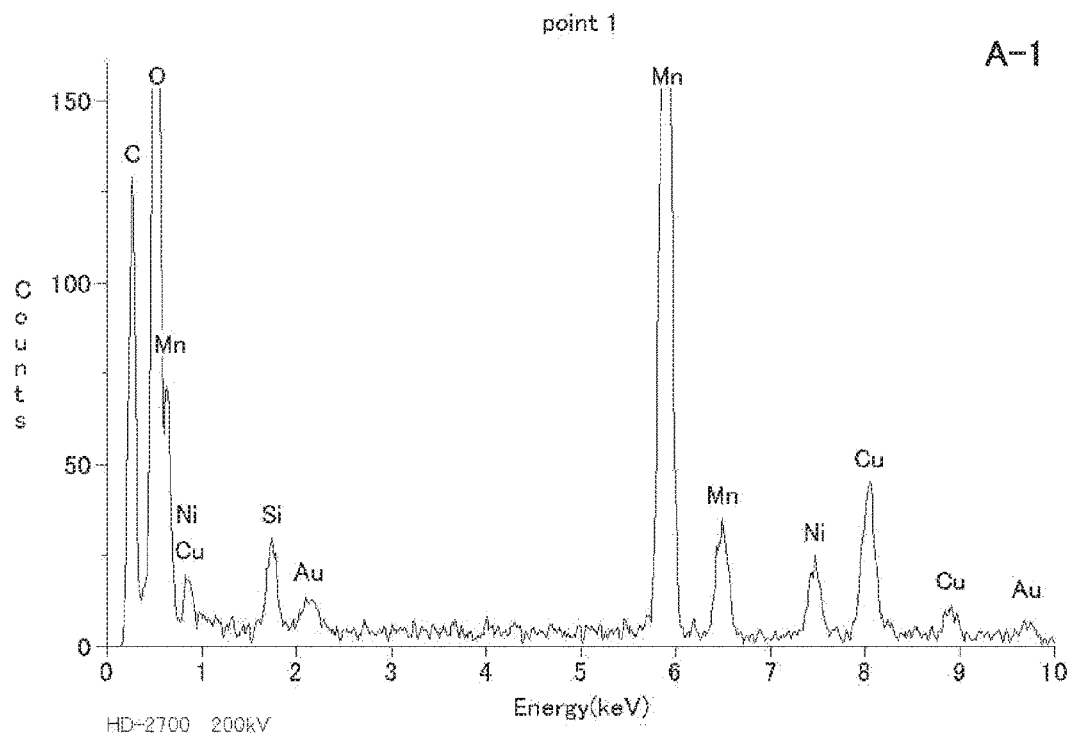
FIGS. 25A and 25B show TEM-EDX analysis results in one embodiment of the present invention.
Figure 25B:
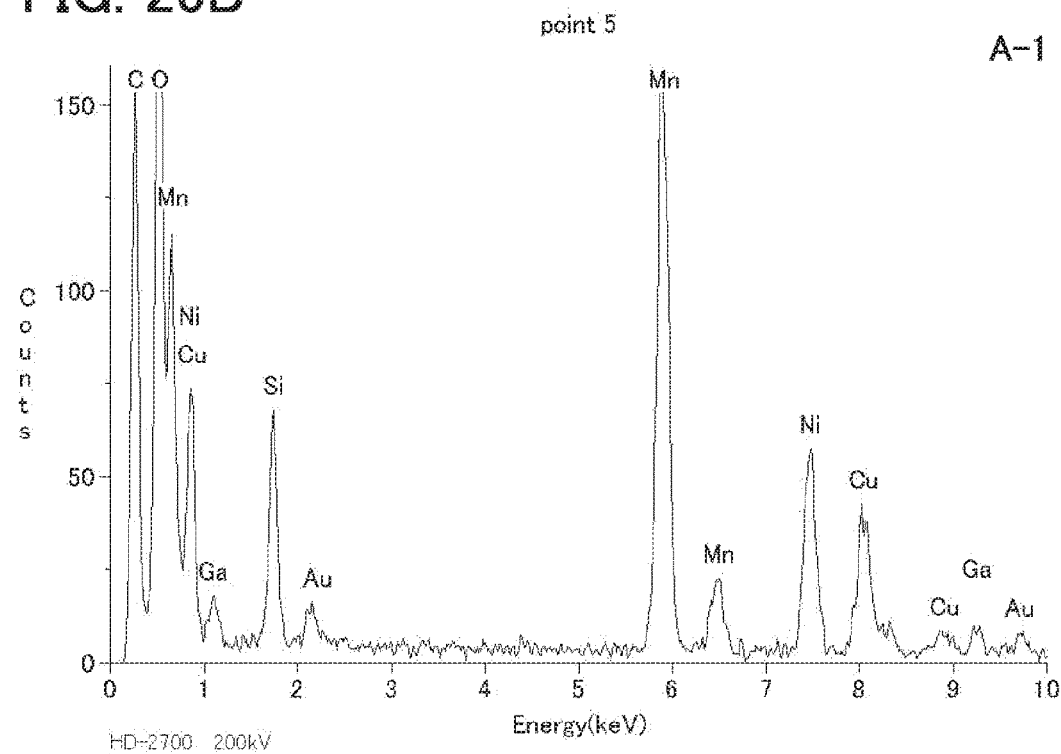
Figure 26A:
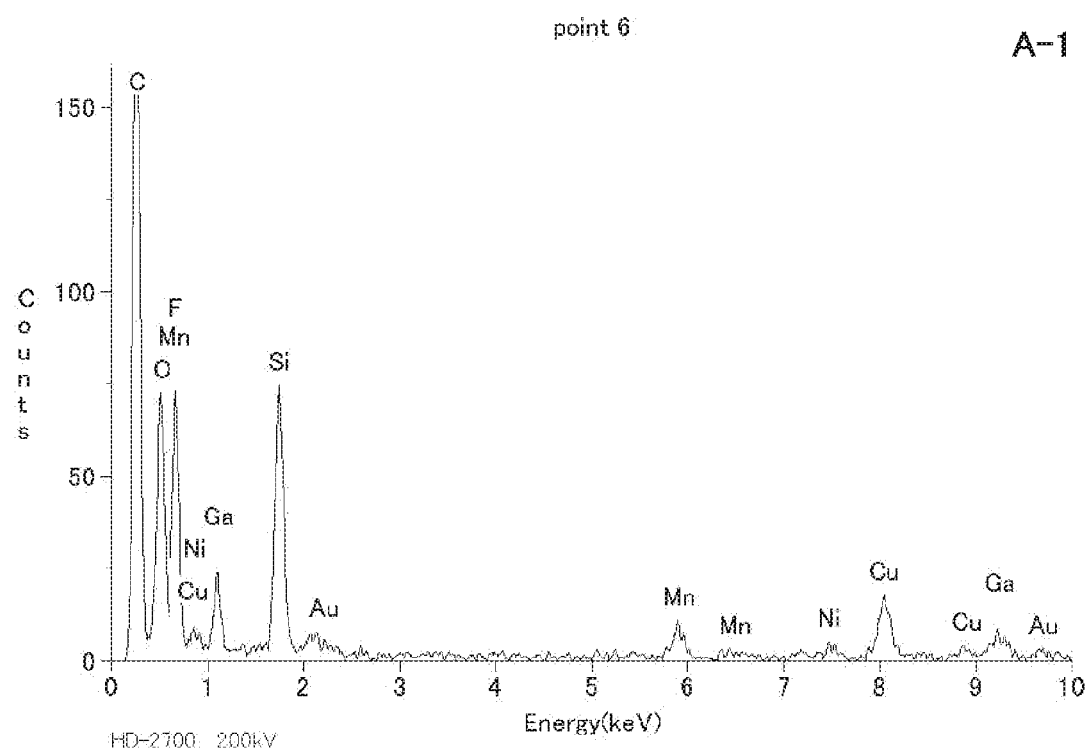
FIGS. 26A and 26B show TEM-EDX analysis results in one embodiment of the present invention.
Figure 26B:
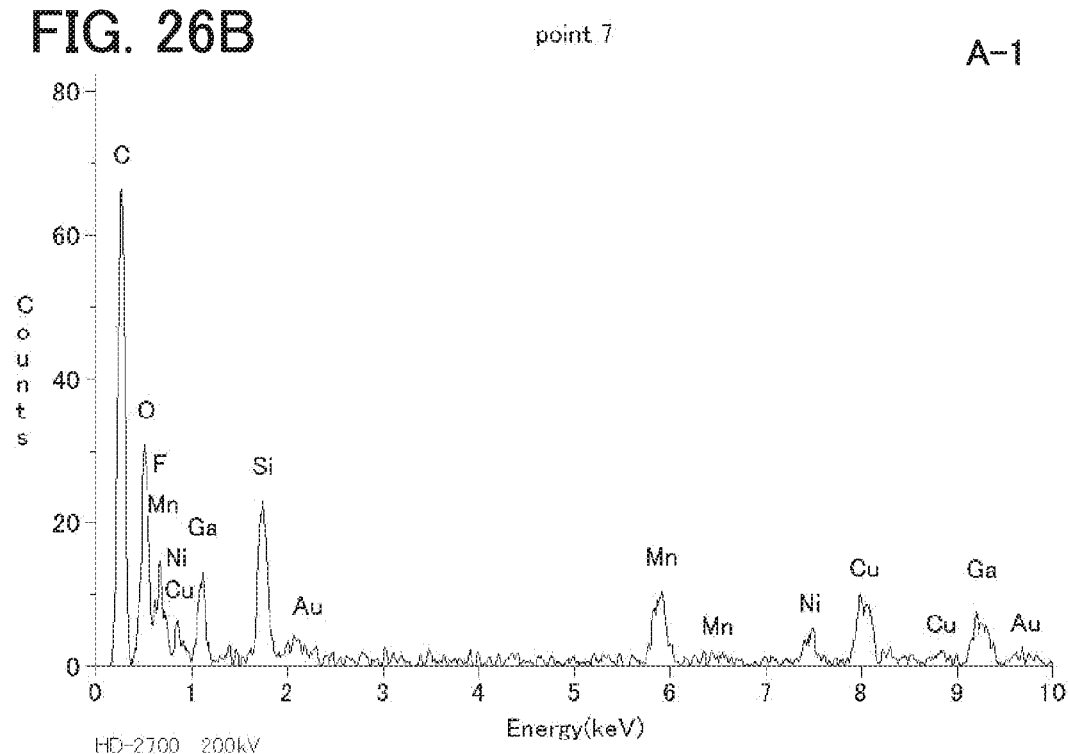
Figure 27A:
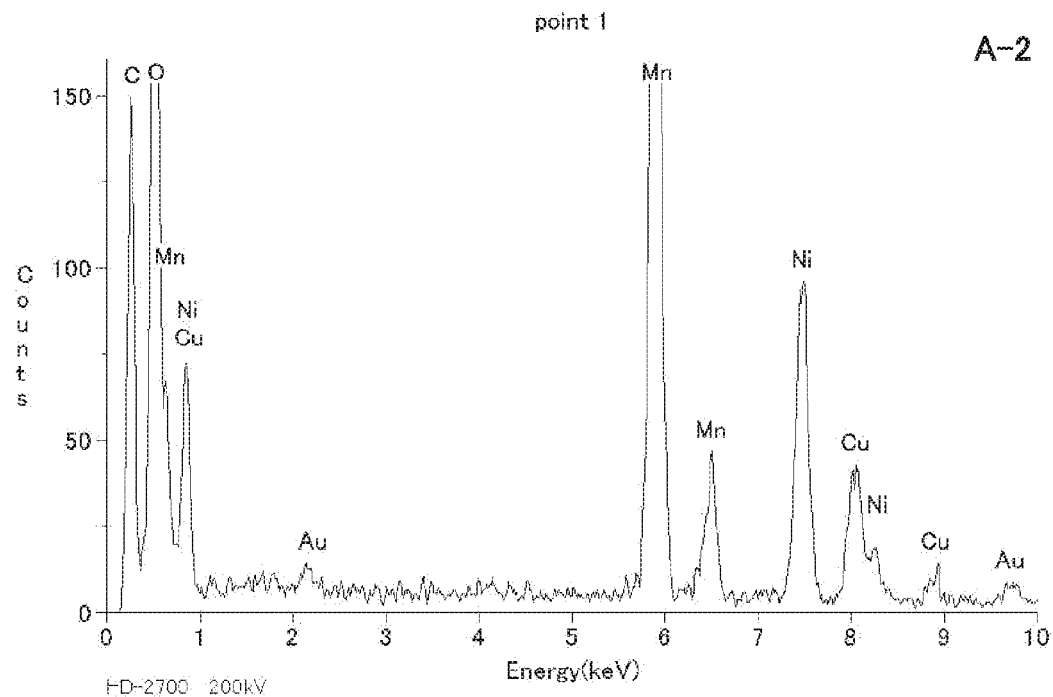
FIGS. 27A and 27B show TEM-EDX analysis results in one embodiment of the present invention.
Figure 27B:
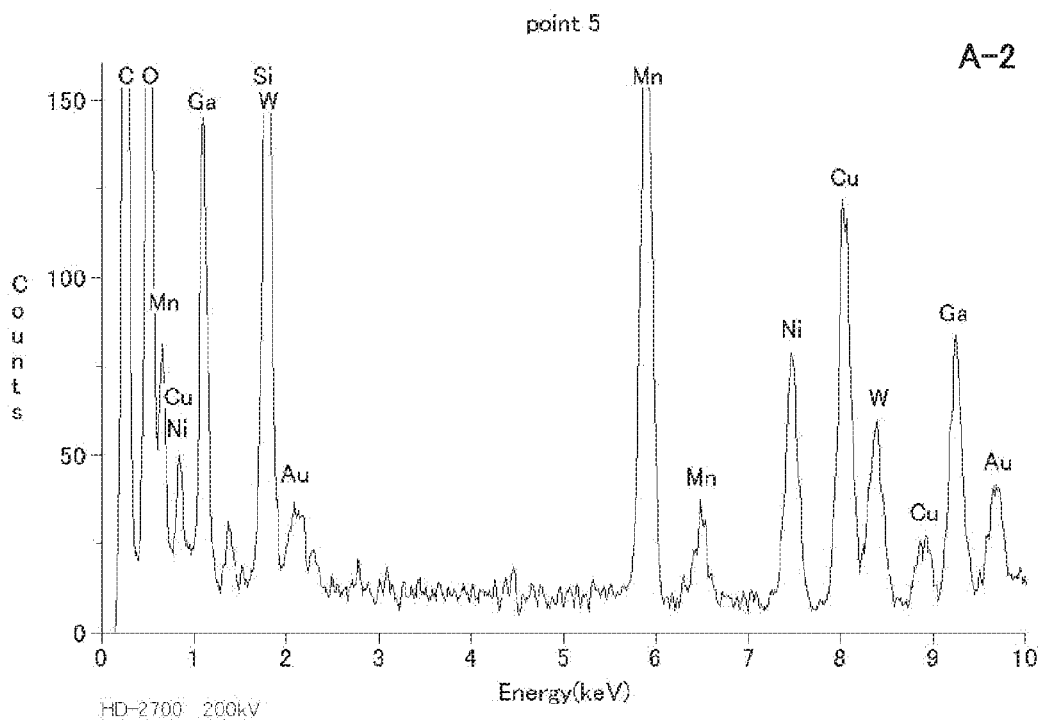
Figure 28A:
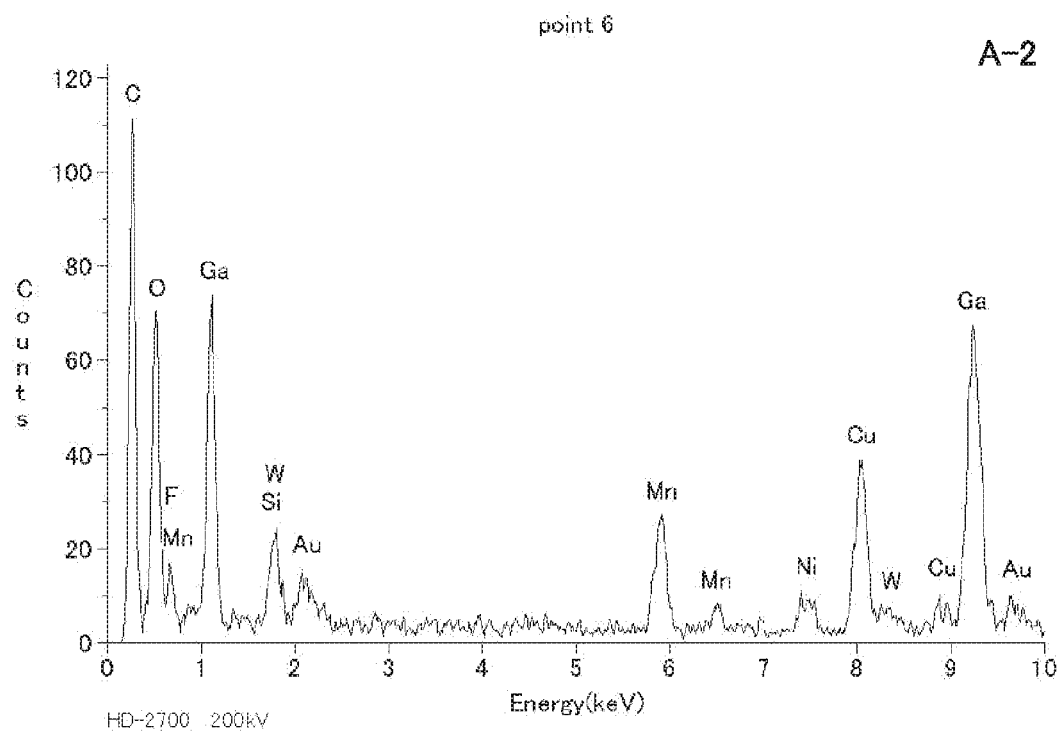
FIGS. 28A and 28B show TEM-EDX analysis results in one embodiment of the present invention.
Figure 28B:
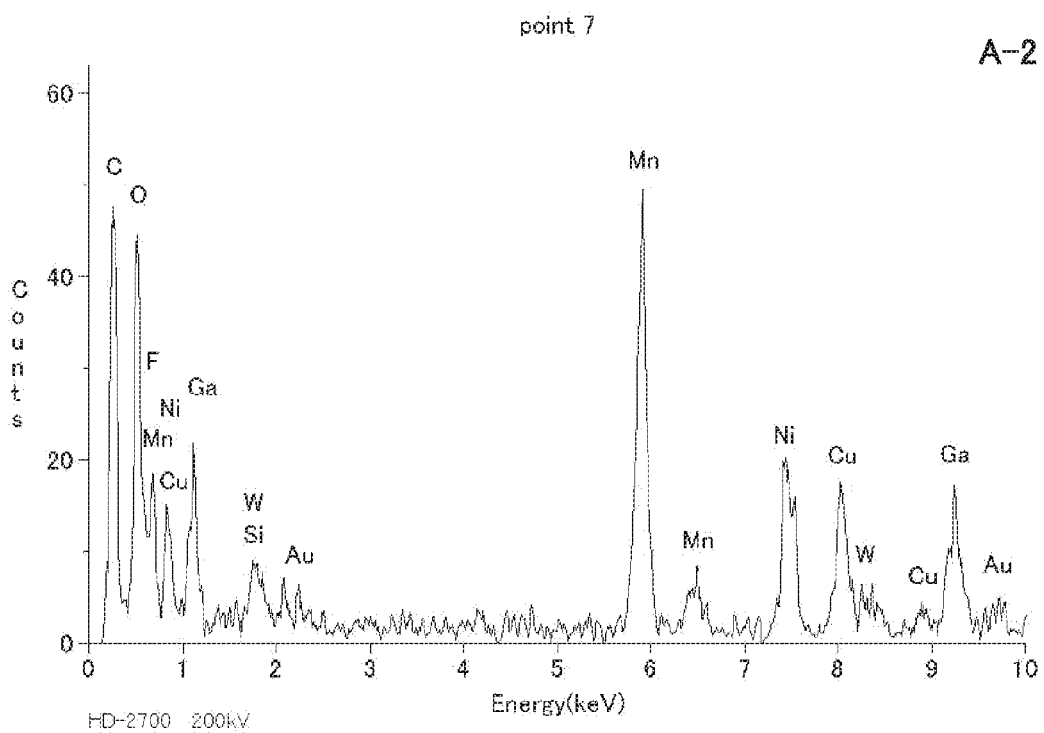
Figure 29A:
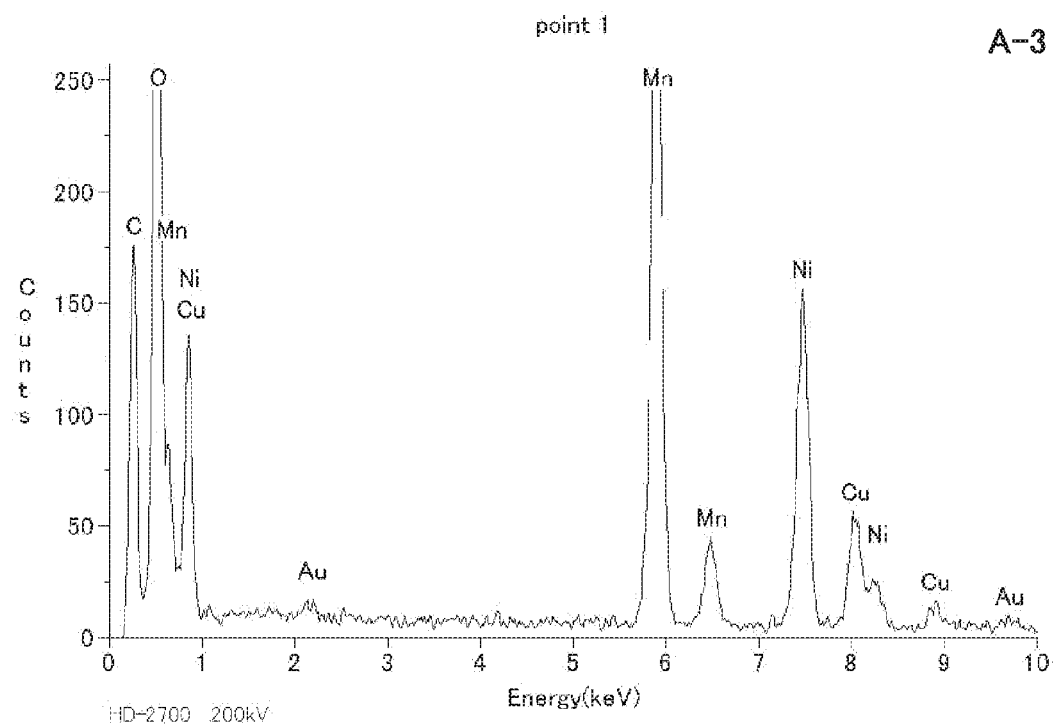
FIGS. 29A and 29B show TEM-EDX analysis results in one embodiment of the present invention.
Figure 29B:
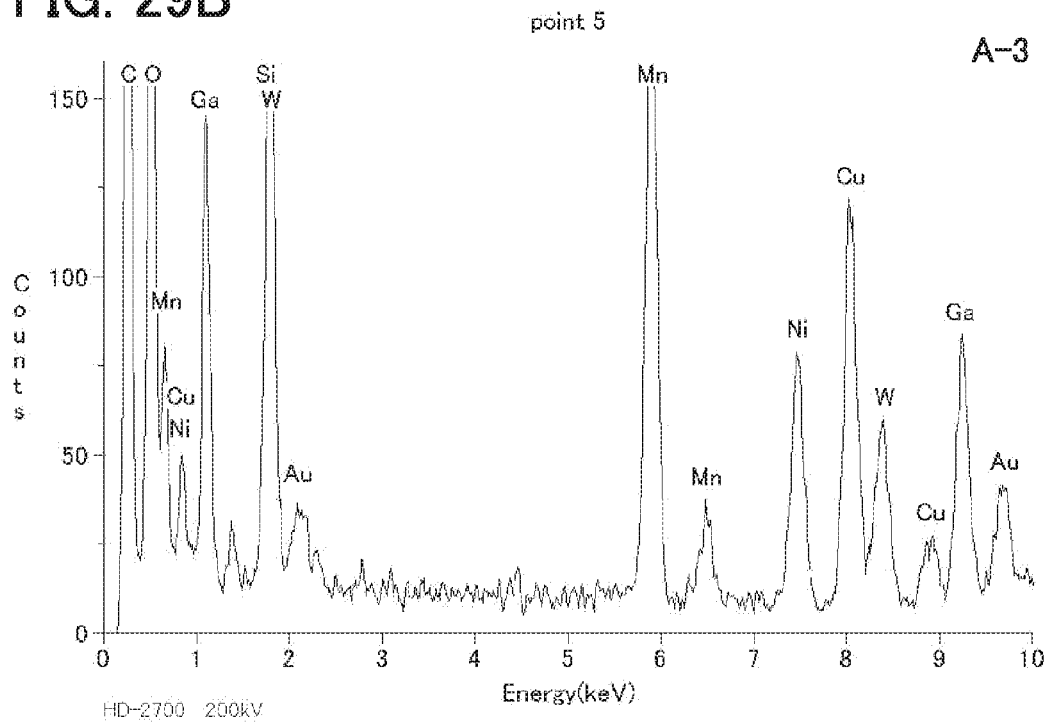
Figure 30A:
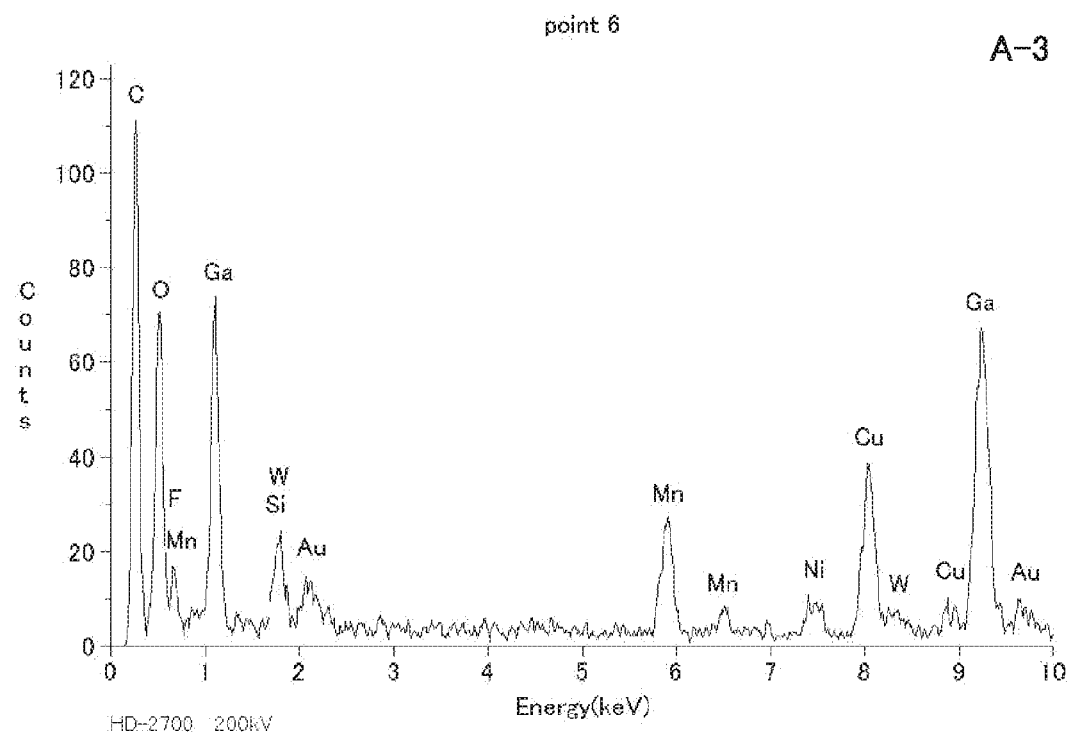
FIGS. 30A and 30B show TEM-EDX analysis results in one embodiment of the present invention.
Figure 30B:
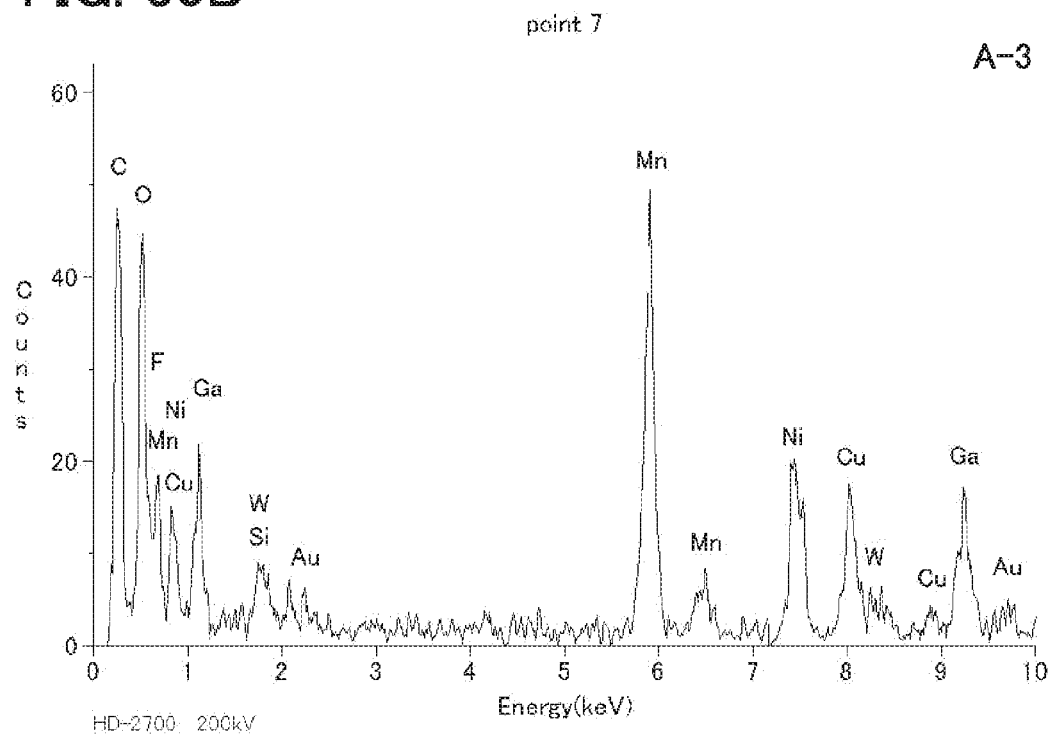

FIGS. 22A and 22B, FIGS. 23A and 23B, and FIGS. 24A and 24B show TEM-EELS analysis results. Evaluations were performed mainly focusing attention on the K-edges of O, C, and F and the L edges of Mn and Ni. FIGS. 22A and 22B show the analysis results of the points 1 to 7 in FIG. 17. FIGS. 23A and 23B show the analysis results of the points 1 to 7 in FIG. 19. FIGS. 24A and 24B show the analysis results of the points 1 to 7 in FIG. 21.

In all the cases of Electrodes A-1 to A-3, the spectra of the point 6 and the point 7 have stronger peaks of the K-edges of C and weaker peaks of Mn, O, Ni, and the like than those of the points 1 to 5. The point 6 presumably corresponds to the coating film of the particle. The spectrum of the point 6 has a strong peak of C, which suggests that reduced graphene oxide is the main component of the coating film. The spectrum of the point 7 also has a strong peak of C, which implies that reduced graphene oxide exists between the particles.

Next, consideration will be given focusing attention on the $L_3$ edges and the $L_2$ edges of Mn. Table 1 shows the ratio of the $L_3$ edge to the $L_2$ edge ($L_3/L_2$) of each of the points 1 to 7 in FIG. 17. Table 2 shows the $L_3/L_2$ ratio of each of the points 1 to 7 in FIG. 19. Table 3 shows the $L_3/L_2$ ratio of each of the points 1 to 7 in FIG. 21.

Here, the $L_3/L_2$ ratio obtained by EELS depends on the way to remove background noise. The measurement data described in this example was obtained by removing background noise mainly using a Hartree-Slater cross section.

TABLE 1

| | L3/L2 |
|---|---|
| point 1 | 1.7 |
| point 2 | 1.9 |
| point 3 | 1.6 |
| point 4 | 1.7 |
| point 5 | 2.1 |

TABLE 2

| | L3/L2 |
|---|---|
| point 1 | 1.7 |
| point 2 | 1.8 |
| point 3 | 1.8 |
| point 4 | 1.8 |
| point 5 | 2.0 |

TABLE 3

| | L3/L2 |
|---|---|
| point 1 | 2.0 |
| point 2 | 2.0 |
| point 3 | 1.8 |
| point 4 | 1.9 |
| point 5 | 1.9 |

According to FIG. 2b in Non-Patent Document 1, the ratios of $L_3$ peak to $L_2$ peak obtained by EELS of manganese compounds with different valences of manganese vary. Here, $L_3$ peak is a peak of a change from $2p^{3/2}$ to $3d^{3/2}$ and $3d^{5/2}$, and $L_2$ peak is a peak of a change from $2p^{1/2}$ to $3d^{3/2}$. Assume that the ratios of the integral intensity of $L_3$ peak to the intensity of $L_2$ peak (hereinafter referred to as $L_3/L_2$) of Mn of compounds MnO (bivalent), $Mn_3O_4$ (8/3-valent), $Mn_2O_3$ (trivalent), and $MnO_2$ (tetravalent) that are obtained by EELS are a, b, c, and d, respectively. When $a \leq L_3/L_2$ is satisfied, the valence of manganese can be estimated to be less than or equal to 2. When $b<L_3/L_2 \leq a$ is satisfied, the valence of manganese can be estimated to be greater than or equal to 2 and less than 8/3. When $c<L_3/L_2 \leq b$ is satisfied, the valence of manganese can be estimated to be greater than or equal to 8/3 and less than 3. When $d<L_3/L_2 \leq c$ is satisfied, the valence of manganese can be estimated to be greater than or equal to 3 and less than 4. When $L_3/L_2 \leq d$ is satisfied, the valence of manganese can be estimated to be greater than or equal to 4. In addition, for example, Non-Patent Document 2 discloses that the $L_3/L_2$ ratios of MnO, $Mn_3O_4$, $Mn_2O_3$, and $MnO_2$ are 3.98, 2.75, 2.50, and 1.85, respectively.

Figure 31:
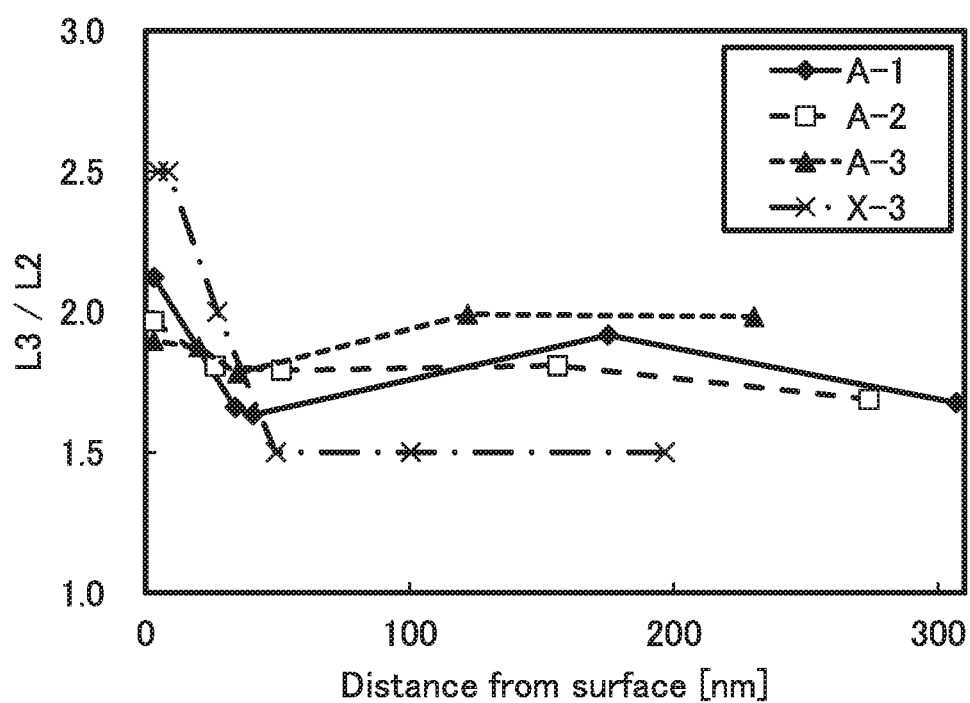
FIG. 31 shows TEM-EELS analysis results in one embodiment of the present invention.

FIG. 31 is a plotted graph showing data of Electrodes A-1 to A-3, where the horizontal axis represents distance from the surface of the particle and the vertical axis represents the $L_3/L_2$ ratio of manganese obtained by TEM-EELS analysis. FIG. 31 also shows the $L_3/L_2$ ratio of Electrode X-3 obtained by TEM-EELS analysis.

FIG. 31 shows that the $L_3/L_2$ ratio of manganese inside the particle in Electrode X-3 using a lithium manganese composite oxide not coated with a coating layer is 1.5, whereas the $L_3/L_2$ ratio of manganese in the vicinity of the surface of the particle in Electrode X-3 is as high as 2.5. This suggests that the valence of manganese on the surface of the particle is less than that of manganese inside the particle. Meanwhile, the distributions of the $L_3/L_2$ ratios of Electrodes A-1 to A-3 are narrower than that of the $L_3/L_2$ ratio of Electrode X-3, and range from 1.6 to 2.1.

For example, the $L_3/L_2$ ratios of manganese inside the particle in Electrode A-3 are 1.9 at the measurement point (point 5) 3 nm from the surface of the particle, and 2.0 at the measurement point (point 2) 122 nm from the surface of the particle. Thus, the distribution of the $L_3/L_2$ ratios of manganese inside the particle is narrow. This implies that the distribution of the valences of manganese inside the particle is also narrow.

The average value of the $L_3/L_2$ ratios of manganese at the five points in Table 1 is 1.80, the average value of the $L_3/L_2$ ratios of manganese at the five points in Table 2 is 1.81, and the average value of the $L_3/L_2$ ratios of manganese at the five points in Table 3 is 1.90. These suggest that the valence of manganese is close to 4 in all the electrodes. Here, the $L_3/L_2$ ratio of manganese of the lithium manganese composite oxide of one embodiment of the present invention that is obtained by TEM-EELS analysis is preferably greater than or equal to 1.3 and less than 2.5, more preferably greater than or equal to 1.4 and less than or equal to 2.3, still more preferably greater than or equal to 1.5 and less than or equal to 2.2, particularly preferably greater than or equal to 1.6 and less than or equal to 2.1.

As described in Example 2, the half cell using Electrode A has excellent cycle characteristics. Sample A obtained through covering with graphene oxide (Step 1) and reducing the graphene oxide (Step 2) described in Example 1 may be a more stable particle with a narrow distribution of the valences inside the particle.

[TEM-EDX Analysis]

Next, FIGS. 25A and 25B, FIGS. 26A and 26B, FIGS. 27A and 27B, FIGS. 28A and 28B, FIGS. 29A and 29B, and FIGS. 30A and 30B show TEM-EDX analysis results. FIGS. 25A to 26B show the analysis results of the points 1, 5, 6, and 7 in FIG. 17. FIGS. 27A to 28B show the analysis results of the points 1, 5, 6, and 7 in FIG. 19. FIGS. 29A to 30B show the analysis results of the points 1, 5, 6, and 7 in FIG. 21. Spectra of most of the samples have weaker peaks of Mn and Ni than peaks of C at the points 6 and 7 in contrast with the spectra of the points 1 and 5. This implies that the peaks of the spectra of the points 6 and 7 are mainly attributed to the reduced graphene oxide.

Tables 4 to 6 show the results of quantitative analysis performed focusing attention on Mn, Ni, and O. Here, the results calculated assuming that the sum of the proportions of atomicities of Mn, Ni, and O is 100% are shown in Tables 4 to 6. Note that the sum of the proportions of atomicities of Mn, Ni, and O might have a margin of error of approximately 0.1% from 100% because the values are rounded to unit.

TABLE 4

| | [atomic %] | | |
|---|---|---|---|
| | O | Mn | Ni |
| point 1 | 73.1 | 24.3 | 2.6 |
| point 2 | 72.5 | 19.3 | 8.2 |
| point 3 | 73.5 | 18.7 | 7.8 |
| point 4 | 66.4 | 23.4 | 10.1 |
| point 5 | 68.5 | 22.1 | 9.4 |

TABLE 5

| | [atomic %] | | |
|---|---|---|---|
| | O | Mn | Ni |
| point 1 | 67.3 | 23.1 | 9.6 |
| point 2 | 67.5 | 22.3 | 10.2 |
| point 3 | 65.6 | 24.5 | 9.9 |
| point 4 | 69.8 | 22.3 | 7.9 |
| point 5 | 69.2 | 21.1 | 9.8 |

TABLE 6

| | [atomic %] | | |
|---|---|---|---|
| | O | Mn | Ni |
| point 1 | 68.4 | 20.1 | 11.5 |
| point 2 | 70.7 | 19.5 | 9.8 |
| point 3 | 71.5 | 20.3 | 8.2 |
| point 4 | 72.1 | 19.8 | 8.1 |
| point 5 | 66.0 | 23.2 | 10.7 |

From Tables 4 to 6, the values {(Mn+Ni)/O} are each calculated by dividing the sum of the proportions of atomicities of Mn and Ni by the proportion of atomicity of O. The average value of {(Mn+Ni)/O} of the five measurement points in Table 4 is 0.41. The average value of {(Mn+Ni)/O} of the five measurement points in Table 5 is 0.47. The average value of {(Mn+Ni)/O} of the five measurement points in Table 6 is 0.44.

[Example 4]

In this example, the relation between the conditions for reduction of graphene oxide and the characteristics of a storage battery of one embodiment of the present invention will be described.

(Synthesis of Lithium Manganese Composite Oxides)

First, Samples 101 to 117 were prepared. Starting materials $Li_2CO_3$, $MnCO_3$, and NiO were weighed such that the molar ratio of $Li_2CO_3$ to $MnCO_3$ and NiO was 0.84:0.8062:0.318. Next, acetone or ethanol was added to the powder of these materials, and then, they were mixed in a ball mill or a bead mill to prepare mixed powder. Note that acetone and the ball mill were used in the cases of forming Samples 109 to 111, and ethanol and the bead mill were used in the cases of forming the other samples.

After that, heating was performed to volatilize acetone or ethanol, so that a mixed material was obtained (in the cases of forming all the samples).

Then, the mixed material was put in a melting pot, and was fired at 1000° C. in the air for 10 hours to synthesize a novel material (in the cases of forming all the samples). The flow rate of the air gas was 10 L/min.

Subsequently, grinding was performed to separate the sintered particles. For the grinding, acetone or ethanol was added and then mixing was performed in a ball mill or a bead mill. Note that acetone and the ball mill were used in the cases of forming Samples 109 to 111, and ethanol and the bead mill were used in the cases of forming the other samples.

After the grinding, heating was performed to volatilize acetone or ethanol, so that a lithium manganese composite oxide containing nickel was formed (in the eases of forming all the samples). Then, heat treatment was performed at 600° C. for 3 hours in the cases of forming Samples 104 and 109 to 111; at 900° C. for 3 hours in the case of forming Sample 117; and at 800° C. for 3 hours in the cases of forming Samples 101 to 103, 105, and 112 to 116. Note that heat treatment was not performed in the cases of forming Samples 106 to 108.

(Coating with Carbon-containing Layer)

Then, the obtained lithium manganese composite oxide was coated with a carbon-containing layer. Here, a process for covering the lithium manganese composite oxide with a carbon-containing layer that is described in this example includes Step 1 of covering with graphene oxide and Step 2 of reducing the graphene oxide.

(Step 1: Covering with Graphene Oxide)

First, covering with graphene oxide (Step 1) will be described. Two kinds of solutions GO1 and GO2 were prepared. In GO1, the concentration of graphene oxide in water is 1 wt %. In GO2, the concentration of graphene oxide in water is 2 wt %. The lithium manganese composite oxides for forming Samples 108 to 111 were each mixed with the solution GO1 in a mixer, and the lithium manganese composite oxides for forming the other samples were each mixed with the solution GO2 in a mixer.

The obtained mixture was dried under reduced pressure in a bell jar at 50° C. and then ground in an alumina mortar.

(Step 2: Reducing Graphene Oxide)

Next, reducing the graphene oxide (Step 2) will be described. The graphene oxide of each of the obtained samples was reduced. First, a reducing solution was prepared. Ascorbic acid as a reducing agent and lithium hydroxide were used as solutes, and a 80 vol % ethanol solution was used as a solvent. The molar amount of lithium hydroxide was equal to that of ascorbic acid.

Eleven kinds of solutions with the following different weight ratios of ascorbic acid to the lithium manganese composite oxide the were prepared: 0.75 wt %, 1.6 wt %, 2.43 wt %, 2.7 wt %, 3.38 wt %, 8.44 wt %, 16.88 wt %, 28.13 wt %, 33.75 wt %, 67.5 wt %, and 135 wt %. The samples were put in the seven kinds of solutions according to the combinations shown in Table 7, and reduction was performed at 60° C. for 3 hours.

TABLE 7

|  | GO solution | Concentration of ascorbic acid [wt %] |
| --- | --- | --- |
| Sample 117 | GO2 | 28.125 |
| Sample 116 | GO2 | 16.875 |
| Sample 115 | GO2 | 8.438 |
| Sample 114 | GO2 | 3.375 |
| Sample 113 | GO2 | 2.425 |
| Sample 112 | GO2 | 1.600 |
| Sample 111 | GO1 | 135 |
| Sample 110 | GO1 | 67.5 |
| Sample 109 | GO1 | 33.75 |
| Sample 108 | GO1 | 33.75 |
| Sample 107 | GO2 | 33.75 |
| Sample 106 | GO2 | 16.875 |
| Sample 105 | GO2 | 16.875 |
| Sample 104 | GO2 | 8.4375 |
| Sample 103 | GO2 | 2.7 |
| Sample 102 | GO2 | 0.75 |
| Sample 101 | GO2 | 0.75 |

Then, the obtained solution was filtrated by suction filtration. For the filtration, filter paper with a particle retention capability of 1 μm was used. Then, washing and drying were performed. The drying was performed at 50° C. under reduced pressure. After the drying, the obtained powder was ground in a mortar. After that, drying was performed at 170° C. under reduced pressure for 10 hours.

Through the above steps, Samples 101 to 117 were obtained.

(Fabricating Electrodes)

Next, electrodes were fabricated using Samples 101 to 117 as positive electrode active materials. Each sample was mixed with acetylene black (AB) as a conductive additive, polyvinylidene fluoride (PVDF) as a resin, and N-methyl-2-pyrrolidone (NMP) as a polar solvent to form slurry. The weight ratio of each sample to the PVDF and the AB was 90:5:5. Then, the slurry was applied to a current collector and dried. Note that a surface of the current collector was treated with an undercoat in advance.

(Measuring Discharge Capacities)

Half cells were fabricated using the obtained electrodes. For the cells, the coin cell described in Embodiment 2 was used. Lithium was used for counter electrodes of the half cells. An electrolytic solution was formed by dissolving $LiPF_6$ as a salt in a mixed solution containing ethylene carbonate and diethyl carbonate, which are aprotic organic solvents, at a volume ratio of 1:1 As a separator, polypropylene (PP) was used.

Figure 37A:
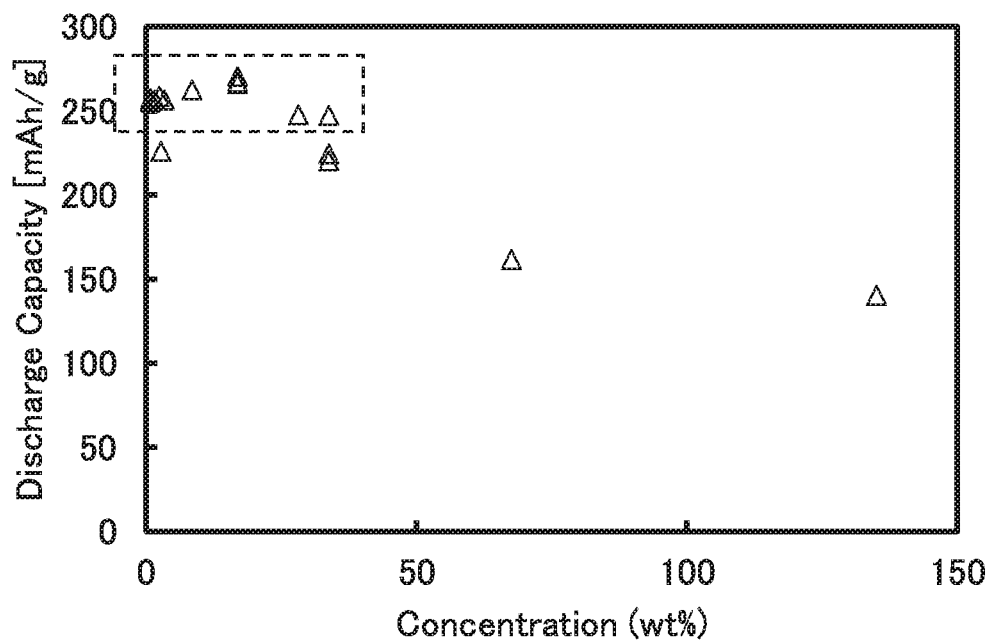
FIGS. 37A and 37B show measurement results of discharge capacities in one embodiment of the present invention.
Figure 37B:
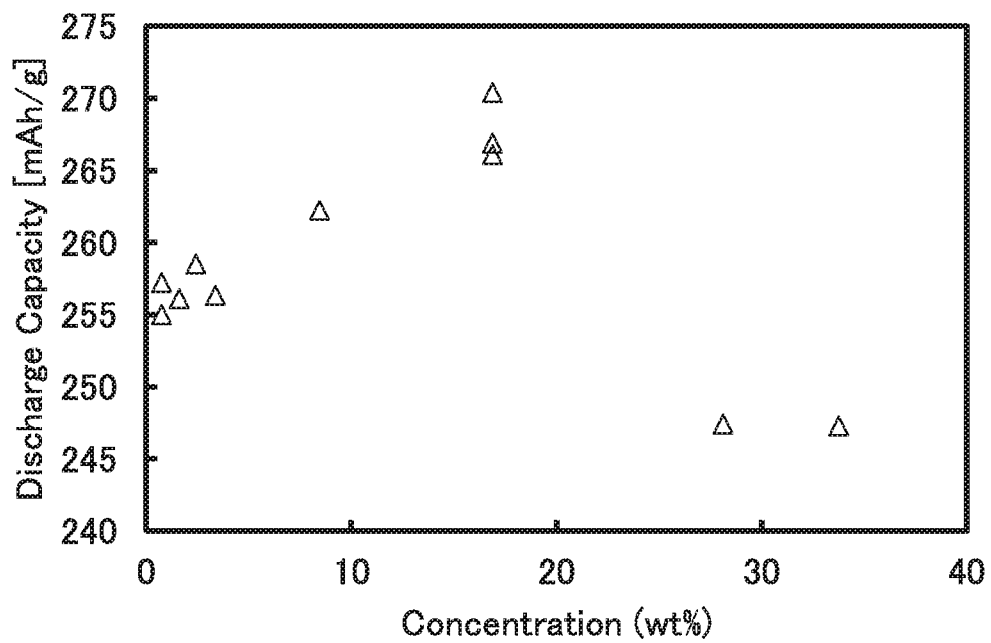

FIG. 37A shows measurement results of discharge capacities. The vertical axis represents discharge capacity (mAh/g), and the horizontal axis represents the concentration of ascorbic acid (wt %). Charging was performed at a constant current until the voltage reached a termination voltage of 4.8 V. Discharging was performed at a constant current until the voltage reached an end voltage of 2.0 V. The current density for charging and discharging was 30 mA/g. FIG. 37B is an enlarged graph showing a region indicated by a broken line in FIG. 37A.

As shown in FIG. 37B, the capacities of the cells each including the sample obtained by performing reduction using approximately 4 wt % or less ascorbic acid was 260 mAh/g, which is relatively low; the capacities of the cells each including the sample obtained by performing reduction using approximately 8 wt % or more ascorbic acid was relatively high; and further increasing the concentration of ascorbic acid to approximately 28 wt % or more reduced the capacities of the cells. In the case where the concentration of ascorbic acid is low, for example, a decrease in capacity is presumably due to insufficient reduction. In contrast, in the case where the concentration of ascorbic acid is high, a decrease in capacity is presumably due to a spinel structure according to the results obtained by X-ray diffraction and Rietveld analysis that will be described below.

(Evaluation by X-ray Diffraction)

Figure 38:
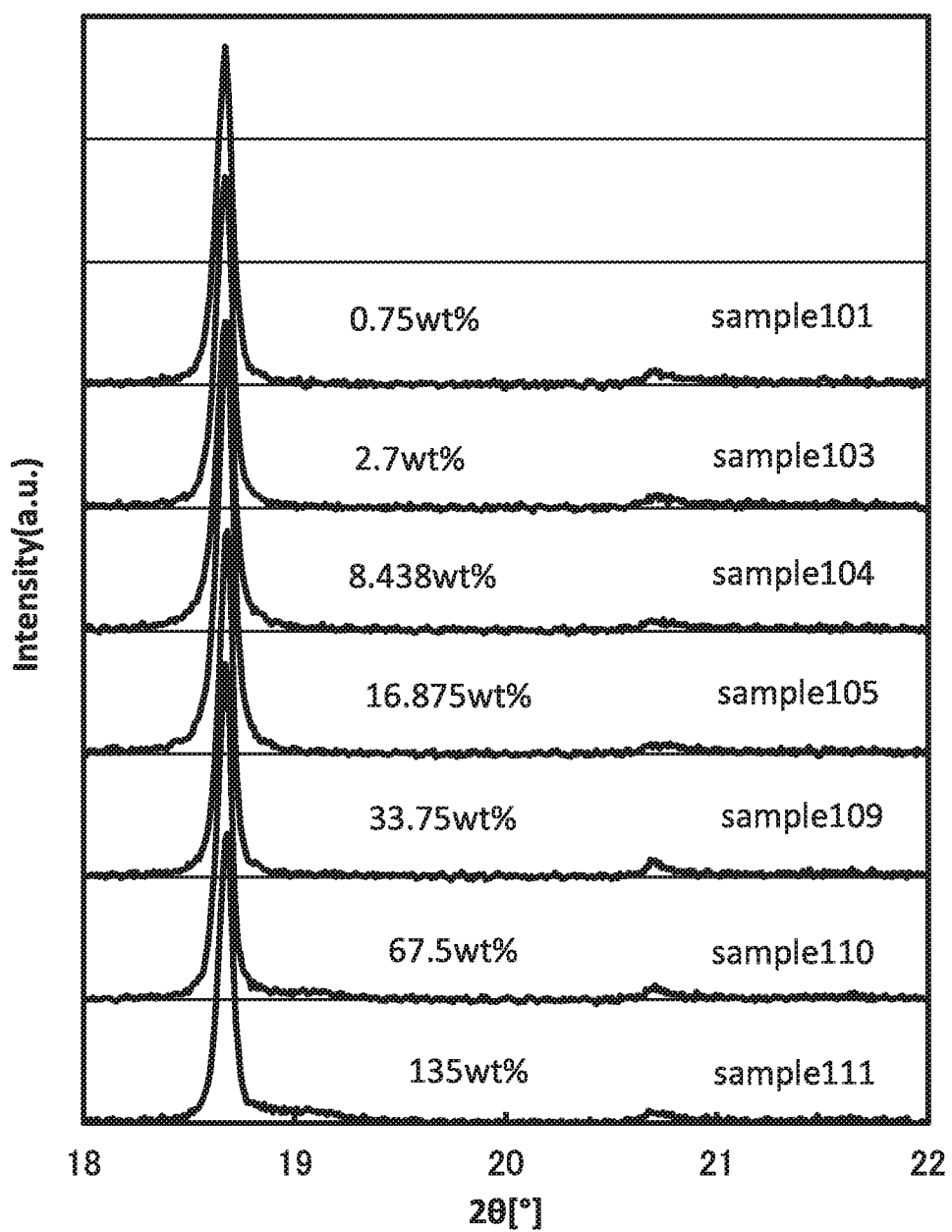
FIG. 38 shows X-ray diffraction analysis results in one embodiment of the present invention.

FIG. 38 shows the X-ray diffraction results of Samples 101 to 111 of the obtained samples. Here, the results are examined focusing on a peak at around 19°. Each sample has a strong peak at around 18.7°. The samples obtained by performing reduction using a reducing solution containing 67.5% or more ascorbic acid each have an outstanding peak at around 19.1°, which is on the high angle side of the peak at around 18.7°.

Next, the Rietveld analysis was performed using the obtained X-ray diffraction spectra.

(Rietveld Analysis)

The crystal data of the lithium manganese composite oxide can be acquired by the Rietveld analysis. As analysis software, TOPAS (DIFFRAC$^{plus}$ TOPAS Version 3) manufactured by Bruker AXS is used. On the assumption that the obtained lithium manganese composite oxide includes the first crystal phase and the second crystal phase, the Rietveld analysis was performed on the basis of the X-ray diffraction measurement. The proportions of the first crystal phase and the second crystal phase, the lattice constants of the first and second crystal phases, and each site occupancy of atoms were calculated under the conditions where the initial first crystal phase is $Li_2MnO_3$ with a layered rock-salt structure that belongs to the space group C12/m1 and the initial second crystal phase is $LiNi_{0.5}Mn_{1.5}O_4$ with a spinel structure that belongs to the space group Fd-3m.

Here, the lithium manganese composite oxide analyzed in this example contains lithium, manganese, nickel, and nickel as metals; however, it is difficult to distinguish manganese from nickel because a difference between the X-ray scattering capabilities of manganese and nickel is little. Thus, the occupancies of a 4g site, a 2b site, a 2c site, and a 4h site of a layered rock-salt structure of the first crystal phase were calculated as the sum of the occupancies of manganese and nickel.

Table 8 shows the crystal data of $Li_2MnO_3$ with a layered rock-salt structure (C12/m1) that is used for the Rietveld analysis. The lattice constants a, b, c, and β were 4.9555 [Å], 8.5906 [Å], 5.0284 [Å], and 109.07°, respectively. Table 9 shows the crystal data of $LiMn_2O_4$ with a spinel structure (Fd-3m). The lattice constant a was 8.1700 [Å]. Here, B denotes a temperature factor called the Debye-Waller factor.

TABLE 8

| Atom | Site | x | y | z | B [Å²] | Occupancy |
|---|---|---|---|---|---|---|
| Mn and Ni | 4g | 0 | 0.1663 | 0 | 0.73 | $A(Mn + Ni)_{4g}$ |
| Li | 4g | 0 | 0.1663 | 0 | 0.97 | $A(Li)_{4g}$ |
| Li1 | 2b | 0 | 0.5 | 0 | 0.97 | $A(Li)_{2b}$ |
| Mn and Ni | 2b | 0 | 0.5 | 0 | 0.73 | $A(Mn + Ni)_{2b}$ |
| Li2 | 2c | 0 | 0 | 0.5 | 0.97 | $A(Li)_{2c}$ |
| Mn and Ni | 2c | 0 | 0 | 0.5 | 0.73 | $A(Mn + Ni)_{2c}$ |
| Li3 | 4h | 0 | 0.6560 | 0.5 | 0.97 | $A(Li)_{4h}$ |
| Mn and Ni | 4h | 0 | 0.6560 | 0.5 | 0.73 | $A(Mn + Ni)_{4h}$ |
| O1 | 4i | 0.2178 | 0 | 0.2253 | 0.64 | $A(O)_{4i}$ |
| O2 | 8i | 0.2537 | 0.3222 | 0.2237 | 0.64 | $A(O)_{8i}$ |

TABLE 9

| Atom | Site | x | y | z | B | Occupancy |
|---|---|---|---|---|---|---|
| Mn | 16c | 0.625 | 0.625 | 0.625 | 0.73 | $A(Mn)_{16c}$ |
| Ni | 16c | 0.625 | 0.625 | 0.625 | 0.73 | $A(Ni)_{16c}$ |
| Li | 8b | 0 | 0 | 0 | 0.97 | $A(Li)_{8b}$ |
| O | 32e | 0.238 | 0.238 | 0.238 | 0.64 | $A(O)_{32e}$ |

Here, assume that the occupancies of the 4g site, the 2b site, the 2c site, the 4h site, a 4i site, and a 8i site in Element X are $A(X)_{4g}$, $A(X)_{2b}$, $A(X)_{2c}$, $A(X)_{4h}$, $A(X)_{4i}$, and $A(X)_{8i}$, respectively. For example, when the occupancy at the 4g site is expressed as the sum of the occupancies of manganese and nickel, it is expressed by $A(Mn+Ni)_{4g}$.

In starting Rietveld analysis of the layered rock-salt structure in Table 8, the lattice constants in Table 8 and the occupancies shown in Condition 1 in Table 10 were input as the initial values. In starting Rietveld analysis of the spinel structure in Table 9, the lattice constants in Table 9 and the occupancies shown in Condition 3 in Table 11 were input as the initial values. In the Rietveld analysis, fitting was performed such that Condition 2 in Table 10 and Condition 4 in Table 11 were satisfied. Note that the coordinates might be changed from the initial coordinates by the fitting; however, the change does not greatly affect the symmetry.

TABLE 10

| Atom | Site | Occupancy | Condition 1 (initial value) | Condition 2 |
|---|---|---|---|---|
| Mn and Ni | 4g | $A(Mn + Ni)_{4g}$ | 0.85 | $A(Mn + Ni)_{4g}$ + |
| Li | 4g | $A(Li)_{4g}$ | 0.15 | $A(Li)_{4g} = 1$ |
| Li1 | 2b | $A(Li)_{2b}$ | 0.7 | $A(Li)_{2b} + A(Mn +$ |
| Mn and Ni | 2b | $A(Mn + Ni)_{2b}$ | 0.3 | $Ni)_{2b} = 1$ |
| Li2 | 2c | $A(Li)_{2c}$ | 1 | $A(Li)_{2c} + A(Mn +$ |
| Mn and Ni | 2c | $A(Mn + Ni)_{2c}$ | 0 | $Ni)_{2c} = 1$ |
| Li3 | 4h | $A(Li)_{4h}$ | 1 | $A(Li)_{4h} + A(Mn +$ |
| Mn and Ni | 4h | $A(Mn + Ni)_{4h}$ | 0 | $Ni)_{4h} = 1$ |
| O1 | 4i | $A(O)_{4i}$ | 1 | $0 \leq A(O)_{8i} \leq 1$ |
| O2 | 8i | $A(O)_{8i}$ | 1 | $A(O)_{8i} = 1$ |

TABLE 11

| Atom | Site | Occupancy | Condition 3 (initial value) | Condition 4 |
|---|---|---|---|---|
| Mn | 16c | $A(Mn)_{16c}$ | 0.75 | $A(Mn)_{16c} = 0.75$ |
| Ni | 16c | $A(Ni)_{16c}$ | 0.25 | $A(Mn)_{16c} = 0.25$ |
| Li | 8b | $A(Li)_{8b}$ | 1 | $A(O)_{8b} = 1$ |
| O | 32e | $A(O)_{32e}$ | 1 | $A(O)_{32e} = 1$ |

The Rietveld analysis was performed on Samples 101 to 111. Table 12 shows Rwp, Rp, Rexp, GOF, and the proportions of the first and second crystal phases. Table 13 shows the lattice constants of the first and second crystal phases and the oxygen occupancies at the 4i site of the first crystal phase.

TABLE 12

| | Concentration of ascorbic acid [wt. %] | Rwp | Rp | Rexp | GOF | Proportion First crystal phase [wt %] | Proportion Second crystal phase [wt %] |
|---|---|---|---|---|---|---|---|
| Sample 111 | 135 | 2.8 | 3.74 | 2.82 | 1.33 | 84.22 | 15.78 |
| Sample 110 | 67.5 | 2.79 | 3.8 | 2.81 | 1.36 | 88.62 | 11.38 |
| Sample 109 | 33.75 | 2.79 | 3.86 | 2.83 | 1.38 | 81.2 | 18.8 |
| Sample 108 | 33.75 | 2.8 | 4.39 | 3.07 | 1.57 | 76.55 | 23.45 |
| Sample 107 | 33.75 | 2.82 | 3.77 | 2.81 | 1.34 | 80.6 | 19.4 |
| Sample 106 | 16.875 | 2.85 | 3.78 | 2.84 | 1.33 | 96.18 | 3.82 |
| Sample 105 | 16.875 | 2.74 | 4.49 | 3.09 | 1.64 | 95.66 | 4.34 |
| Sample 104 | 8.4375 | 2.84 | 4.15 | 2.98 | 1.46 | 95.27 | 4.73 |
| Sample 103 | 2.7 | 2.82 | 4.25 | 3.05 | 1.5 | 97.88 | 2.12 |
| Sample 102 | 0.75 | 2.75 | 4.61 | 3.12 | 1.68 | 97.06 | 2.94 |
| Sample 101 | 0.75 | 2.78 | 4.16 | 3 | 1.5 | 98.47 | 1.53 |

TABLE 13

| | First crystal phase | | | | | Second crystal phase Lattice constant |
|---|---|---|---|---|---|---|
| | Lattice constant | | | | Occupancy | |
| | a (Å) | b (Å) | c (Å) | β (°) | 4i site | a (Å) |
| Sample 111 | 4.9532 | 8.5877 | 5.0264 | 109.08 | 0.77 | 8.1452 |
| Sample 110 | 4.9533 | 8.5878 | 5.0281 | 109.07 | 0.77 | 8.158 |
| Sample 109 | 4.9532 | 8.5860 | 5.0256 | 109.07 | 0.69 | 8.208 |
| Sample 108 | 4.9458 | 8.5892 | 5.0236 | 109.00 | 1.00 | 8.1955 |
| Sample 107 | 4.9493 | 8.5901 | 5.0249 | 109.00 | 0.81 | 8.1866 |
| Sample 106 | 4.9487 | 8.5889 | 5.0223 | 109.02 | 0.70 | 8.21855 |
| Sample 105 | 4.9478 | 8.5917 | 5.0226 | 109.02 | 0.88 | 8.21213 |
| Sample 104 | 4.9485 | 8.5903 | 5.0219 | 109.02 | 0.82 | 8.21457 |
| Sample 103 | 4.9507 | 8.5900 | 5.0232 | 109.03 | 0.75 | 8.21639 |
| Sample 102 | 4.9482 | 8.5861 | 5.0227 | 109.03 | 0.82 | 8.21462 |
| Sample 101 | 4.9510 | 8.5893 | 5.0238 | 109.04 | 0.71 | 8.21792 |

Here, Rwp is obtained by dividing the sum of residual squares by the sum total of the observed intensity, and Rp is a difference between the observed intensity and the theoretical diffraction intensity. Rexp is the expected value of Rwp, which is the statistically estimated minimum Rwp. In addition, GOF, which stands for "good of fitness", is obtained by dividing Rwp by Rexp and is preferably close to 1.

As shown in Table 12, the proportion of the second crystal phase with a spinel structure was greater than 10% when the concentration of ascorbic acid is high, for example, 33.75 wt % or more in reduction. It is suggested that reduction treatment might reduce part of the lithium manganese composite oxide as well as graphene oxide and the part might have a spinel structure.

The theoretical capacity of the spinel structure is known to be as low as 147 mAh/g. Therefore, an increase in the proportion of the spinel structure implies a decrease in the capacity of the obtained sample.

EXPLANATION OF REFERENCE

101: covering layer, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: storage battery, 402: positive electrode, 404: negative electrode, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 510: positive electrode lead electrode, 511: negative electrode lead electrode, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 610: gasket, 611: PTC element, 612: safety valve mechanism, 900: circuit board, 910: label, 911: terminal, 912: circuit, 913: storage battery, 914: antenna, 915: antenna, 916: layer, 917: layer, 918: antenna, 919: terminal, 920: display device, 921: sensor, 922: terminal, 930: housing, 930a: housing, 930b: housing, 931: negative electrode, 932: positive electrode, 933: separator, 951: terminal, 952: terminal, 7100: portable display device, 7101: housing, 7102: display portion, 7103: operation button, 7104: power storage device, 7400: mobile phone, 7401: housing, 7402: display portion, 7403: operation button, 7404: external connection port, 7405: speaker, 7406: microphone, 7407: power storage device, 8021: charging apparatus, 8022: cable, 8100: automobile, 8101: headlight This application is based on Japanese Patent Application serial no. 2013-209366 filed with Japan Patent Office on Oct. 4, 2013, the entire contents of which are hereby incorporated by reference.

What is claimed is:

1. A method for forming an electrode material, comprising the steps of:
    immersing a first particle in a solution comprising a reducing agent and a polar solvent in order to obtain a second particle,
    wherein each of the first particle and the second particle comprises a lithium manganese composite oxide with a layered rock-salt structure,
    wherein the second particle comprises a first part and a second part,
    wherein the second part belongs to a space group Fd-3m, and
    wherein the second part is produced by immersing the first particle.

2. The method for forming an electrode material according to claim 1, wherein the reducing agent is any one of ascorbic acid, hydrazine, dimethyl hydrazine, hydroquinone, $NaBH_4$, tetra butyl ammonium bromide, $LiAlH_4$, ethylene glycol, polyethylene glycol and N,N-diethylhydroxylamine.

3. The method for forming an electrode material according to claim 1, wherein the solution further comprises water.

4. The method for forming an electrode material according to claim 1,
    wherein the first part belongs to a space group C2/c, and
    wherein the first part is larger proportion than the second part in volume.

5. The method for forming an electrode material according to claim 1, wherein the lithium manganese composite oxide further comprises Ni.

6. The method for forming an electrode material according to claim 1,
    wherein the lithium manganese composite oxide is represented by $Li_xMn_yNi_zO_w$, and
    wherein $0 \leq x/(y+z) < 2, y > 0, z > 0$, and $0.26 \leq (y+z)/w < 0.5$ are satisfied.

7. A method for forming a positive electrode, comprising the steps of:
    the method according to claim 1; and
    applying slurry comprising the first particle to a current collector,
    wherein applying the slurry is performed before immersing the first particle.

8. A method for manufacturing a storage battery, comprising the steps of:
    the method according to claim 1;
    forming a negative electrode; and
    stacking the positive electrode and the negative electrode in an exterior body.

9. A method for forming an electrode material, comprising the steps of:
- kneading a mixture comprising a flake of graphene oxide and a particle of a lithium manganese composite oxide with a layered rock-salt structure to form a first particle in which the particle of lithium manganese composite oxide is covered with the flake of graphene oxide; and
- immersing the first particle in a solution comprising a reducing agent and a first solvent in order to obtain a second particle,
- wherein the first solvent is a polar solvent.

10. The method for forming an electrode material according to claim 9,
- wherein the second particle comprises a lithium manganese composite oxide with a layered rock-salt structure,
- wherein the second particle comprises a first part and a second part,
- wherein the second part belongs to a space group Fd-3m, and
- wherein the second part is produced by immersing the first particle.

11. The method for forming an electrode material according to claim 9, wherein the first solvent is water.

12. The method for forming an electrode material according to claim 9,
- wherein the solution further comprises water, and
- wherein the first solvent is not water.

13. The method for forming an electrode material according to claim 9, wherein the lithium manganese composite oxide further comprises Ni.

14. A method for forming a positive electrode, comprising the steps of:
- the method according to claim 9; and
- applying the mixture to a current collector,
- wherein applying the mixture is performed before immersing the first particle.

15. A method for forming an electrode material, comprising the steps of:
- mixing a mixture comprising a flake of graphene oxide and a particle of a lithium manganese composite oxide with a layered rock-salt structure to form a first particle in which the particle of lithium manganese composite oxide is covered with the flake of graphene oxide;
- immersing the first particle in a solution comprising a reducing agent and a first solvent; and
- reducing the graphene oxide in the first particle in order to obtain a second particle,
- wherein the first solvent is a polar solvent.

16. The method for forming an electrode material according to claim 15,
- wherein the second particle comprises a lithium manganese composite oxide with a layered rock-salt structure,
- wherein the second particle comprises a first part and a second part,
- wherein the second part belongs to a space group Fd-3m, and
- wherein the second part is produced by immersing the first particle.

17. The method for forming an electrode material according to claim 15, wherein the first solvent is water.

18. The method for forming an electrode material according to claim 15,
- wherein the solution further comprises water, and
- wherein the first solvent is not water.

19. The method for forming an electrode material according to claim 15, wherein the lithium manganese composite oxide further comprises Ni.

20. A method for forming a positive electrode, comprising the steps of:
- the method according to claim 15; and
- applying the mixture to a current collector,
- wherein applying the mixture is performed before immersing the first particle.

* * * * *